United States Patent
Lindsey et al.

(10) Patent No.: US 9,965,133 B1
(45) Date of Patent: May 8, 2018

(54) APPLICATION FOR ASSISTING IN CONDUCTING COVERT CYBER OPERATIONS

(75) Inventors: Teddy Lindsey, San Diego, CA (US); Benjamin Adams, Encinitas, CA (US); Michael Dickun, Solana Beach, CA (US); Brian Sobel, Washington, DC (US)

(73) Assignee: NTREPID CORPORATION, Herndon, VA (US)

( * ) Notice: Subject to any disclaimer, the term of this patent is extended or adjusted under 35 U.S.C. 154(b) by 189 days.

(21) Appl. No.: 13/551,712

(22) Filed: Jul. 18, 2012

Related U.S. Application Data

(60) Provisional application No. 61/510,691, filed on Jul. 22, 2011.

(51) Int. Cl.
| | | |
|---|---|---|
| G06F 3/00 | (2006.01) | |
| G06F 3/0481 | (2013.01) | |
| H04L 29/06 | (2006.01) | |
| G06F 9/44 | (2018.01) | |

(52) U.S. Cl.
CPC .......... *G06F 3/0481* (2013.01); *G06F 9/4443* (2013.01); *H04L 63/101* (2013.01)

(58) Field of Classification Search
CPC ........ G06F 9/4443; G06F 3/0481; G06F 8/38; G06F 1/163; G06F 3/011
USPC ........................................................ 715/744
See application file for complete search history.

(56) References Cited

U.S. PATENT DOCUMENTS

| | | | | |
|---|---|---|---|---|
| 7,082,467 | B2 * | 7/2006 | Border | H04B 7/18582 370/316 |
| 8,284,934 | B2 * | 10/2012 | Rahman | H04W 12/04 380/44 |
| 8,316,237 | B1 * | 11/2012 | Felsher | H04L 9/0825 380/282 |
| 8,375,434 | B2 | 2/2013 | Cottrell et al. | |
| 8,417,776 | B2 * | 4/2013 | Womack | G06F 21/64 709/204 |
| 8,595,818 | B2 * | 11/2013 | Karlin | H04L 63/0236 713/150 |
| 8,615,795 | B2 | 12/2013 | Cottrell et al. | |
| 2003/0110394 | A1 * | 6/2003 | Sharp | H04L 12/2602 726/23 |
| 2006/0168186 | A1 * | 7/2006 | Mathew et al. | 709/223 |
| 2008/0196098 | A1 | 8/2008 | Cottrell et al. | |
| 2009/0013399 | A1 | 1/2009 | Cottrell et al. | |
| 2009/0089361 | A1 * | 4/2009 | Womack | G06F 21/64 709/202 |

(Continued)

*Primary Examiner* — Joy M Weber
(74) *Attorney, Agent, or Firm* — Squire Patton Boggs (US) LLP

(57) ABSTRACT

A covert application, including one or more modules can be provided to assist individuals in conducting covert cyber operations. Furthermore, the covert application can operate in a secure operating environment, which provides a reliable and protected computing environment from which a user can conduct cover cyber operations. The covert application can allow a user to create and utilize one or more personas. Personas created by the covert application can appear to originate from any part of the world, and personas can allow a user of the covert application to interact through various Internet services, such as email, instant messaging, online forums, and website browsing.

26 Claims, 39 Drawing Sheets

(56) References Cited

U.S. PATENT DOCUMENTS

| | | | |
|---|---|---|---|
| 2010/0241744 A1* | 9/2010 | Fujiwara | H04L 12/2602 709/224 |
| 2011/0022500 A1* | 1/2011 | Scheinfeld et al. | 705/27.2 |
| 2011/0276396 A1* | 11/2011 | Rathod | 705/14.49 |
| 2012/0036440 A1* | 2/2012 | Dare et al. | 715/734 |
| 2012/0278387 A1* | 11/2012 | Garcia et al. | 709/204 |

* cited by examiner

APPLICATION FOR ASSISTING IN CONDUCTING COVERT CYBER OPERATIONS

CROSS REFERENCE TO RELATED APPLICATIONS

This application claims priority under 35 U.S.C. § 119(e) of U.S. Provisional Patent Application Ser. No. 61/510,691, filed on Jul. 22, 2011. The subject matter of the earlier filed application is hereby incorporated by reference.

BACKGROUND

Field

Embodiments of the present invention generally relate to computer systems. More specifically, certain embodiments of the present invention relate to computer systems that can provide one or more software applications utilized in covert cyber operations.

Description of the Related Art

Covert intelligence and law enforcement operations, such as covert cyber operations, can require specific technical skills in addition to traditional intelligence and investigative skills. Such specific technical skills can include fabricating a geographic location of where an individual's network traffic originates from, obtaining funds without revealing affiliation to an organization, fabricating specific characteristics of an individual's "online persona," and fabricating a language of an Internet browser that an individual uses to browse the Internet in order to match the purported language of the "online persona."

Individuals that have the requisite technical skills, in addition to the requisite intelligence and investigative skills, can comprise a limited subset of individuals capable of conducting covert operations. Because of the recent emergence of the Internet in global communications, the demand for covert cyber operations has significantly increased. However, the limited subset of individuals with the requisite skills can lead to bottlenecks, and can reduce the capability of conducting cyber operations. What is needed is a tool that can assist in covert cyber operations by reducing the technical skills required to conduct such operations.

SUMMARY

According to an embodiment of the invention, a method includes activating a persona within a covert application. The method further includes configuring one or more network environment attributes of the persona within the covert application. The method further includes configuring one or more operating system environment attributes of the persona within the covert application. The method further includes configuring one or more application environment attributes of the persona within the covert application.

According to another embodiment, an apparatus includes a memory configured to store one or more modules. The apparatus further includes a processor configured to execute the one or more modules stored on the memory. The processor is further configured, when executing the one or more modules stored on the memory, to, activate a persona within a covert application, configure one or more network environment attributes of the persona within the covert application, configure one or more operating system environment attributes of the persona within the covert application, and configure one or more application environment attributes of the persona within the covert application.

According to another embodiment, a non-transitory computer-readable medium includes a computer program stored thereon that, when executed by a processor, causes the processor to implement a method. The method includes activating a persona within a covert application. The method further includes configuring one or more network environment attributes of the persona within the covert application. The method further includes configuring one or more operating system environment attributes of the persona within the covert application. The method further includes configuring one or more application environment attributes of the persona within the covert application.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein.

DETAILED DESCRIPTION

Figure 1:
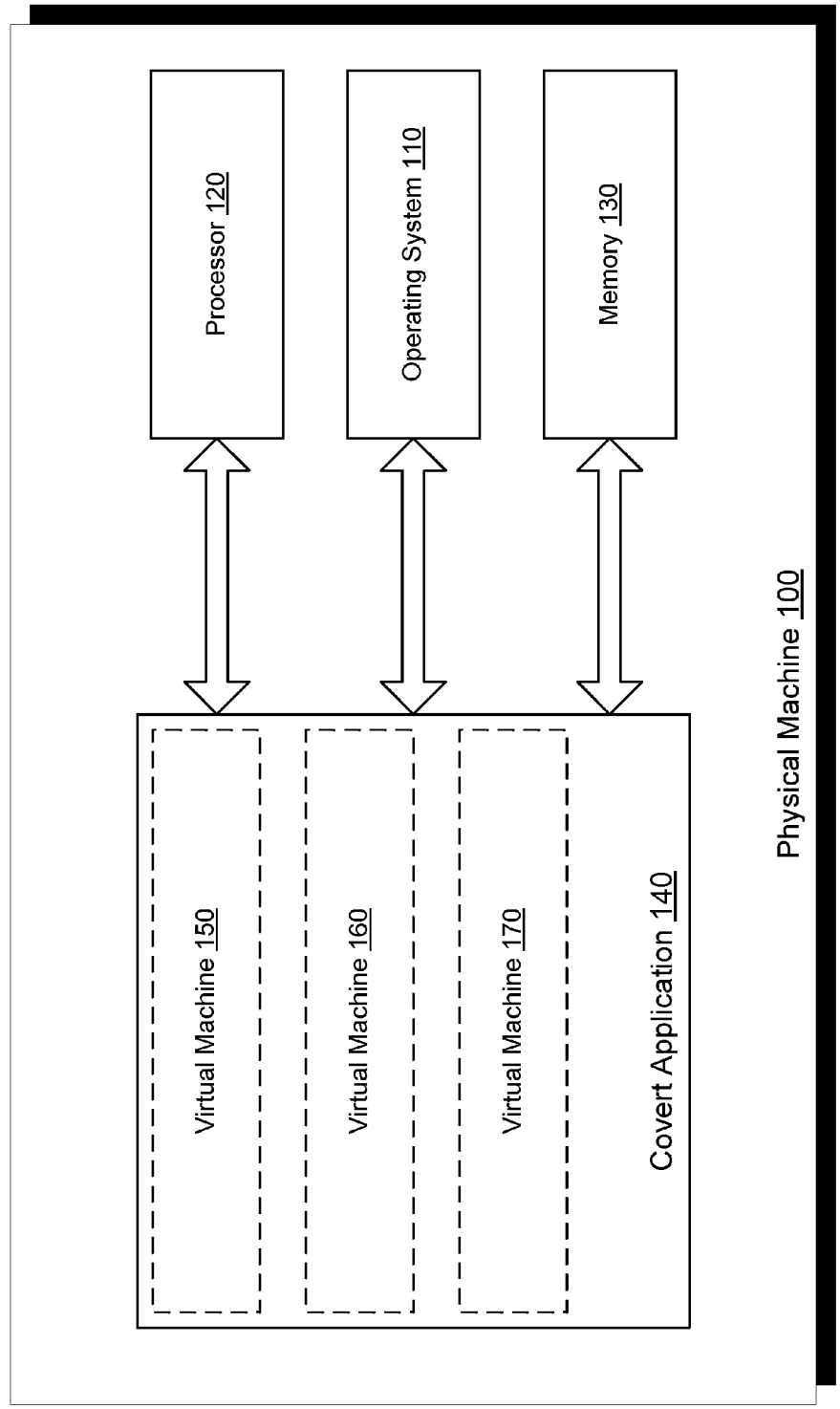
FIG. 1 illustrates a block diagram of a physical machine that includes an instance of a covert application in accordance with an embodiment of the invention.

It will be readily understood that the components of the present invention, as generally described and illustrated in the figures herein, may be arranged and designed in a wide variety of different configurations. Thus, the following detailed description of the embodiments of a method, apparatus, system, and computer-readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Definitions

A "computer," as understood by one of ordinary skill in the art, is any programmable machine that receives input, automatically stores and manipulates data, and provides output. A "physical machine" or "physical computer" is a hardware implementation of a machine or computer, where the machine or computer includes a hardware component. A "virtual machine" or "virtual computer" is a software implementation of a machine or computer that executes programs like a physical machine or computer, but where the software implementation does not include a hardware component outside of the physical machine or computer that the virtual machine or computer executes upon.

A "computer program" is any sequence of instructions written to perform a specific task on a computer, and has an executable form that a computer (typically through the use of a processor) can use to execute the instructions. A "computer module," "software module," or "module" is any computer program, or a portion thereof, that encapsulates related functions. A "computer application," "software application," or "application" is any collection of computer programs and/or modules. A "computer network" or "network" is any collection of computers interconnected by communication channels that facilitate communication among the computers. A "file" is a resource that stores data that can be accessed by a computer program that is executed within the computer.

A "web page" is a document or information resource that can be accessed using a web browser and displayed on a monitor or mobile device. A "website" is a collection of one or more related web pages, and is hosted on a web server accessible via a network, such as the Internet. A "service" or "web service," as understood by one of ordinary skill in the art, is a module or application designed to support interoperable computer-to-computer interaction over a network, such as the Internet. A service can have an interface described in a computer-processable format. A computer can interact with a service by transmitting messages over a network protocol. A "cookie" is a file that is stored on a computer by a web browser, and contains text. A "local shared object" is a file that is stored on a computer by a web browser, and contains any type of data. A "cache" is a software component that stores data so that future requests for the data can be served faster.

A "online persona" or "persona" is a persistent, and consistent, digital identity that represents a user's presence on the Internet. A "locale" is a geographic location, such as a place or address, where a digital identity, or an online persona, purports to be located. A "geosite" is a physical location (such as an Internet Service Provider (ISP) or hosting facility), from which network traffic of a digital identity, or online persona, originates.

Covert Application

According to an embodiment of the invention, a covert application including one or more modules can be provided to assist individuals in conducting covert cyber operations. Furthermore, in one embodiment, the covert application can operate in a secure operating environment, which provides a reliable and protected computing environment from which a user can conduct cover cyber operations. According to the embodiment, each session created by the covert application utilizes a clean virtual machine image that can be deleted after each session, which can greatly reduce the chance of compromise by malicious software applications. In accordance with the embodiment, each persona created by the covert application can utilize a separate and distinct virtual machine image. The virtual machine features of the covert application are described below in greater detail.

In addition, according to the embodiment, the covert application can allow a user to create and utilize one or more personas. As previously described, a persona is a persistent and consistent digital identity that represents a user's presence on the Internet. A persona can be utilized in a covert cyber operation to interact with one or more contacts over the Internet. According to the embodiment, personas created by the covert application can appear to originate from any part of the world, and personas can allow a user of the covert application to interact through various online services, such as email, instant messaging, online forums, and website browsing. The covert application can allow an individual to create an unlimited number of personas. By using the covert application, a user can employ an unlimited number of different personas from a single machine simultaneously. In accordance with the embodiment, a user can switch from one persona to another persona an unlimited number of times all from a single machine.

Furthermore, according to the embodiment, the covert application can provide each persona with its own environment attributes, that can be configured in a matter of seconds when a persona is created or activated. In one embodiment, the configuration of environment attributes can include altering identifiers that include location information in one or more network packets that are transmitted by the covert application, so that it appears that the network packets originate from a location where the persona purports to be located. In another embodiment, the configuration of environment attributes can include altering identifiers generated by the covert application which include identifying information associated with the environment attributes. Thus, for example, if a persona purports to be utilizing a specific operating system, the covert application can configure the environment attributes so that it appears that the persona is utilizing the specific operating system, regardless of the actual operating system that the covert application is utilizing. In another example, if a persona purports to be utilizing a specific web browser, the covert application can configure the environment attributes so that it appears that the persona is utilizing the specific web browser, regardless of the actual browser that the covert application utilizes. The configuration of environment attributes for a persona is described below in greater detail.

In one embodiment, the covert application can also provide a unique "safety net." According to the embodiment, the safety net can scan any outgoing communication of the covert application, before the outgoing communication is transmitted, based on one or more rules, and warn the user that the outgoing communication does not comply with the one or more rules. This unique safety net feature can help minimize user mistakes and oversights that might comprise a covert cyber operation. Specifics of the safety net feature are described below in greater detail.

Virtual Machine

FIG. 1 illustrates a block diagram of a physical machine that includes an instance of a covert application in accordance with an embodiment of the invention. Specifically, FIG. 1 illustrates physical machine 100, which represents any type of physical machine or computer. Physical machine 100 includes an operating system, represented by operating system 110, a fixed amount of persistent and transient memory storage, represented by memory 130, and a fixed amount of processing capability, represented by processor 120.

According to the embodiment, physical machine 100, also includes an instance of a covert application (i.e., covert application 140). Covert application 140 creates a virtual environment by creating one or more virtual machines (e.g., virtual machines 150, 160, and 170) within covert application 140, and by acting as a layer between physical machine 100 and each of the one or more virtual machines. While in the illustrated embodiment of FIG. 1, covert application includes virtual machines 150, 160, and 170, this is only an example, and covert application 140 can create any number of virtual machines. Furthermore, within the virtual environment, covert application 140 can also delete any of the virtual machines (e.g., virtual machines 150, 160, and 170), and recreate the deleted virtual machine. Thus, in accordance with the embodiment, any number of virtual machines can be created, deleted, and recreated within covert application 140.

Each virtual machine, such as virtual machines 150, 160, and 170, is a completely self-contained environment that utilizes at least a portion of the operating system of physical machine 100, represented by operating system 110, at least a portion of the disk storage of physical machine 100, represented by memory 130, and at least a portion of the processing capability of physical machine 100, represented by processor 120. In one embodiment, each virtual machine can include its own operating system. Each virtual machine acts as a separate physical machine within physical machine 100. Thus, each virtual machine, such as virtual machines 150, 160, and 170 includes its own environment attributes, such as network attributes, operating system attributes, and application attributes (including browser attributes, such as bookmarks, cache, and cookies) that can be configured separately by covert application 140. In one embodiment, the configuration of environment attributes can include manipulating headers, or identifiers, generated by covert application 140, which include identifying information associated with the environment attributes. The configuration of environment attributes for a persona is described below in greater detail.

The environment attributes for each virtual machine can also be stored within covert application 140, so that even if the virtual machine is deleted, the environment attributes remain within covert application 140. In the event that the virtual machine is recreated, the virtual machine can be reconfigured with the persisted environment attributes.

As previously described, covert application 140 acts as a layer between virtual machines 150, 160, and 170, and physical machine 100. By acting as a layer between virtual machines 150, 160, and 170, and physical machine 100, covert application 140 can control interaction between virtual machines 150, 160, and 170, and the components of physical machine 100, such as operating system 110, processor 120, and memory 130. Thus, when virtual machines 150, 160, and 170 require access to the components of physical machine 100, such as operating system 110, processor 120, and memory 130, covert application 140 facilitates the access to physical machine 100.

Furthermore, covert application 140 stores data generated by virtual machines 150, 160, and 170 into a database, or persistent storage, located on physical machine 100, represented by memory 130. The storage operation of covert application 140 can take a number of different forms. For example, covert application 140 can automatically store the full content of each data object (such as a HyperText Markup Language (HMTL) document) created, viewed, or modified by a user of covert application 140 into memory 130. As another example, covert application 140 can automatically store the environment attributes of a virtual machine (e.g., virtual machines 150, 160, and 170) into memory 130. As another example, covert application 140 can store one or more data objects upon request by the user. In each example, the data can be forensically hashed, stored to the database, or persistent storage, located on physical machine 100, represented by memory 130, or on another external physical machine, and full-text indexed. According to the embodiment, the persistent operation of covert application 140 can provide for rich auditing capabilities, and can provide an evidence repository for law enforcement operations.

According to an embodiment, as previously described, each persona created within covert application 140 can utilize a separate and distinct virtual machine created by covert application 140. Thus, according to the embodiment, virtual machine 150 represents a first persona, virtual machine 160 represents a second persona, and virtual machine 170 represents a third persona. According to the embodiment, each of virtual machines 150, 160, and 170 can include their own environment attributes configured for the specific persona that each virtual machine represents. In alternate embodiments, an instance of a covert application (i.e., covert application 140) can be executed directly on a physical machine (e.g., physical machine 100) where the instance of the covert application (i.e., covert application 140) does not create a virtual environment (i.e., does not create one or more virtual machines, such as virtual machines 150, 160, and 170). In some of these alternate embodiments, separate instances of a covert application that are executed directly on a physical machine can connect with instances of a covert application that create a virtual environment within a physical machine.

Environment Configuration

Figure 2:
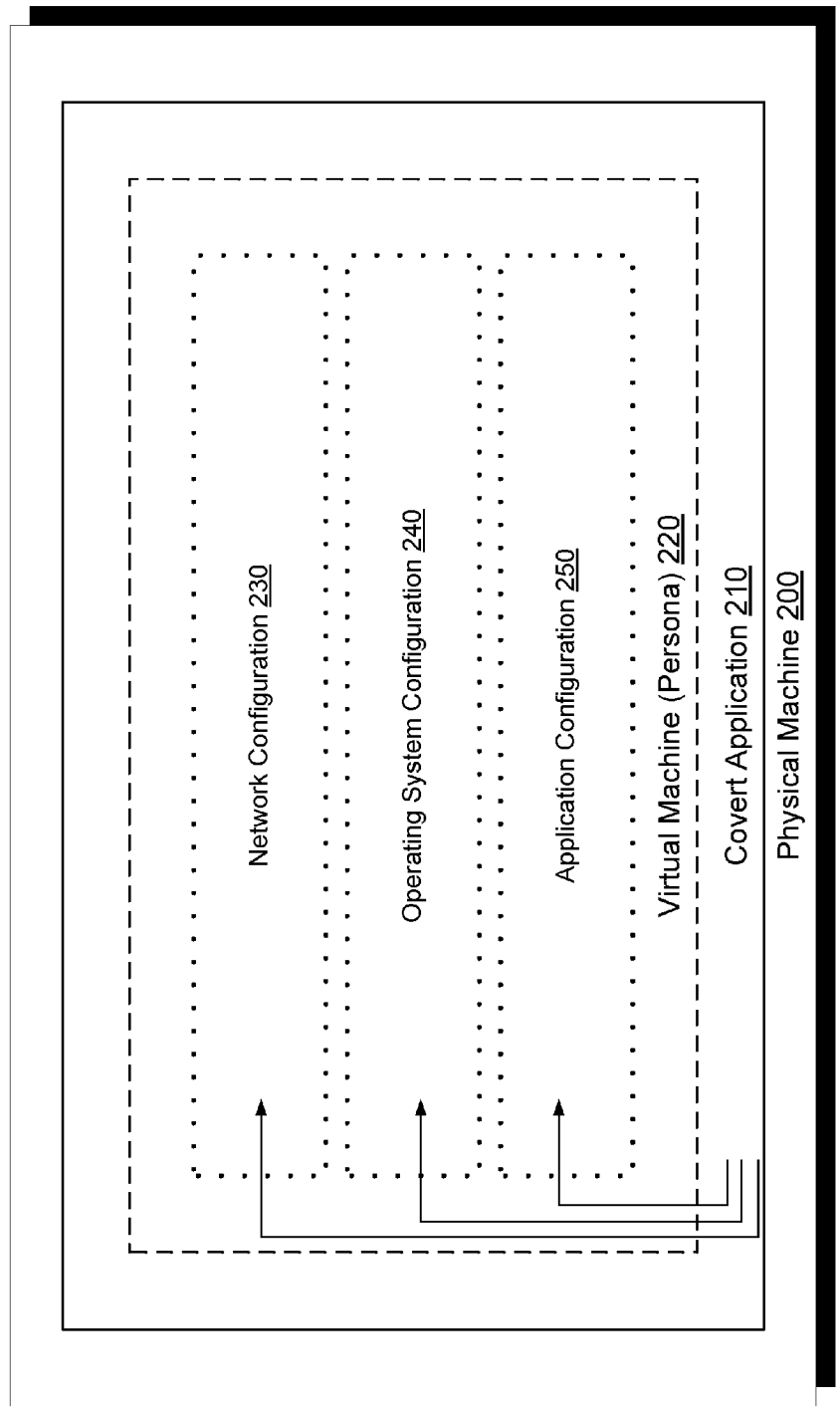
FIG. 2 illustrates an example of an environment configuration that a covert application performs for a persona in accordance with an embodiment of the invention.

FIG. 2 illustrates an example of an environment configuration that a covert application 210 performs for a persona in accordance with an embodiment of the invention. In one embodiment, covert application 210 of FIG. 2 is similar to covert application 140 of FIG. 1. According to the embodiment, covert application 210 is executed on a physical machine 200 and creates virtual machine 220 customized for a specific persona (also identified in FIG. 2 as persona 220). This is also identified as activating virtual machine/persona 220. According to the embodiment, activating virtual machine/persona 220 can include configuring a locale for the virtual machine/persona 220. As previously described, a locale is a location where a persona purports to be located. Also according to the embodiment, activating virtual machine/persona 220 can include configuring an operating system and a specific application (such as a web browser) for the virtual machine/persona 220. The operating system and application (such as a web browser) represent the operating system and application (such as a web browser) that virtual machine/persona 220 purports to be using.

In accordance with the embodiment, covert application 210 can configure environment attributes of virtual machine/persona 220. The configuration of the environment attributes can include configuring network environment attributes of virtual machine/persona 220, represented in FIG. 2 as network configuration 230. According to the embodiment, network configuration 230 can include altering identifiers that include location information within network traffic (i.e., one or more network packets) transmitted by covert application 210, at the direction of virtual machine/persona 220. This gives the appearance that network traffic transmitted by covert application 210 originates from a purported location that is different from where the network traffic actually originates (i.e., the actual location of physical machine 200). Thus, according to the embodiment, if a persona purports to be located at a purported location, covert application 210 can configure network traffic of virtual machine/persona 220, through network configuration 230, so that the network traffic appears to originate from the purported location, rather than the actual location of physical machine 200. In one embodiment, the purported location is based on a locale that is associated with virtual machine/persona 220, when virtual machine/persona 220 is activated.

More specifically, network configuration 230 can include altering identifiers that include location information within one or more network packets transmitted by covert application 210, at the direction of virtual machine/persona 220. The altering of identifiers that include location information can include replacing an IP address within one or more network packets with a substitute IP address that correlates to a purported location of virtual machine/persona 220. Examples of various implementations of altering identifiers within one or more network packets is described in U.S. patent application Ser. No. 11/722,497 and U.S. patent application Ser. No. 10/560,725, both of which are incorporated herein in its entirety.

In accordance with the embodiment, the configuration of the environment attributes can also include configuring operating system environment attributes of virtual machine/persona 220, represented in FIG. 2 as operating system configuration 240. According to the embodiment, operating system configuration 240 can include altering identifiers of all operating system attributes associated with virtual machine/persona 220. For example, the altering of identifiers of operating system attributes can include altering the following identifiers: operating system version, language preference, character set preference, system clock, time zone, registry key, and media access control (MAC) address. The altering of identifiers can make it appear that virtual machine/persona 220 utilizes a specific operating system, regardless of the operating system actually utilized by physical machine 200. Covert application 210 performs operating system configuration 240 because identifiers of all operating system attributes can be transmitted whenever virtual machine/persona 220 transmits one or more network packets over a network connection, such as the Internet. Thus, operating system configuration 240 can provide operating system attributes that are consistent with a specific operating system associated with virtual machine/persona 220. In one embodiment, the specific operating system is based on an operating system that is associated with virtual machine/persona 220, when virtual machine/persona 220 is activated. Examples of various implementations of altering identifiers within one or more operating system attributes is described in U.S. patent application Ser. No. 11/722,497 and U.S. patent application Ser. No. 10/560,725.

In accordance with the embodiment, the configuration of the environment attributes can also include configuring application environment attributes of virtual machine/persona 220, represented in FIG. 2 as application configuration 250. According to the embodiment, application configuration 250 can include altering identifiers of all attributes for a specific application, such as a web browser, that are associated with virtual machine/persona 220. For example, the altering of all attributes for a web browser can include altering the following identifiers: one or more cookies, one or more local shared objects, cache, one or more bookmarks, a web browser language, a web browser version, and a web browser history. Covert application 210 performs application configuration 250 because identifiers of all specific application attributes can be transmitted whenever virtual machine/persona 220 transmits one or more network packets over a network connection, such as the Internet. Thus, application configuration 250 can provide application attributes that are consistent with a specific application (such as a web browser) associated with virtual machine/persona 220. In one embodiment, the specific application (such as a specific web browser) is based on a specific application (such as a specific web browser) that is associated with virtual machine/persona 220, when virtual machine/persona 220 is activated. Examples of various implementations of altering identifiers within one or more application attributes is described in U.S. patent application Ser. No. 11/722,497 and U.S. patent application Ser. No. 10/560,725.

According to an embodiment, covert application 210 can automatically perform network configuration 230, operating system configuration 240, and application configuration 250 for each persona once the persona is activated. Furthermore, covert application 210 can automatically perform network configuration 230, operating system configuration 240, and application configuration 250 when a user switches from one persona to another persona. The automation of the configuration can help ensure that a persona can safely interact with one or more contacts over the Internet more quickly, and can help ensure that no mistakes are made in the configuration process that would result in detection of the persona's true identity. In accordance with the embodiment, covert application 210 can perform network configuration 230, operating system configuration 240, and application configuration 250 completely within covert application 210, and before any network traffic associated with the persona is transmitted. This helps ensure that no network traffic is transmitted that would result in detection of the persona's true identity.

Safety Net

Figure 3:
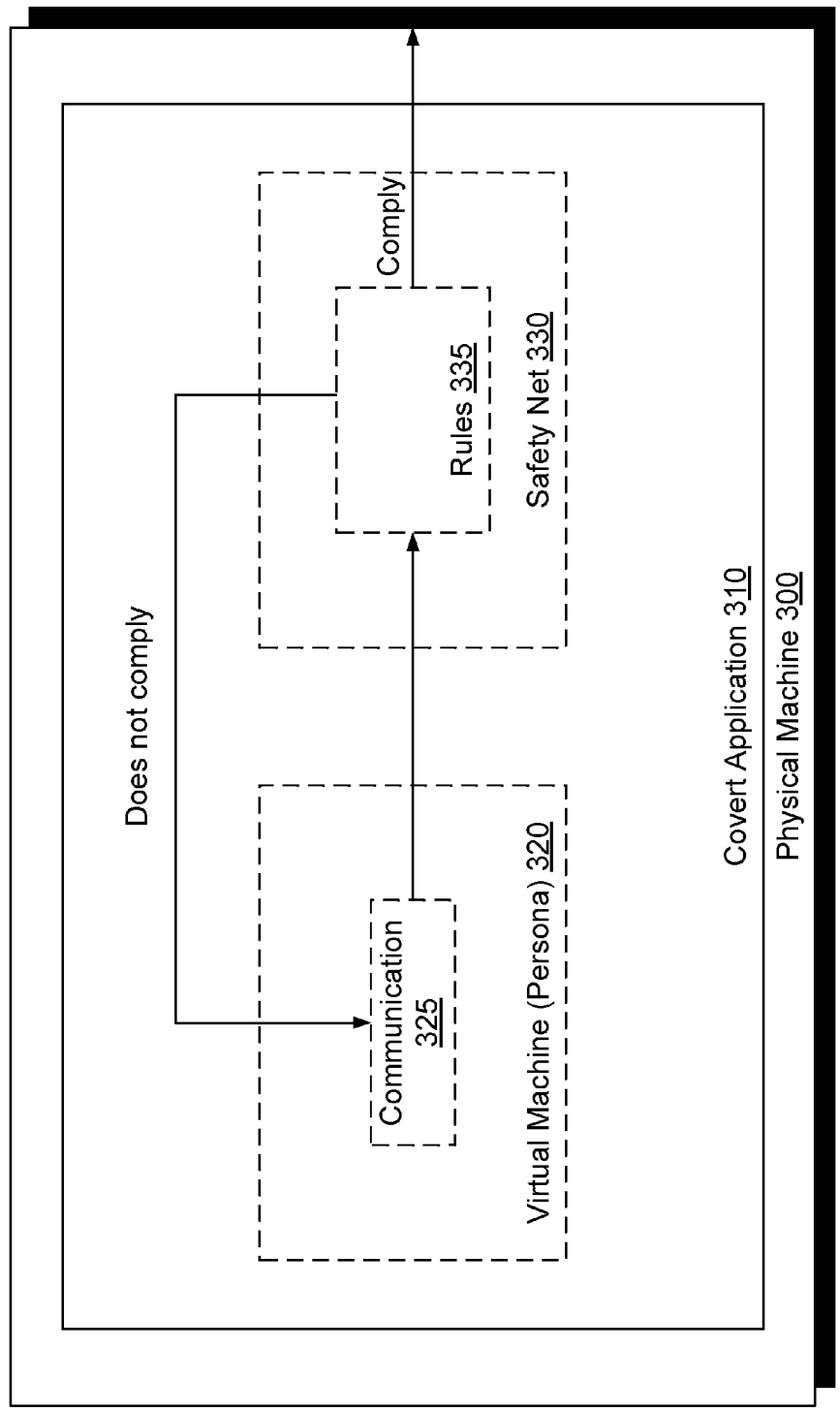
FIG. 3 illustrates a safety net of a covert application in accordance with an embodiment of the invention.

FIG. 3 illustrates a safety net 330 of a covert application 310 in accordance with an embodiment of the invention. In one embodiment, covert application 310 of FIG. 3 is similar to covert application 210 of FIG. 2, and covert application 140 of FIG. 1. According to the embodiment, covert application 310 is executed on a physical machine 300 and creates virtual machine 320 customized for a specific persona (also identified in FIG. 3 as persona 320). Furthermore, covert application 310 includes safety net 330, which is an application component of covert application 310 configured to scan communications generated by a virtual machine/persona, such as virtual machine/persona 320, and perform a unified check of the communications, based on one or more rules.

According to the embodiment, virtual machine/persona 320 generates an outgoing communication, communication 325. Communication 325 can be any type of communication that can be generated by covert application 310. Examples of communication types include an email message, an instant message, a social networking service message, an Internet chat message, and a blog message. In accordance with the embodiment, before covert application 310 transmits communication 325 over a network connection, such as the Internet, safety net 330 scans communication 325 and performs a unified check of communication 325 based on one or more rules, represented in FIG. 3 as rules 335. Examples of rules are described below in greater detail. The unified check includes analyzing communication 325 based on rules 335 to determine if communication 325 complies with rules 335. If communication 325 complies with rules 335, covert application 310 transmits communication 325. If communication 325 does not comply with rules 335, then covert application 310 does not transmit communication 325, and virtual machine/persona 320 displays a warning message to a user. Depending on the rule, virtual machine/persona 320 allows a user to take remedial steps in order to allow covert application 310 to successfully transmit communication 325. The remedial steps that a user can take are also described below in greater detail.

One type of rule is a time rule. When safety net 330 analyzes communication 325 based on a time rule, safety net 330 analyzes a current time of communication 325 to determine if communication 325 is being transmitted during an identified time period. This time period can be identified as a normal time period, and can be based on a locale of a persona. For example, if a persona's locale is Washington, D.C., then the normal time period may be from 9:00 AM to 5:00 PM Eastern Standard Time. The normal time period can be of any duration. If communication 325 is being transmitted during the normal time period, then communication 325 complies with the time rule, and safety net 330 allows communication 325 to be successfully transmitted. If communication 325 is not being transmitted during the normal time period, then communication 325 does not comply with the time rule, and safety net 330 does not allow communication 325 to be successfully transmitted. Virtual machine/persona 320 then displays a warning message to the user indicating that communication 325 is being transmitted outside a normal time period associated with the persona. The user can then proceed based one of the following options. The user can confirm that communication 325 is to be transmitted outside the normal time period. Upon confirmation from the user, safety net 330 allows communication 325 to be successfully transmitted. The user can also cancel the transmission of communication 325. Upon cancellation, virtual machine/persona 320 deletes communication 325. In an alternate embodiment, upon cancellation, virtual machine/persona 320 archives communication 325. The user can also schedule communication 325 to be transmitted at a scheduled time, where the scheduled time is within the normal time period. Upon scheduling, virtual machine/persona 320 transmits communication 325 at the scheduled time, and safety net 330 allows communication 325 to be successfully transmitted. According to the embodiment, communication 325 can be transmitted at the scheduled time, even if at that time the persona associated with virtual machine/persona 320 is not activated. Also, according to the embodiment, communication 325 can be transmitted out of a specific locale for an email account associated with virtual machine/persona 320. This can ensure consistency with virtual machine/persona 320. Thus, safety net 330 provides the feature of checking that communications such as communication 325 are transmitted out of an appropriate locale.

Another type of rule is an email address rule. When safety net 330 analyzes communication 325 based on an email rule, safety net 330 analyzes each recipient email address of communication 325 to determine whether virtual machine/persona 320 has ever transmitted a communication to the email address (i.e., whether the recipient is known to the persona associated with virtual machine/persona 320). Safety net 330 also analyzes each recipient's email address to determine if any other personas within covert application 310 have ever transmitted a communication to the email address (i.e., whether the recipient is known to any other personas). If communication 325 only contains recipients that are known to the persona associated with virtual machine/persona 320, then communication 325 complies with the email rule, and safety net 330 allows communication 325 to be successfully transmitted. If communication 325 contains one or recipients that are not known to the persona associated with virtual machine/persona 320, then communication 325 does not comply with the email rule and safety net 330 does not allow communication 325 to be successfully transmitted. Virtual machine/persona 320 then displays a warning message to the user indicating that one or more recipients are not known to the persona associated with virtual machine/persona 320, and requests that the user create a contact associated with the unknown recipient's email address. The user can then proceed based one of the following options. The user can create a contact associated with the unknown recipient, at which point safety net 330 allows communication 325 to be successfully transmitted. The user can also refuse to create a contact associated with the unknown recipient, and confirm that communication 325 is to be transmitted. Upon confirmation from the user, safety net 330 allows communication 325 to be successfully transmitted. The user can also cancel the transmission of communication 325. Upon cancellation, virtual machine/persona 320 deletes communication 325. In an alternate embodiment, upon cancellation, virtual machine/persona 320 archives communication 325. If communication 325 contains one or recipients that are not known to the persona associated with virtual machine/persona 320, and are known to one or more other personas within the covert application, virtual machine/persona 320 also displays a second warning message to the user indicating that the recipient is known to one or more other personas within the covert application. The user can then proceed based one of the options described above. In certain embodiments, safety net 330 can allow a user to ignore the warnings displayed to the user and allow the successful transmission of communication 325. In other embodiments, safety net 330 can lock down the warnings that are displayed to the user on a customer-basis or user-level-basis which prevents the user from overriding the warnings displayed by safety net 330.

Another type of rule is a cultural rule. When safety net 330 analyzes communication 325 based on a cultural rule, safety net 330 analyzes text of communication 325 to determine if the text is consistent with one or more cultural norms associated with the persona. For example, if the persona is located in a country that utilizes the metric system, such as Australia, safety net 330 can analyze text of communication 325 to determine if any text corresponding to measurements is consistent with the metric system. According to the embodiment, safety net 330 can utilize a database that include one or more words and that is customized for the persona, in order to analyze text of communication 325. If communication 325 does not include any words that is inconsistent with the one or more cultural norms associated with the persona, then communication 325 complies with the cultural rule, and safety net 330 allows communication 325 to be successfully transmitted. If communication 325 includes one or more words that is inconsistent with the one or more cultural norms associated with the persona, then communication 325 does not comply with the cultural rule, and safety net 330 does not allow communication 325 to be successfully transmitted. Virtual machine/persona 320 then displays a warning message to the user indicating that communication 325 includes one or more words that is inconsistent with the one or more cultural norms associated with the persona, and indicates the one or more inconsistent words. In one embodiment, virtual machine/persona displays the text of communication 325 with the one or more inconsistent words highlighted in a color, such as red, or with the one or more inconsistent words underlined. The user can then proceed based one of the following options. The user can confirm that communication 325 is to be transmitted with the one or more inconsistent words. Upon confirmation from the user, safety net 330 allows communication 325 to be successfully transmitted. The user can also cancel the transmission of communication 325. Upon cancellation, virtual machine/persona 320 deletes communication 325. In an alternate embodiment, upon cancellation, virtual machine/persona 320 archives communication 325. The user can also correct one, some, or all of the one or more words. Upon correction, safety net 330 allows communication 325 to be successfully transmitted.

Another type of rule is a persona rule. When safety net 330 analyzes communication 325 based on a persona rule, safety net 330 analyzes text of communication 325 to determine if the text is consistent with information associated with the persona. For example, if the persona is associated with the French government, text relating to the U.S. government may be inappropriate and can be flagged by safety net 330. If communication 325 does not include any text that is inconsistent with information associated with the persona, then communication 325 complies with the persona rule, and safety net 330 allows communication 325 to be successfully transmitted. If communication 325 includes text that is inconsistent with the information associated with the persona, then communication 325 does not comply with the persona rule, and safety net 330 does not allow communication 325 to be successfully transmitted. Virtual machine/persona 320 then displays a warning message to the user indicating that communication 325 includes text that is inconsistent with the information associated with the persona, and indicates the text. In one embodiment, virtual machine/persona displays the text of communication 325 with the inconsistent text highlighted in a color, such as red, or with the inconsistent text underlined. The user can then proceed based one of the following options. The user can confirm that communication 325 is to be transmitted with the inconsistent text. Upon confirmation from the user, safety net 330 allows communication 325 to be successfully transmitted. The user can also cancel the transmission of communication 325. Upon cancellation, virtual machine/persona 320 deletes archives communication 325. In an alternate embodiment, upon cancellation, virtual machine/persona 320 archives communication 325. The user can also correct the inconsistent text. Upon correction, safety net 330 allows communication 325 to be successfully transmitted.

Covert Application Modules

Figure 4:
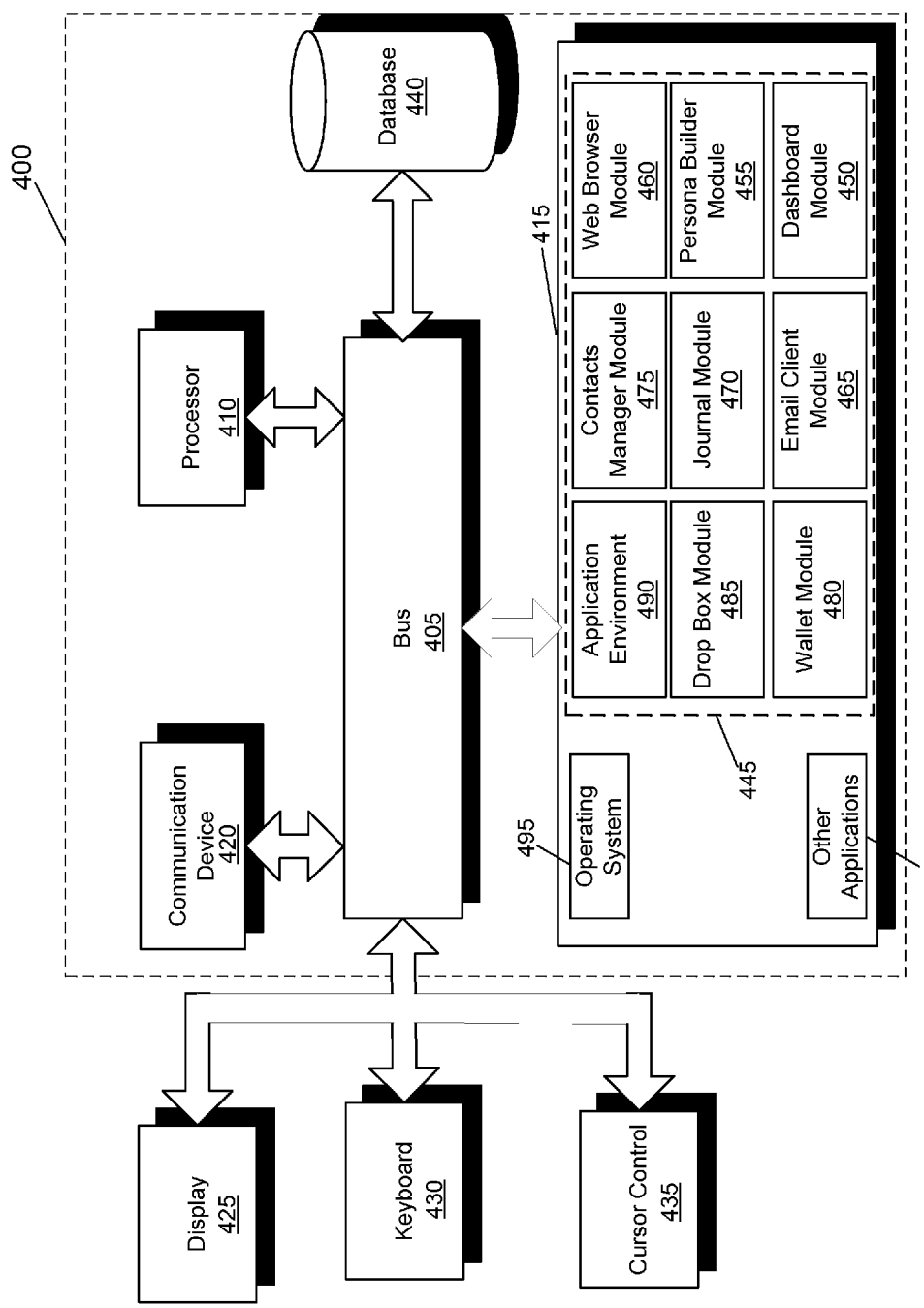
FIG. 4 illustrates a block diagram of an apparatus in accordance with an embodiment of the invention.

FIG. 4 illustrates a block diagram of an apparatus 400 in accordance with an embodiment of the invention. As is described below in greater detail, apparatus 400 includes a covert application, where the covert application includes one or more separate modules.

According to the embodiment, apparatus 400 includes a bus 405 or other communications mechanism for communicating information between components of apparatus 400. Apparatus 400 also includes a processor 410, operatively coupled to bus 405, for processing information and executing instructions or operations. Processor 410 may be any type of general or specific purpose processor. Apparatus 400 further includes a memory 415 for storing information and instructions to be executed by processor 410. Memory 415 can include any combination of random access memory (RAM), read only memory (ROM), static storage such as a magnetic or optical disk, or any other type of machine or computer-readable medium. Apparatus 400 further includes a communication device 420, such as a network interface card or other communications interface, to provide access to a network. As a result, a user may interface with apparatus 400 directly, or remotely through a network or any other method.

A computer-readable medium may be any available medium that can be accessed by processor 410. A computer-readable medium may include both a volatile and nonvolatile medium, a removable and non-removable medium, and a storage medium. A storage medium may include RAM, flash memory, ROM, erasable programmable read-only memory (EPROM), electrically erasable programmable read-only memory (EEPROM), registers, hard disk, a removable disk, a compact disk read-only memory (CD-ROM), or any other form of storage medium known in the art.

Processor 410 can also be operatively coupled via bus 405 to a display 425, such as a Liquid Crystal Display (LCD). Display 425 can display information to the user. A keyboard 430 and a cursor control device 435, such as a computer mouse, can also be operatively coupled to bus 405 to enable the user to interface with apparatus 400.

Processor 410 can also be operatively coupled via bus 405 to a database 440. Database 440 can store data in an integrated collection of logically-related records or files. Database 440 can be an operational database, an analytical database, a data warehouse, a distributed database, an end-user database, an external database, a navigational database, an in-memory database, a document-oriented database, a real-time database, a relational database, an object-oriented database, a NoSQL database (such as a MongoDB database) or any other database known in the art. In certain embodiments, database 440 can be dynamically scalable. Also, in certain embodiments, apparatus 400 can includes a plurality of databases (such as database 440), where at least one database is a NoSQL database (such as a MongoDB database).

According to one embodiment, memory 415 can store covert application 445 that may provide functionality when executed by processor 410. Covert application 445 can provide various functionality for assisting in covert cyber operations, as is described below in greater detail. In one embodiment, covert application 445 of FIG. 4 is similar to covert application 140 of FIG. 1, covert application 210 of FIG. 2, and covert application 310 of FIG. 3.

Covert application 445 can include one or more modules that may each provide specific functionality when executed by processor 410. The one or more modules can include a dashboard module 450, a persona builder module 455, a web browser module 460, an email client module 465, a journal module 470, a contacts manager module 475, a wallet module 480, and a drop box module 485.

Dashboard module 450 can provide a user with an overview of all personas created within covert application 445. Persona builder module 455 can allow a user to create one or more personas, or customize a persona that has already been created, within covert application 445. Web browser module 460 can allow a user to securely browse the Internet using covert application 445, and provides additional functionality geared toward covert cyber operations. Email client module 465 can provide email functionality for one or more personas within covert application 445, where the email functionality includes a safety net designed to catch common mistakes made by a user, and resolve any potentially suspicious or incorrect elements of a persona's composed email. Journal module 470 can allow a user to collect, sort, tag, and create notes and other information relating to a specific persona from across the modules of covert application 445. Contacts manager module 475 can store information regarding contacts of one or more personas with covert application 445. Wallet module 480 can collect information regarding a persona and store the persona information in a centrally organized location within covert application 445. Drop box module 485 can provide a quarantined area that includes various security processes which determine if a file is safe to move through covert application 445. The functionality of the modules described here and illustrated in FIG. 4 is described below in greater detail.

In an embodiment, the one or more modules can also include application environment 490. Application environment 490 can provide an environment from which to launch one or more of the modules previously described. The functionality of application environment 490 is described below in greater detail.

According to the embodiment, memory 415 can also store operating system 495. Operating system 495 can provide an operating system functionality for apparatus 400. In one embodiment, apparatus 400 can also be part of a larger system. Thus, memory 415 can also store one or more additional applications 499 to include additional functionality for an overall system that apparatus 400 can be a part of.

In an example embodiment, an additional application of additional applications 499 can be an administrative application (not shown in FIG. 4). According to the example embodiment, the administrative application can provide administrative functionality to one or more users. For example, the administrative application can control or modify a deployment of a covert application, such as covert application 445. One example is user management, where the administrative application can allow a user to add, modify, or remove users from convert application 445, can allow the user to add, modify, or remove one or more permissions associated with a user of covert application 445, and can allow the user add, modify, or remove one or more roles associated with a user of covert application. Another example is session management, where the administrative application can allow a user to view session information, such as when a user logged into a session, and a duration of how long a user has been logged into a session. Another example is dynamic geosite allocation, where the administrative application can allow a user to dynamically allocate one or more geosites. Such dynamic allocation can include adding, modifying, or removing one or more geosites. Another example is license management. According to an embodiment, there can be multiple types of covert applications, such as covert application 445, where each type of covert application can include different subsets of features of the covert application. In one example, there can be three types of covert applications. The first type of covert application includes the full functionality of the covert application described herein. The second type only includes the persona functionality and the geosite functionality described herein. The third type only includes the geosite functionality of the covert application described herein. According to the embodiment, the administrative application can manage which type of covert application is currently being deployed.

In another example embodiment, an additional application of additional applications 499 can be a workflow management application (not shown in FIG. 4). According to the example embodiment, the workflow management application allows a user to define one or more ticket types, and to define a specific workflow for each ticket type, where the workflow includes one or more steps performed by covert application 445. The user can then create one or more instances of tickets, where each ticket is of a specific ticket type, and each ticket instance can be associated with data stored within covert application 445. The workflow for each ticket type can be adjusted at any point during the execution of covert application 445.

As readily appreciated by one of ordinary skill in the art, covert application 445 can include one of, some of, or all of, the modules described here and illustrated in FIG. 4. Thus, the embodiment illustrated in FIG. 4 is an example embodiment, and in alternate embodiments, covert application 445 can include fewer modules than the modules illustrated in FIG. 4, and still be within the scope of the invention. In certain embodiments, covert application 445 can be split into a plurality of covert applications, where each covert application can be executed on a separate apparatus (such as apparatus 400).

Covert Application Environment

Figure 5:
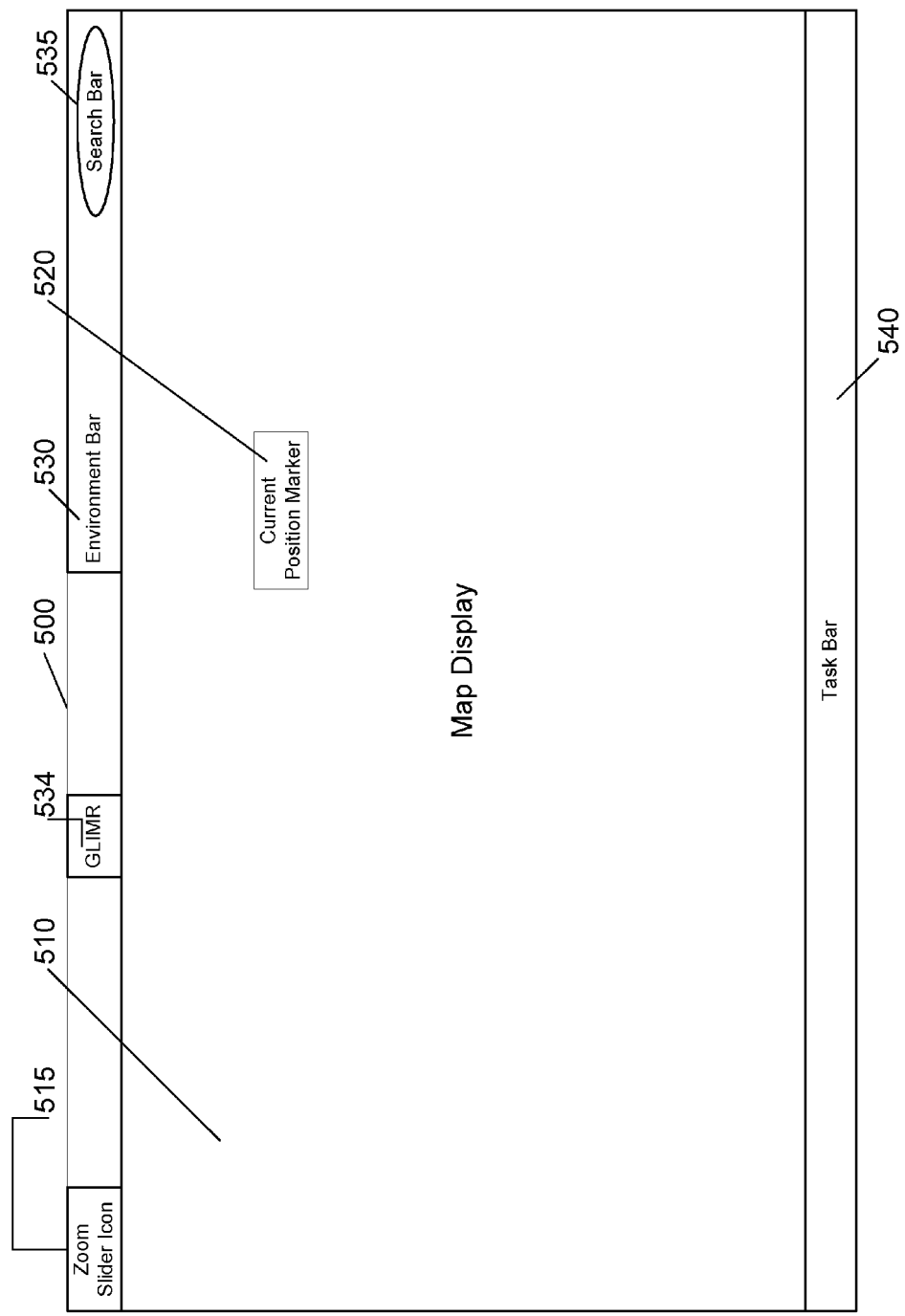
FIG. 5 illustrates an example user interface of an application environment, where an application environment is a component of a covert application, according to an embodiment of the invention.

FIG. 5 illustrates an example user interface 500 of an application environment (such as application environment 490 of FIG. 4), where the application environment is a component of a covert application, according to an embodiment of the invention. Application environment user interface 500 provides a user an environment from which to launch one or more of the modules previously described. Furthermore, application environment user interface 500 provides a number of features directed to conducting covert cyber operations. In one embodiment, application environment user interface 500 can be accessed by a user when a user is associated with a persona. In this embodiment, application environment user interface 500 is displayed from the perspective of the persona. Thus, the modules available to the user within application environment user interface 500 are configured based on the persona. In another embodiment, application environment user interface 500 can be accessed by a user when the user is not associated with a persona. In this embodiment, the modules available to the user within application environment user interface 500 are a set of default modules that are available to any user.

According to the embodiment, application environment user interface 500 can include map display 510, current position marker 520, environment bar 530, and task bar 540. Map display 510 is a display of a geospatial visualization system. The geospatial visualization system can display a real-time visualization of geospatial data to a user. For example, as a user operates the covert application, certain actions, such as browsing to a website on the Internet, can generate a geospatial event. When a geospatial event is generated, map display 510 can automatically pan and zoom to focus on the location of the geospatial event. For example, when a user browses to a website, map display 510 can automatically geolocate an Internet Protocol (IP) address of the website, plot a marker on map display 510 and pan and zoom map display 510 to focus on the marker. Furthermore, according to the embodiment, a user can pan map display 510 by "clicking" on any portion of map display 510 (for example with a mouse) and dragging (the mouse, for example) within map display 510. Zooming in and out of map display 510 can be accomplished by dragging zoom slider icon 515 displayed within map display 510. Map display 510 can also provide a history of geospatial events that have occurred during a session of the covert application. Current position marker 520 is a marker displayed on map display 510 that indicates a locale (i.e., location where a persona is purported to be located), when a user is associated with the persona. As previously discussed, the locale indicated by current position marker 520 is also a locale from which network traffic generated by the covert application appears to originate. When the covert application associates the user with a different persona, or when the covert application changes a current locale of the persona associated with the user, current position marker 520 automatically moves to the new locale displayed on map display 510. In one embodiment, map display 510 also displays additional status information around current position marker 520. Such status information can include an IP address of the geosite associated with the new locale. Map display 510 can display multiple items in a single location within map display 510 using multiple markers.

Environment bar 530 is a bar displayed within application environment user interface 500, and provides a heads-up display (HUD) for the user. The HUD displays persona information, which can include the persona associated with the user, location, time, weather, and regional information, when a user is associated with a persona. This persona information can provide the user with basic situational awareness of the persona that the user is associated with. According to the embodiment, environment bar 530 can allow a user to switch the current persona's locale (i.e., the purported physical location of the persona), which is also associated with the geosite (i.e., the egress point from which network traffic generated by the covert application will appear to originate). In accordance with the embodiment, environment bar 530 automatically updates its HUD for the user once a user changes the current persona's locale, so that the HUD displays appropriate information based on the new locale of the current persona.

Environment bar 530 can also display a global identity management reference (GLIMR) 534. GLIMR 534 is a collection of Internet information stored within the covert application (i.e., within a persistent storage or database) that can provide a comprehensive guide to Internet trends, usage, social norms, and popular sites and services for a variety of regions around the world. Such Internet information can include social norms of Internet usage, Internet penetration, rankings of email, social networking, and media sharing websites, all organized by specific region. Such information can also include how people in a region use the Internet, and region-specific requisites for specific websites, also organized by specific region.

GLIMR 534 can be displayed to the user regardless of whether the user is associated with a persona. Upon "clicking" on GLIMR 534, application environment user interface 500 can display a formatted web page, where the web page includes the information stored within GLIMR 534. According to the embodiment, if the user is associated with a persona, the information stored GLIMR 534 can be filtered to display information that is associated with a region containing the current persona's locale. However, in any embodiment, the user can use the web page to query any information stored within GLIMR 534.

Furthermore, in one embodiment, GLIMR 534 can be utilized to present, to the user associated with a persona, one or more default options that are appropriate to a region containing the current persona's locale. These one or more default options can be provided when the user utilizes one or more of the modules of the covert application. Furthermore, GLIMR 534 can also be utilized to present information corresponding to the one or more default options. For example, when a user utilizes a web browser module (described below in greater detail) to access an Internet search engine, GLIMR 534 can be utilized to present to the user, as default options, one or more Internet search engines that are appropriate for the region containing the current persona's locale. As another example, when a user utilizes a persona builder module (described below in greater detail) to add a social networking service account for a persona, GLIMR 534 can be utilized to present to the user, as default options, the top social network service websites for the region containing the persona's locale. Is these examples, GLIMR 534 can also be utilized to present to the user information corresponding to the default options (e.g., Internet search engines or social network service websites). Such information can include, for example, specific requisites for utilizing the default options (e.g., Internet search engines or social network service websites).

Environment bar 530 can also display a global search bar 535. Global search bar 535 can provide a full-text search across all of the personas' information within the covert application.

Task bar 540 is a bar displayed within application environment user interface 500, and allows a user to initiate one or more modules of the covert application, as previously described. According to the embodiment, each module has a corresponding icon displayed within task bar 540. A module that is already open can have a small blue dot beneath its icon. According to an embodiment, the available modules displayed within task bar 540 can be customized based on one or more roles that are granted to a user.

In one embodiment, the available modules represented by the icons displayed within task bar 540 can be divided into two categories: in-persona modules and out-of-persona modules. In-persona modules are modules that provide functionality that allow a user to perform actions that are consistent with the persona that the user is associated with. Such actions can include, for example, transmitting an email message and browsing a social networking service website. According to the embodiment, in-persona modules generate network traffic that appears to originate from a location that matches a locale of the persona, by configuring network environment attributes within the covert application, as previously described. Out-of-persona modules are modules that provide functionality that allow a user to perform actions that may not be consistent with the persona that the user is associated with. Such actions can include, for example, geocoding a specific location, performing an online translation, or receiving driving directions from a website. Because the actions may not be consistent with the persona that the user is associated with, out-of-persona modules generate network traffic that appears to originate from a random location that is not associated with the persona, by configuring network environment attributes within the covert application, as previously described. Thus, according to the embodiment, the actions performed by the out-of-persona modules can not be traced back to the user associated with the persona.

The covert application can utilize one or more performance optimizations, such as memory optimizations, to enhance the execution of the covert application, such as causing the covert application to execute more quickly, and increasing the stability of the covert application. The one or more modules of the covert application can also utilize pagination to enhance the execution of the covert application. In certain embodiments, the one or more modules of the covert application can be split out into separate windows, or separate applications.

One of ordinary skill in the art would readily appreciate that the user interface illustrated in FIG. 5, and other user interfaces illustrated in FIGS. 5-17 and 21-29 are merely example user interfaces according to respective example embodiments. Furthermore, one of ordinary skill in the art would also readily appreciate that, in alternate embodiments, these user interfaces may have a different format and/or appearance, and still be within the scope of the invention.

Dashboard

According to an embodiment, the covert application can provide a dashboard module (such as dashboard module 450 of FIG. 4), which can provide a user an overview of all personas created within the covert application, including active persons and archived personas. More specifically, the dashboard module can provide a centralized view of information regarding personas, such as persona usage, messaging, calendar events, and contacts.

In one embodiment, the dashboard module can allow a user to edit and view contacts for all personas created within the covert application. In addition, according to the embodiment, the dashboard module can allow a user to read new email messages, view upcoming calendar events, and view known contacts across multiple personas, all from a single user interface.

Furthermore, in an embodiment, the dashboard module can allow a user to "archive" a persona. Archiving a persona refers to removing the persona from a list of active personas displayed by the dashboard module, but retaining all the information that makes up the persona within the covert application. According to the embodiment, the dashboard module can also provide an entry point into a persona builder module, which is a module used to create one or more personas. The persona builder module is described below in greater detail.

Figure 6:
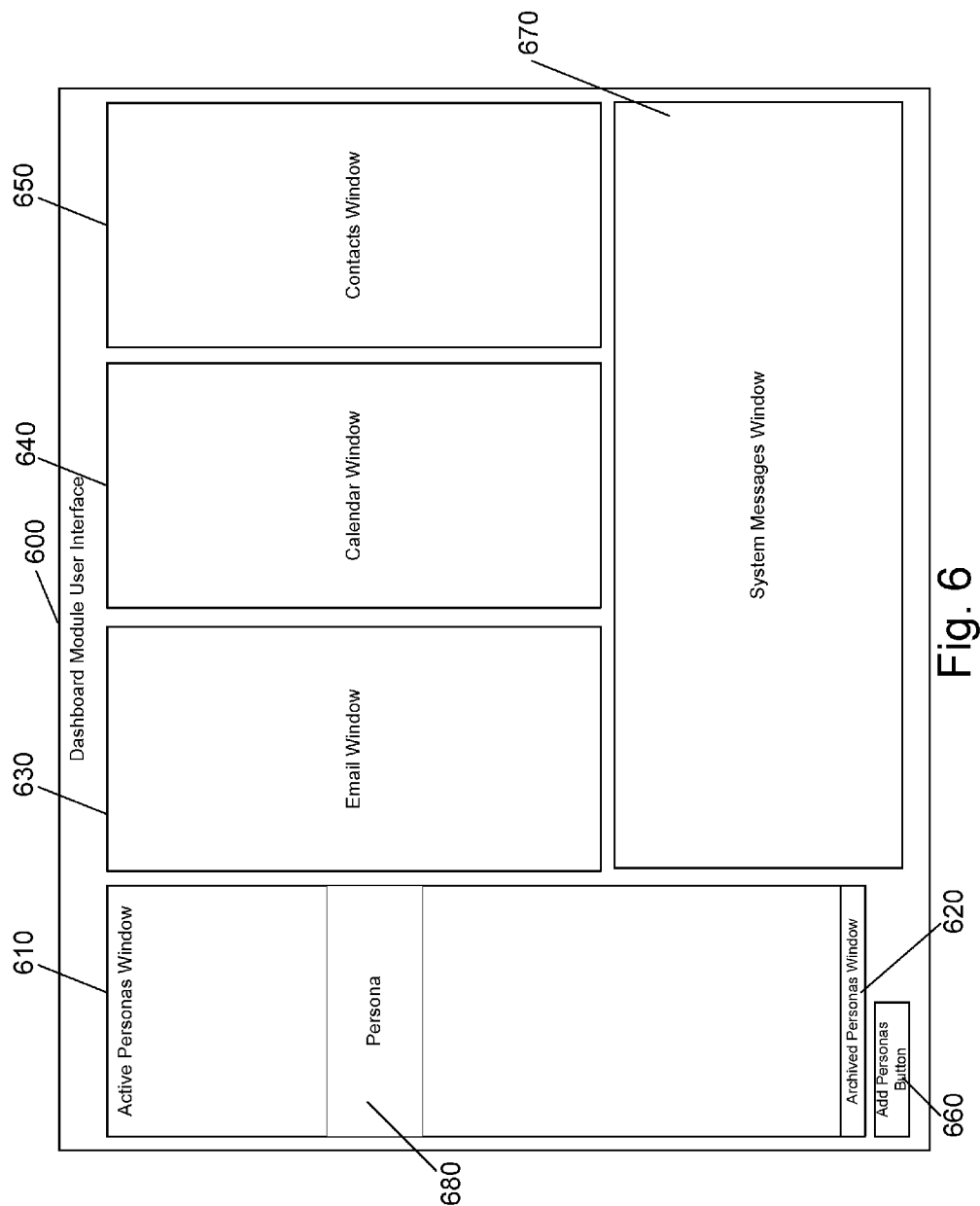
FIG. 6 illustrates an example user interface of a dashboard module, where the dashboard module is a component of a covert application, according to an embodiment of the invention.

FIG. 6 illustrates an example user interface 600 of a dashboard module, where the dashboard module is a component of a covert application, according to an embodiment of the invention. Dashboard module user interface 600 provides a cross-reference view of information for all active personas, such as email, calendar entries, and contacts, without the requirement of activating a persona. According to the embodiment, dashboard module user interface 600 includes active personas window 610, archived personas window 620, email window 630, calendar window 640, contacts window 650, add personas button 660, and system messages window 670.

Active personas window 610 displays a global list of one or more active personas created within the covert application, and serves as an entry point for each active persona. An active persona is a persona, that has been created, and, in general, is being used for one or more covert cyber operations. In one embodiment, active personas window 610 can also display information associated with each active persona. Such information can include a persona identifier, a geosite, and a date and time. A persona identifier is a label for an active persona, and can be customized using the wallet module, which is described below in greater detail. A geosite is the last geosite that the active persona used for online communications. A date and time is the date and time that the active persona was last activated.

Archived personas window 620 displays a global list of one or more archived personas within the covert application. An archived persona is a persona that has been created, but is not currently being used for one or more covert cyber operations. An active persona can be archived, by transferring the active persona from the global list of one or more active personas displayed within active personas window 610 to the global list of one or more archived personas displayed within archived personas window 620. Similarly, an archived persona can be reactivated, by transferring the archived persona from the global list of one or more archived personas displayed within archived personas window 620 to the global list of one or more active personas displayed within active personas window 610.

Email window 630 displays a global list of all emails for all active personas within the covert application. In one embodiment, the emails are categorized by active persona. By "clicking" on a persona within email window 630, email window 630 can display a list of unread emails that are associated with the persona. In certain embodiments, email window 630 can display a partial list of emails for some or all active personas, rather than a global list of all emails for all active personas. Also, in these embodiments, by "clicking" on a persona within email window 630, email window 630 can display a partial list of unread emails that are associated with the persona. In certain embodiments, when an email is displayed within email window 630, any automatic hypertext markup language ("HTML") loading is turned off, so that the email is displayed within a text-based format.

Calendar window 640 displays a global list of calendar entries for all active personas within the covert application. Each calendar entry can include an event, an active persona associated with the event, and a location associated with the event.

Contacts window 650 displays a global list of contacts for all active personas within the covert application. In one embodiment, the contacts are categorized by active persona. By "clicking" on a persona within contacts window 650, contacts window 650 can display a list of contacts that are associated with the active persona. In certain embodiments, contacts window 650 can only display a list of contacts related to one or more personas that are accessible to a current user as well as one or more unassociated contacts. This can enhance security by preventing the display of information that the current user does not have access to.

Add personas button 660 initiates a persona builder module, which is described below in greater detail. A user can initiate a process of creating a persona by "clicking" on add personas button 660.

System messages window 670 displays a global list of system messages across all active personas within the covert application. In one embodiment, system messages include notification messages about persona communications within the covert application, such as error messages.

Persona 680 represents one of the active personas displayed within active personas window 610. By "double-clicking" on persona 680, the user can cause the covert application to activate persona 680. According to the embodiment, activating persona 680 includes configuring environment attributes for persona 680, as previously described in relation to FIG. 2. As previously described in relation to FIG. 2, this environment configuration can include configuring network environment attributes, configuring operating system environment attributes, and configuring application environment attributes.

Persona Builder

According to an embodiment, the covert application can provide a persona builder module (such as persona builder module 455 of FIG. 4), which can allow a user to create one or more personas, or customize a persona that has already been created. More specifically, the persona builder module can provide a setup wizard within the covert application that can be used to create one or more personas, or customize a persona that has already been created. The persona builder module can also allow a user to associate a persona with a specific locale based on the persona's country or region of interest. As previously described, by selecting a specific locale, a specific geosite is also selected, and the covert application configures environment attributes associated with the persona, which includes configuring network environment attributes for the persona, so that network traffic generated by the covert application appears to originate from the selected geosite. Through configuring the environment attributes associated with the persona, the covert application also configures operating system environment attributes and application environment attributes (such as browser environment attributes) for the persona, as previously described. This results in operating system environment attributes (such as operating system version, time zone, and language), and application environment attributes (such as cookies) that are specifically configured for the persona, and the persona's specific locale.

In addition, the persona builder module can also allow a user to integrate one or more Internet service accounts, such as social networking service accounts and email service accounts to a persona that is being created by the persona builder module. In one embodiment, the persona builder module can utilize a GLIMR, previously described above, in order to provide one or more default options for Internet services, based on the locale associated with the persona.

In one embodiment, the persona builder module can guide a user through creating a persona, and establishing the persona's digital presence on the Internet. As previously described, the persona builder module can integrate information about Internet usage statistics, social norms, websites and Internet services from a GLIMR, in order to assist the creation of a persona. According to the embodiment, the information from the GLIMR is categorized and presented based on the region containing the locale associated with the persona. In another embodiment, the persona builder module can provide a questionnaire to the user, in which the user fills out the details of the desired persona. In this embodiment, an offline support team can create the persona, and establish the persona's online presence based on the questionnaire.

According to an embodiment, when creating a persona using the persona builder module, a user can select a locale from which the persona will operate, provide identifying information associated with the persona, and establish an Internet presence for the persona. The selection of the locale from which the persona will operate, determines a geosite from which network traffic generated by the covert application will appear to originate from. An initial locale that is selected for the persona can be set as a "default locale." When a persona is activated for the first time, network traffic associated with the persona will appear to originate from the default locale.

Furthermore, when creating a persona using the persona builder module, a user can select one or more Internet services relevant to the locale of the persona. As previously described, a GLIMR can help the user select appropriate Internet services for the persona by providing one or more default options that are appropriate for the region that includes the locale of the persona. In one embodiment, once a user selects an Internet service, the persona builder module can navigate to the sign up page for the service, and display it to the user. According to the embodiment, the persona builder module also presents a screen that collects relevant information so that the covert application can automatically interface with the Internet service without input from the user.

After the user has selected a locale from which the persona will operate, provided identifying information associated with the persona, and established an online presence for the persona, the user can finalize the persona. Finalizing the persona includes promoting the persona from being "in progress" to being an "active" persona that appears in an active persona window displayed by a dashboard module, as previously described.

Figure 7:
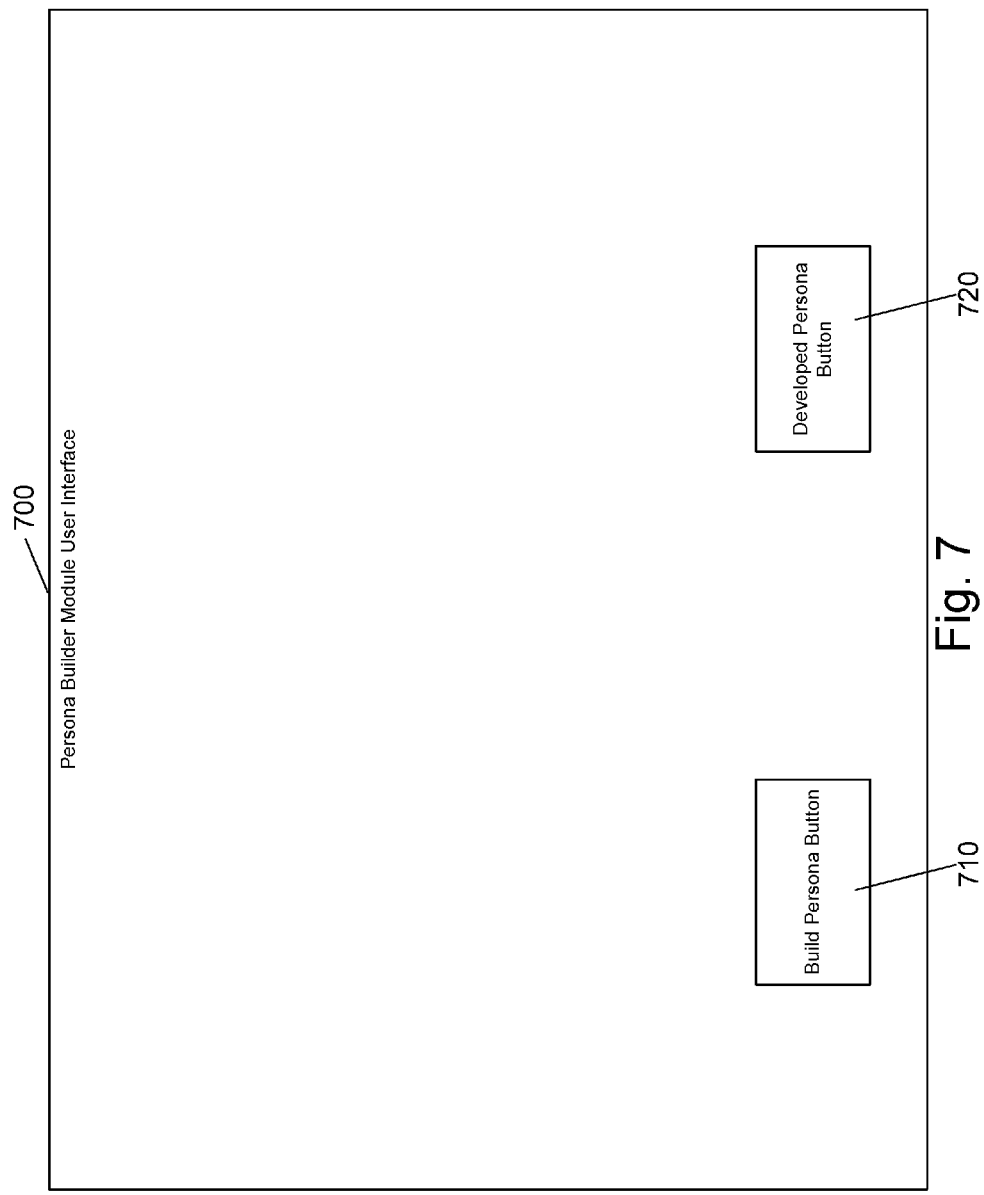
FIG. 7 illustrates an example user interface of a persona builder module, where the persona builder module is a component of a covert application, according to an embodiment of the invention.

FIG. 7 illustrates an example user interface 700 of a persona builder module, where the persona builder module is a component of a covert application, according to an embodiment of the invention. Persona builder module user interface 700 provides a user with two options for building a persona. The first option can be initiated by "clicking" build persona button 710. As previously described, the first option involves the persona builder module guiding a user through creating a persona, and establishing the persona's online presence. The second option can be initiated by "clicking" developed persona button 720. As previously described, the second option involves the persona builder module providing a questionnaire to the user, in which the user fills out the details of the desired persona, where an offline support team create the persona, and establishes the persona's online presence, based on the questionnaire.

Figure 8:
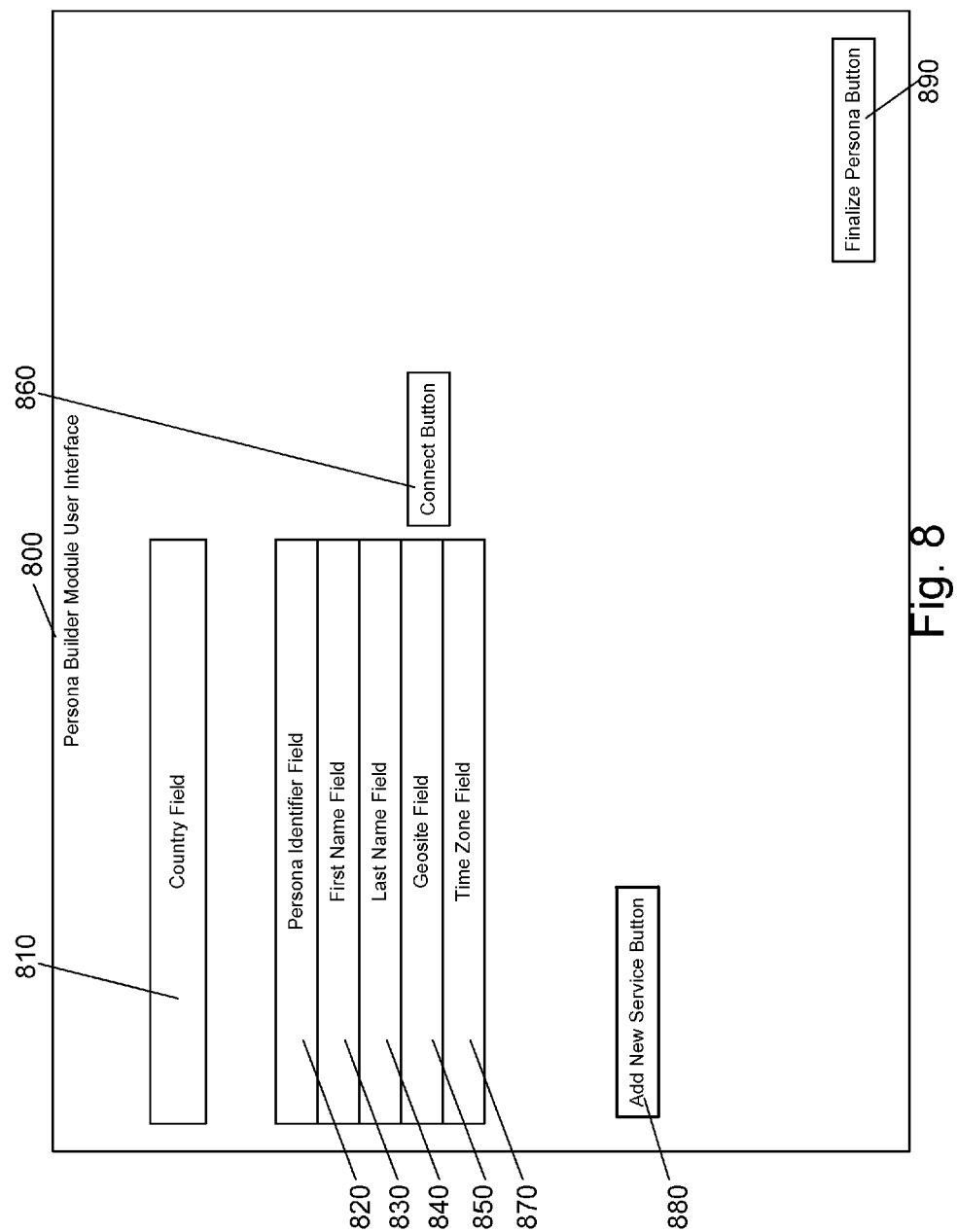
FIG. 8 illustrates another example user interface of a persona builder module, where the persona builder module is a component of a covert application, according to an embodiment of the invention.

FIG. 8 illustrates another example user interface 800 of a persona builder module, where the persona builder module is a component of a covert application, according to an embodiment of the invention. Persona builder module user interface 800 can be displayed when a user "clicks" on build person button 710 displayed within persona builder module user interface 700, as illustrated in FIG. 7.

According to the embodiment, persona builder module user interface 800 displays country field 810. Country field 810 includes a drop-down box listing one or more countries. The user can select one of the countries from the drop-down box of country field 810. The selecting of a country identifies a country that is associated with the persona. Persona builder module user interface 800 also displays persona identifier field 820. The user can enter a persona identifier at persona identifier field 820. A persona identifier is a unique title associated with the persona. Persona builder module user interface 800 also displays first name field 830 and last name field 840. The user can enter a first name at first name field 830 and a last name at last name field 840. The first name and last name are the first name and last name associated with the persona.

Persona builder module user interface 800 also displays geosite field 850. Geosite field 850 includes a drop-down box listing one or more geosites. The drop-down box that lists one or more geosites is based on the country selected for country field 800. Upon selecting a geosite, a user can "click" connect button 860 in order to connect to the selected geosite. Persona builder module user interface 800 also displays time zone field 870. A value for time zone field 870 automatically is entered based on the selected geosite for geosite field 850.

Persona builder module user interface 800 also displays add new service button 880 and finalize persona button 890. By "clicking" add new service button 880, a user can associate one or more Internet services with the persona. This is described below in greater detail in relation to FIG. 9. In one embodiment, when a user "clicks" add new service button 880, the persona builder module can utilize a GLIMR to provide one or more default Internet service options based on a region that includes the locale associated with the persona. The user can then select one of the one or more default Internet service options before proceeding to a user interface for associating the selected Internet service with the persona, as is described below in greater detail in relation to FIG. 9. By "clicking" finalize persona button 890, the covert application can create the persona within the covert application, and cause the persona to appear in an active persona window displayed by a dashboard module, as previously described.

Figure 9:
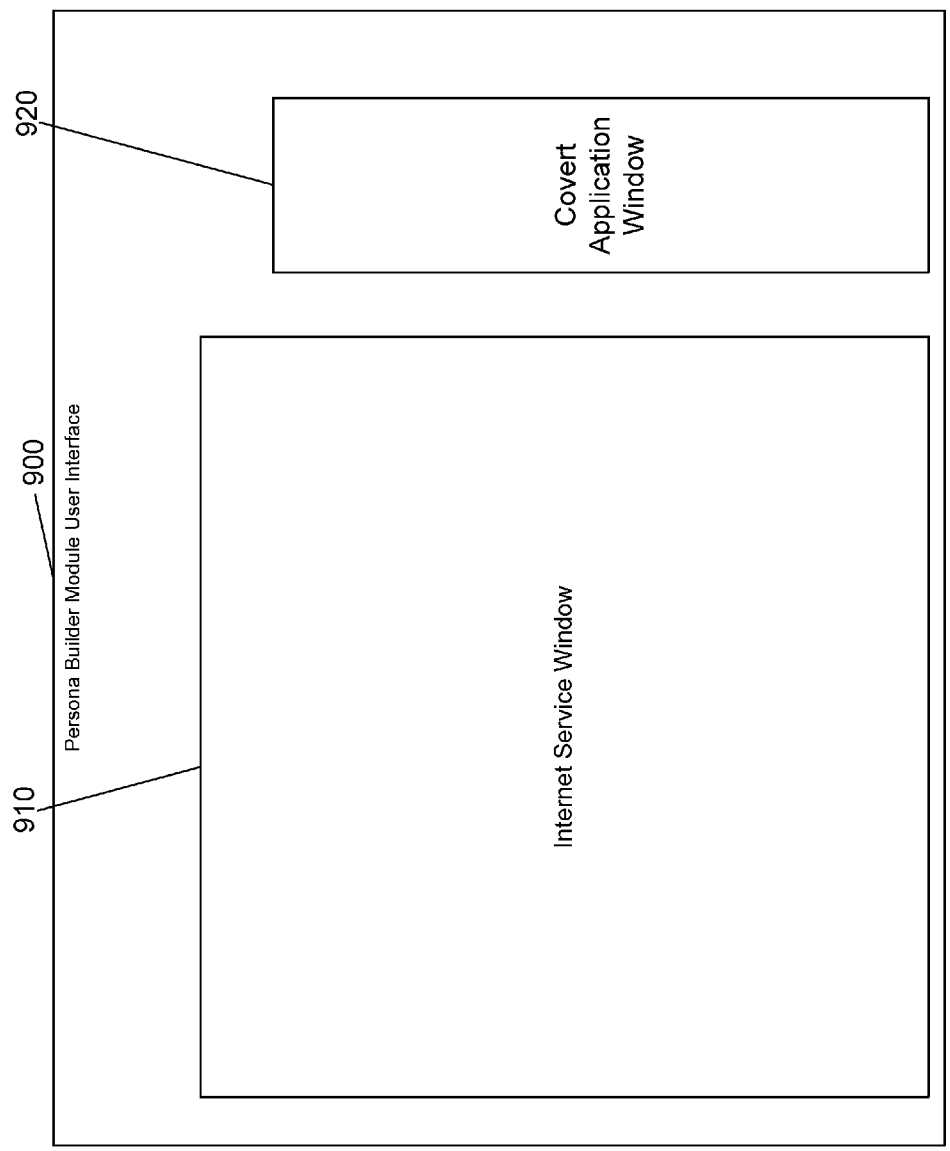
FIG. 9 illustrates another example user interface of a persona builder module, where the persona builder module is a component of a covert application, according to an embodiment of the invention.

FIG. 9 illustrates another example user interface 900 of a persona builder module, where the persona builder module is a component of a covert application, according to an embodiment of the invention. Persona builder module user interface 900 is an example user interface for associating an Internet service with the persona. According to the illustrated embodiment, persona builder module user interface 900 includes Internet service window 910. Internet service window 910 displays an actual Internet website used by the Internet service for signing up to the Internet service. Within Internet service window 910, a user can enter signup information that corresponds to the user's persona. Signup information can include, for example, a login, a password, first name, last name, address, and email address. In accordance with the illustrated embodiment, persona builder module user interface 900 also includes covert application window 920. Covert application window 920 displays fields which mirror the fields displayed within Internet service window 910. By entering the signup information within the fields of covert application window 920, a user can allow the covert application to automatically interface with the Internet service without input from the user.

Web Browser

According to an embodiment, the covert application can provide a web browser module (such as web browser module 460 of FIG. 4), which can allow a user to securely browse the Internet by browsing one or more web pages. By browsing a web page, the web browser module retrieves and displays the web page within a user interface of the covert application. According to the embodiment, the web browser module can provide additional functionality geared toward covert cyber operations. More specifically, the web browser module can automatically store all web pages that are browsed in a database within the covert application, where each web page is full-text indexed and forensically hashed. The web browser module can also configure browser environment attributes. More specifically, the web browser module can alter identifiers of browser attributes, such as one or more cookies, one or more local shared objects, cache, one or more bookmarks, a web browser language, and a web browser version. Furthermore, the web browser module can allow a user to "clip" specific web pages for future reference. Additionally, the web browser module can identify a geographic location associated with a Uniform Resource Locator (URL) that a user enters into the web browser module. In addition, the web browser module can provide translation functionality that can translate a website that is written in an origination language into a destination language. Furthermore, the web browser module can utilize a GLIMR to provide, as default options, one or more Internet search engines that are appropriate for the region containing the persona's locale. Together, these features can significantly automate and enhance the collection of Internet information, as well as eliminate risks such as cookie cross-contamination that can plague traditional cyber operations. In certain embodiments, the web browser module can simply delete identifiers of browser attributes, such as one or more cookies, one or more local shared objects, cache, one or more bookmarks, a web browser language, and a web browser version, rather than alter these browser attributes. In certain embodiments, the web browser module can alter bookmarks and history information for a web browser as well as any hypertext transfer protocol (HTTP) header properties.

Figure 10:
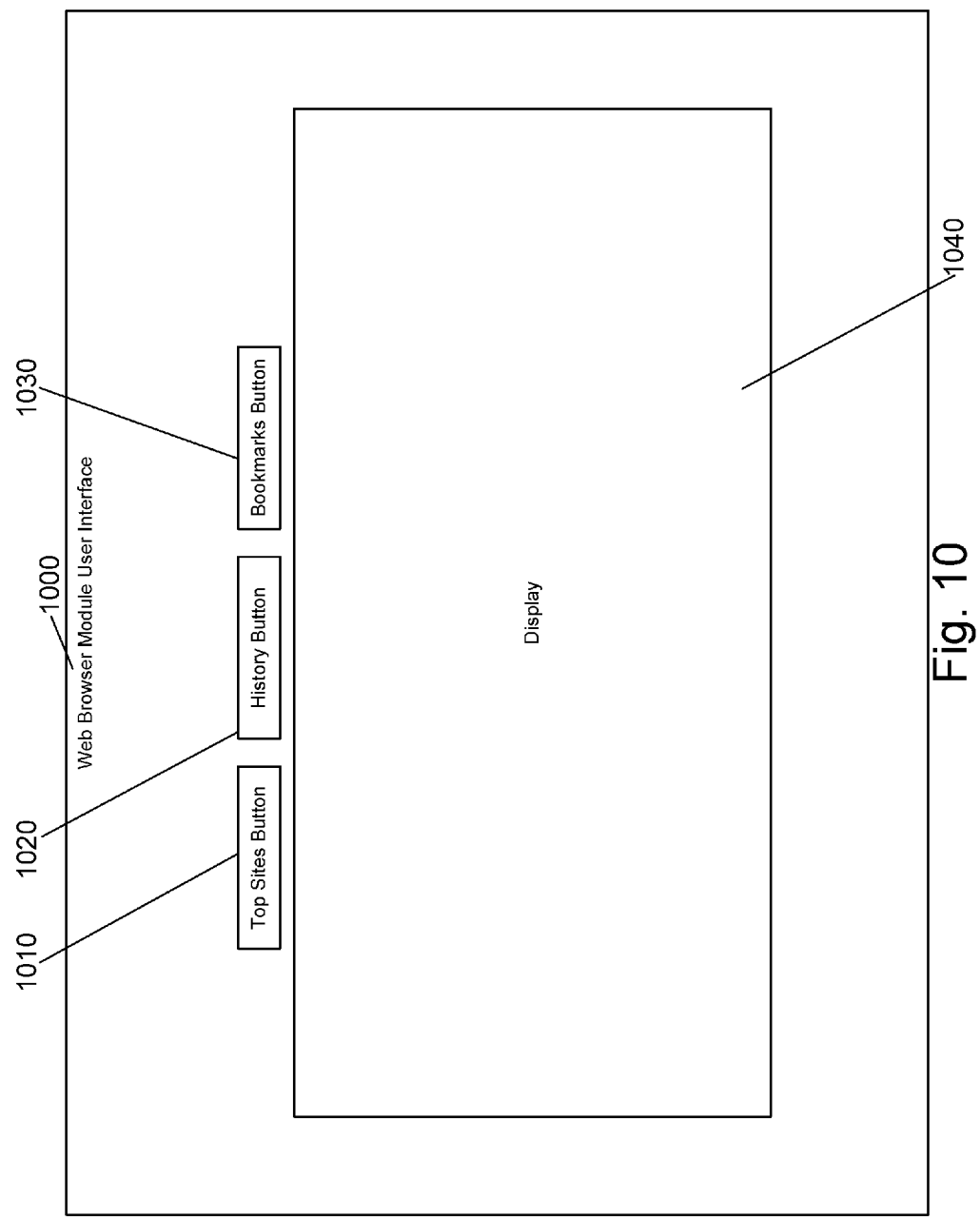
FIG. 10 illustrates an example user interface of a web browser module, where the web browser module is a component of a covert application, according to an embodiment of the invention.

FIG. 10 illustrates an example user interface 1000 of a web browser module, where the web browser module is a component of a covert application, according to an embodiment of the invention. Through web browser module user interface 1000, the web browser module can provide features comparable to a modern commercially available browser, such as browsing a web page, automatically providing a list of the most visited web pages, automatically providing a complete list of all web pages that have been browsed, and allowing a user to create one or more "bookmarks," where a bookmark is a reference to a web page previously browsed. According to the embodiment, the list of the most visited web pages can be accessed by "clicking" on top sites button 1010 within user interface 1000, the complete list of all browsed web pages can be accessed by "clicking" on history button 1020, and the list of bookmarks can be accessed by "clicking" on bookmarks button 1030. According to the embodiment, one or more browsed web pages can be displayed using display 1040.

In one embodiment, the web browser module can automatically store all web pages that are browsed using web browser module user interface 1000 in a database within the covert application. According to the embodiment, each web page that is browsed is automatically forensically hashed. As one of ordinary skill in the art would readily appreciate, forensically hashing refers to hashing data to produce a digital signature and embedding the digital signature within the data to verify that the data has not been altered. According to the embodiment, the browsed web page is forensically hashed upon collection. The browsed web page is then stored in the database within the covert application. The storing of the browsed web page including storing the full content of the HTML data contained within the browsed web page into the database within the covert application. The browsed web page is then full-text indexed. As one of ordinary skill in the art would readily appreciate, full-text indexing refers to creating one or more indexes for data that contains text, where each index of the one or more indexes corresponds to a word contained within the text, so that the data is searchable.

In an embodiment, the web browser module can automatically configure browser environment attributes based on a specific persona. According to the embodiment, the web browser module can alter identifiers of the web browser module so that the identifiers are consistent with the persona. In one embodiment, the altering of identifiers of the web browser module can include altering the following identifiers: one or more cookies, one or more local shared objects, cache, one or more bookmarks, a web browser language, and a web browser version. According to the embodiment, the configuring of browser environment attributes allows each persona to maintain a consistent digital presence on the Internet, and prevents cross-contamination between personas. In one embodiment, when an persona is activated, identifiers that are consistent with the persona are automatically deployed, where the identifiers are consistent with the identifiers of the persona, when the persona was last activated. In other embodiments, the web browser module can delete identifiers of the web browser module rather than alter the identifiers. In some of these embodiments, the deletion of identifiers of the web browser module can occur when a user switches from a first geosite to a second geosite.

In another embodiment, the web browser module allows a user to "clip" a web page and save it to the journal module, which is described below in greater detail. According to the embodiment, "clipping" to the journal module is the primary may to save information directly from the Internet within the covert application.

Figure 11:
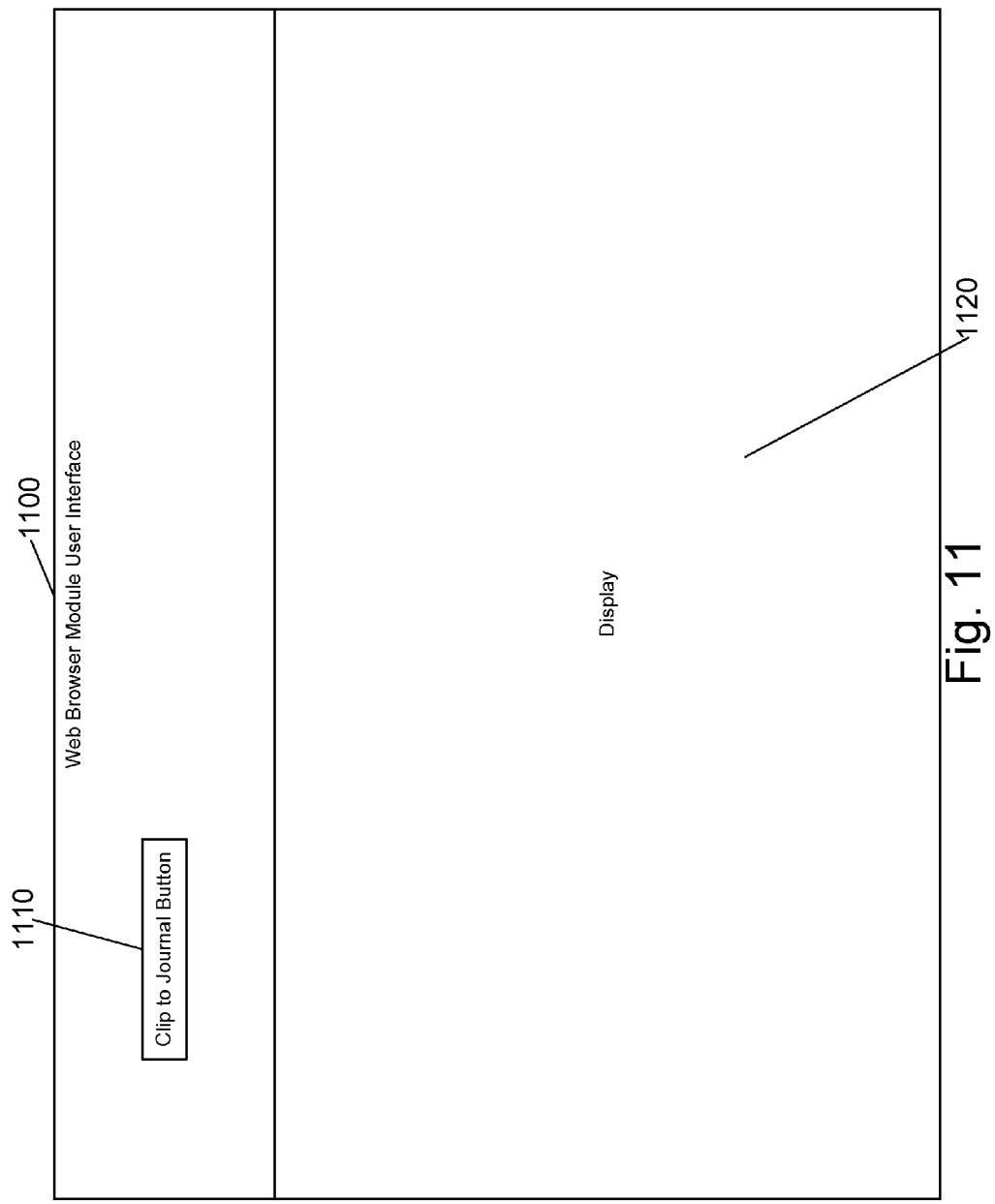
FIG. 11 illustrates another example user interface of a web browser module, where the web browser module is a component of a covert application, according to an embodiment of the invention.

FIG. 11 illustrates another example user interface 1100 of a web browser module, where the web browser module is a component of a covert application, according to an embodiment of the invention. According to the embodiment, web browser module user interface 1100 displays a web page at display 1120. If the user wishes to save the web page to the journal module, the user can "click" clip to journal button 1110 within web browser module user interface 1100. By "clicking" clip to journal button 1110, the user can initiate the "clipping" process which is described below in greater detail in relation to FIG. 12.

Figure 12:
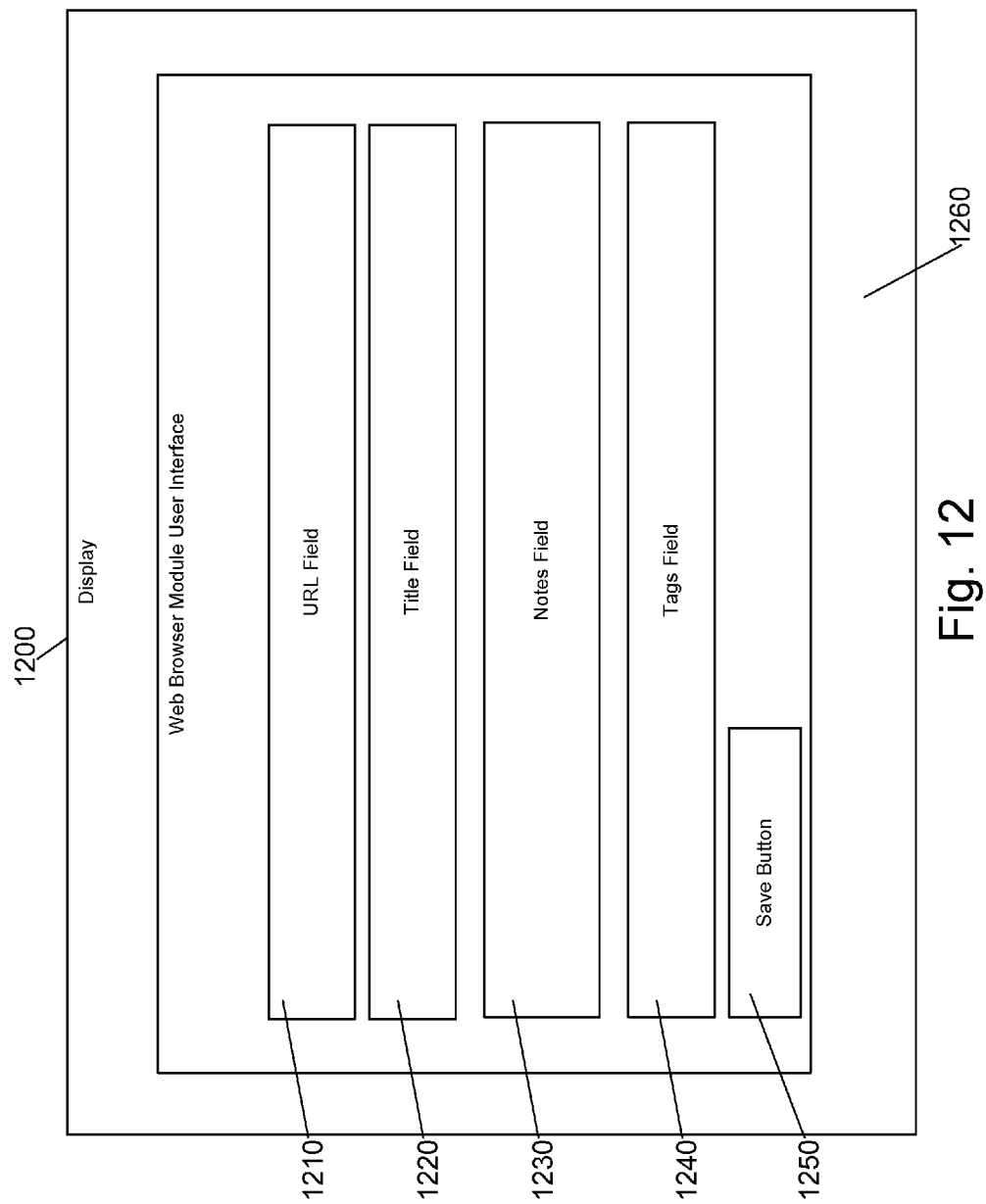
FIG. 12 illustrates another example user interface of a web browser module, where the web browser module is a component of a covert application, according to an embodiment of the invention.

FIG. 12 illustrates another example user interface 1200 of a web browser module, where the web browser module is a component of a covert application, according to an embodiment of the invention. Web browser module user interface 1260 is displayed to a user after a user "clicks" clip to journal button 1110 of FIG. 11. According to the embodiment, web browser module user interface 1200 automatically fills in URL field 1210 and title field 1220 based on the selected web page. Furthermore, the user can enter text within notes field 1230 to enter any notes to refer to in the future, and can enter text within tags field 1240 to create one or more tags to associate the web page with. Tagging is an organization tool used within the journal module, and is described below in greater detail. Once the user has entered text in one or more fields, the user can "click" save button 1250. By "clicking" save button 1250, the web page can be saved to the journal module, as described below in greater detail in relation to FIG. 17.

In one embodiment, the web browser module can identify a geographic location associated with a URL that a user enters into the web browser module. According to the embodiment, when a user browses to a new website, by entering a URL, the web browser module can cause the covert application to automatically update a map display within an application environment to the region containing the geographic location where the website is physically located. In an alternate embodiment, a user can launch a geocoder function, located in a task bar of an application environment of the covert application. Within the geocoder function, the user can enter a URL corresponding to the website. The geocoder will search and locate the geographic location associated with the URL.

In another embodiment, the web browser module can translate a website that is written in an origination language into a destination language. According to the embodiment, when viewing a website using the web browser module, can "click" a built-in translation link that is displayed within a user interface of the web browser module. The user can then select the origination language and the destination language, and the web browser will automatically translate the web page from the origination language to the destination language, and display the web page in the destination language within the user interface of the web browser module. The web browser module can support all official languages, including right-to-left languages.

In another embodiment, the web browser module can utilize a GLIMR to provide, as default options, one or more Internet search engines that are appropriate for the region containing the persona's locale. As previously described, a GLIMR is a collection of Internet information stored within the covert application (i.e., within a persistent storage or database) that can provide a comprehensive guide to Internet trends, usage, social norms, and popular sites and services for a variety of regions around the world. The web browser module can use the information stored within the GLIMR to determine one or more Internet search engines, based on a persona associated with the user, and more specifically, based on a region containing a locale associated with the persona. Thus, when a user selects a specific icon within a user interface of the web browser module, the web browser module can display, within the user interface, a drop-down box containing the one or more Internet search engines appropriate for the region of the persona. In one embodiment, one a user selects one of the one or more Internet search engines, the web browser module can only utilize the selected Internet search engine.

In another embodiment, the web browser module can be implemented as a plug-in to a fully-featured web browser, such as Mozilla Firefox®, Microsoft Internet Explorer®, and Google Chrome®. Where the web browser module is implemented as a plug-in to the fully-featured web browser, the web browser is aware of a session within the covert application, and all of the data associated with the session (such as a user, persona of the user, and a geosite associated with the persona). The web browser can also display data associated with the session (such as a user, persona of the user, and a geosite associated with the persona). The web browser can track all Internet activity associated with the web browser and associate the Internet activity with the persona of the user. By implementing the web browser module as a plug-in to a fully-featured web browser, a user of the covert application gains access to the features of the web browser. Furthermore, when a web browser module "clips" clips one or more specific web pages that are displayed by the web browser module for future reference (as is described below in greater detail), the web browser module can either capture an appearance of the entire web page, rather than only a portion of the web page that is viewable on a screen that is displayed to the user, or can capture an appearance of the portion of the web page that is viewable on the screen. In situations where the web page contains more data than the web browser module can store for a web page, the web browser module can implement a "scale-back" algorithm that captures as much data contained within the web page as possible, without exceeding any size limitations.

Email Client

According to an embodiment, the covert application can provide an email client module (such as email client module 465 of FIG. 4), which can provide email functionality for one or more personas, where the email functionality includes a safety net feature designed to catch common mistakes made by a user, and resolve any potentially suspicious or incorrect elements of a persona's composed email. More specifically, the email client module can manage one or more email accounts for one or more personas, allowing a user to transmit and receive email while associated with any persona. In addition, the email client module can utilize a safety net feature to scan all outgoing email messages, and prevent a transmission of any email messages over a network connection that do not comply with one or more rules, warning the user about the non-compliance, and allowing the user to modify the email to resolve the non-compliance.

Figure 13:
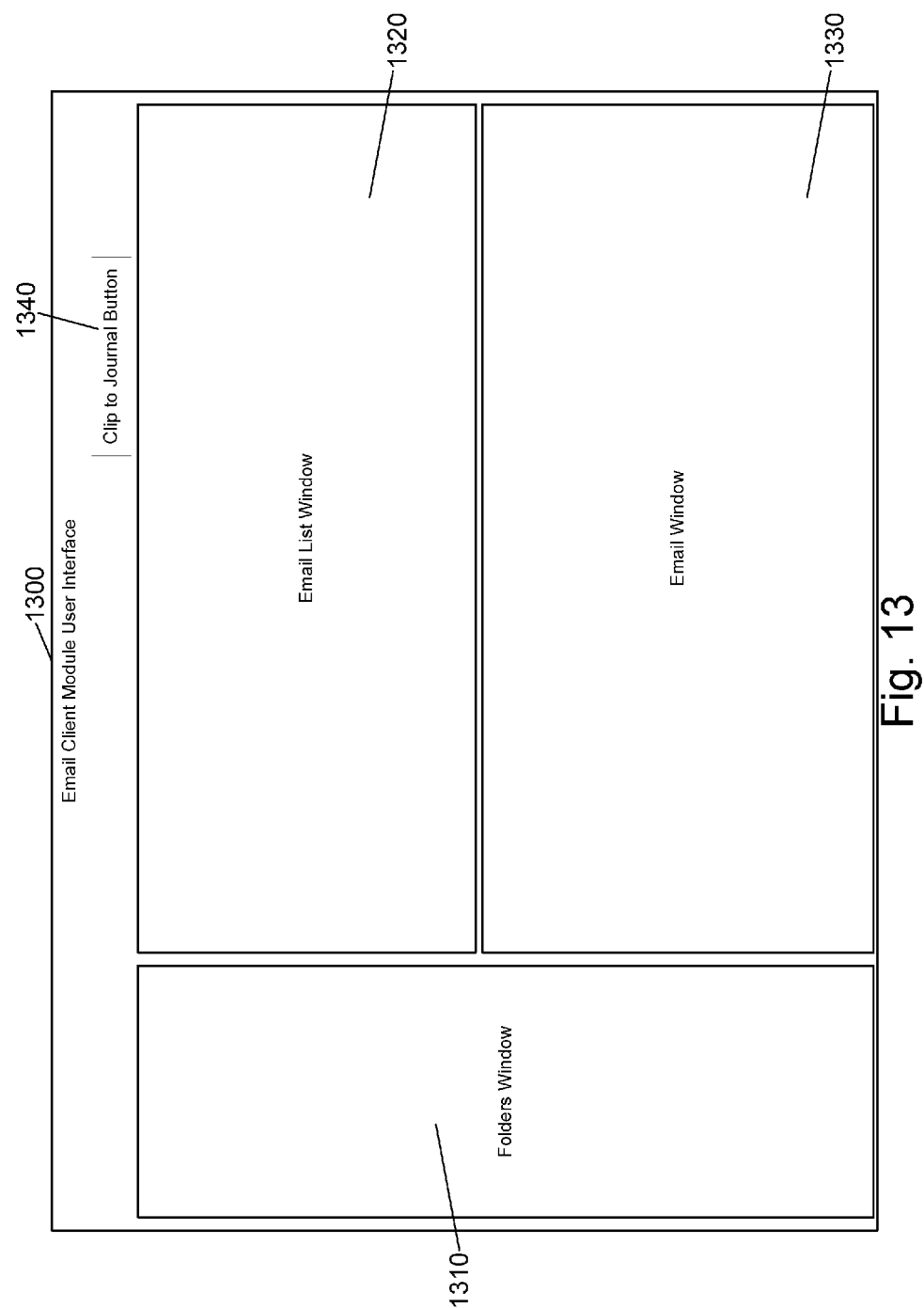
FIG. 13 illustrates an example user interface of an email client module, where the email client module is a component of a covert application, according to an embodiment of the invention.

FIG. 13 illustrates an example user interface 1300 of an email client module, where the email client module is a component of a covert application, according to an embodiment of the invention. According to the embodiment, the email client module can manage email of one or more personas from a single inbox or multiple inboxes. The email client module can work with all email standards, such as Post Office Protocol 3 (POP3), and all Internet email services, such as Gmail®, Yahoo Mail®, and Hotmail®. Each persona can have one or more email accounts associated with the persona. Email client module user interface 1300 can display all emails for the persona across all the persona's email accounts. In one embodiment, email client module user interface 1300 can include folders window 1310, where folders window 1310 can display one or more email folders. In the embodiment, email client module user interface 1300 can also include email list window 1320, where email list window 1320 can display a list of one or more emails for a specific folder of folders window 1310. Furthermore, in the embodiment, email client module user interface 1300 can also include email window 1330, where email window 1330 can display an email from email list window 1320. According to the embodiment, email client module user interface 1300 can include clip to journal button 1340, where the user can "click" clip to journal button 1340 to save the email displayed within email window 1330 to a journal module. By "clicking" clip to journal button 1340, the user can initiate the "clipping" process which is described below in greater detail in relation to FIG. 16.

According to the embodiment, the email client module can associate email accounts with a persona, even though the email accounts were created before the persona was created. In addition, the email client module can associate email accounts that have been created simultaneously along with the persona, such as the email accounts that can be created and associated with the persona using the persona builder module, previously described above. In accordance with the embodiment, the email client module can be integrated with other modules of the covert application, such as the dashboard module, the journal module, the contacts manager module, and the wallet module.

Figure 14:
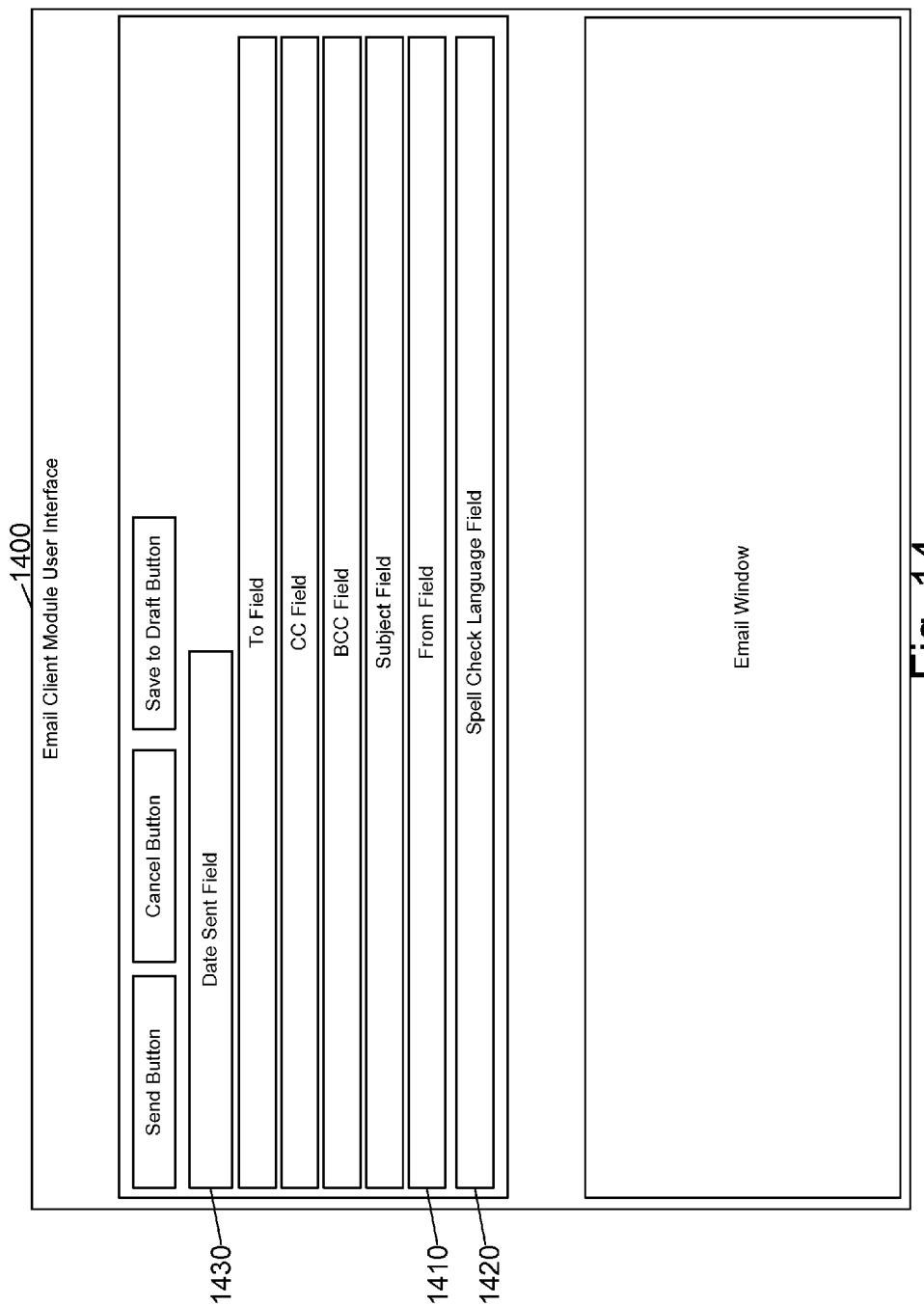
FIG. 14 illustrates another example user interface of an email client module, where the email client module is a component of a covert application, according to an embodiment of the invention.

FIG. 14 illustrates another example user interface 1400 of an email client module, where the email client module is a component of a covert application, according to an embodiment of the invention. According to the embodiment, email client module user interface 1400 can be displayed to a user when a user composes a new email message. In accordance with the embodiment, a user can select which email account associated with the persona that the email is to be transmitted from using from field 1410. The user can also select the language to use when performing a spell check of the email message, using spell check language field 1420. Furthermore, the user can also schedule the email to be transmitted at a future date and time, rather than being transmitted immediately when the user "clicks" the send button. The user can schedule the email message by entering a date and time within date sent field 1430 of email client module user interface 1400. Thus, according to the embodiment, once the user "clicks" the send button, the email message is scheduled to be transmitted at the entered date and time, rather than being transmitted immediately.

In one embodiment, a user can "clip" an email from the email client module to the journal module. According to the embodiment, by "clipping" the email, the covert application can store the email within the covert application using the journal module. The journal module is described below in greater detail.

Figure 15:
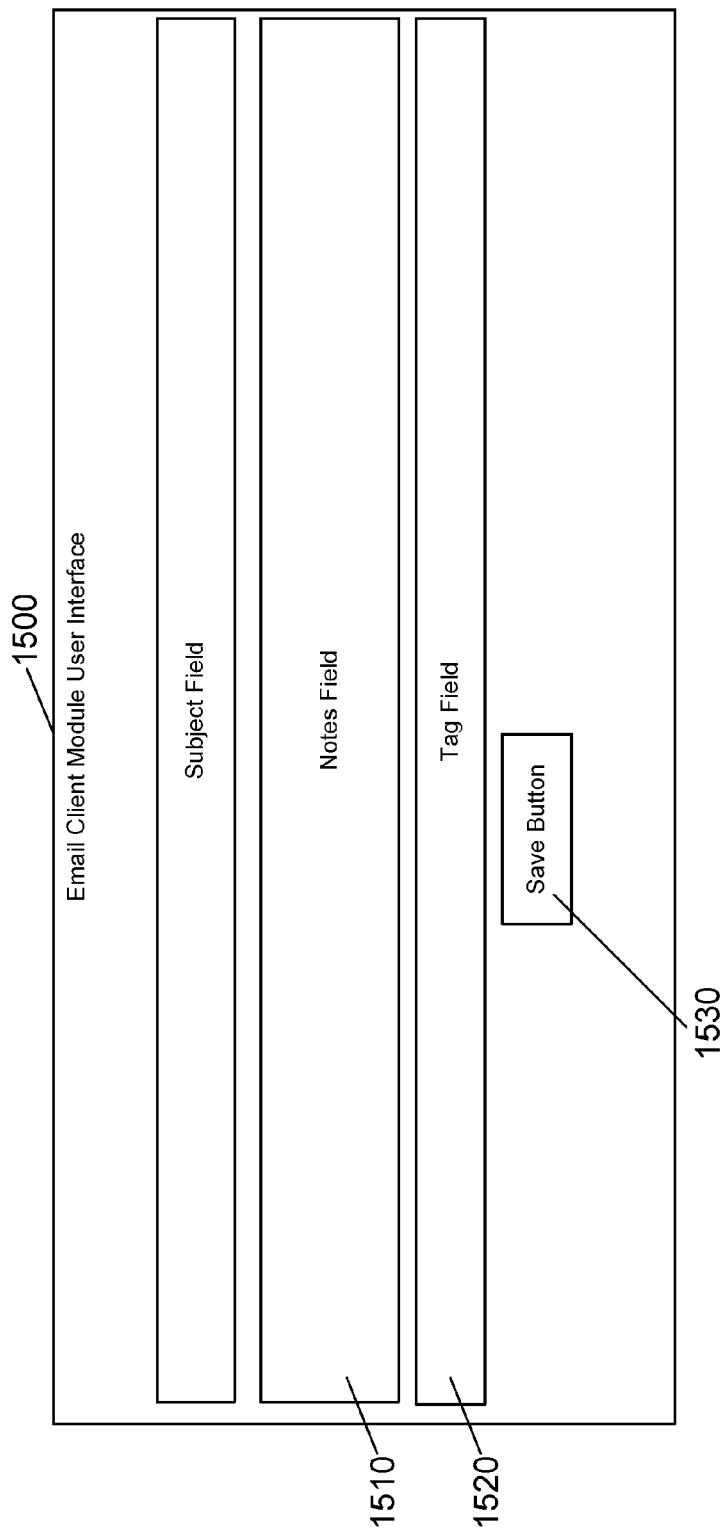
FIG. 15 illustrates another example user interface of an email client module, where the email client module is a component of a covert application, according to an embodiment of the invention.

FIG. 15 illustrates another example user interface 1500 of an email client module, where the email client module is a component of a covert application, according to an embodiment of the invention. According to the embodiment, email client module user interface 1500 is a user interface that can allow a user to "clip" an email from an email client module to a journal module. The user can enter text within notes field 1510 to enter any notes to refer to in the future, and can enter text within tags field 1520 to create one or more tags to associate the email with. Tagging is an organization tool used within the journal module, and is described below in greater detail. Email client module user interface 1500 may also include save button 1530.

In one embodiment, the email client module includes a safety net. As previously described, the safety net can scan any outgoing email of the email client module, before the outgoing email is transmitted, based on one or more rules, and warn the user that the outgoing email does not comply with the one or more rules.

In accordance with the embodiment, before the email client module transmits the email over a network connection, such as the Internet, the safety net scans the email and performs a unified check of the email based on one or more rules. As previously described, the types of rule can be a time rule, an email address rule, a cultural rule, and a persona rule. The unified check includes analyzing the email based on the rules to determine if the email complies with the rules. If the email complies with the rules, the email client module transmits the email. If the email does not comply with the rules, then the email client module does not transmit the email, and the email client module displays a warning message to a user in a user interface. Depending on the rule, as previously described, the email client module allows a user to take remedial steps in order to allow the email client module to successfully transmit the email.

Figure 16:
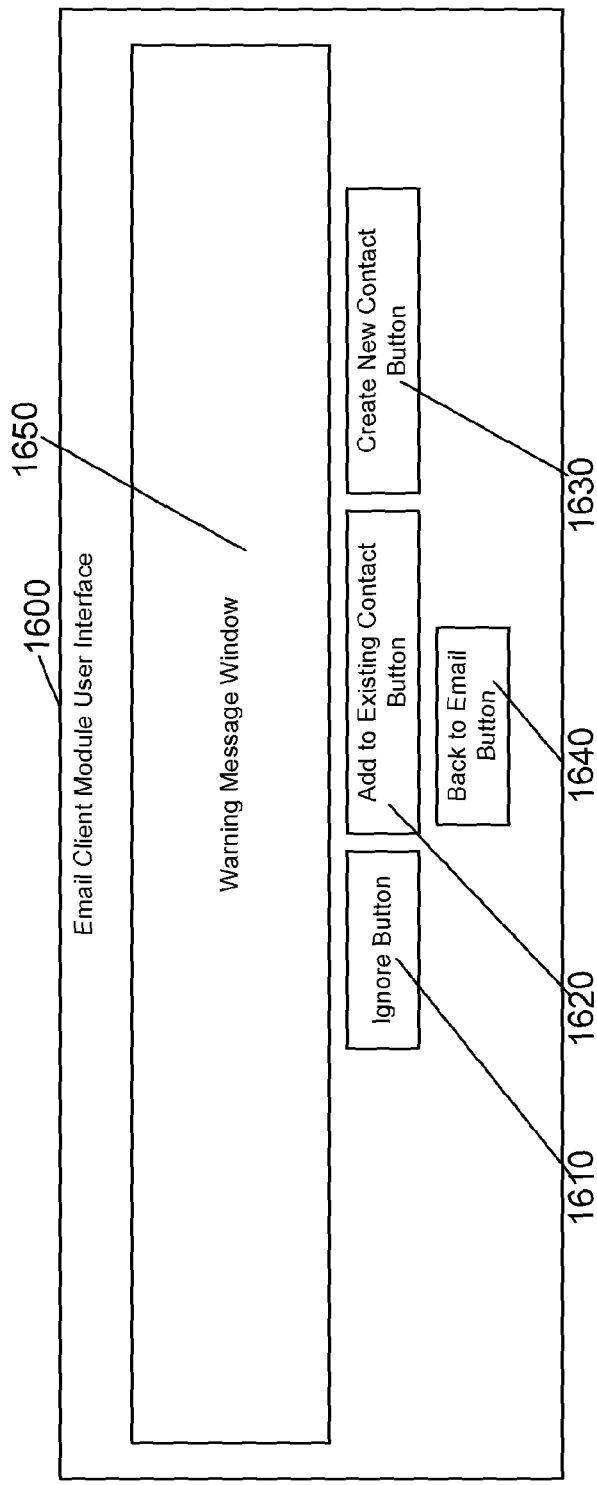
FIG. 16 illustrates another example user interface of an email client module, where the email client module is a component of a covert application, according to an embodiment of the invention.

FIG. 16 illustrates another example user interface 1600 of an email client module, where the email client module is a component of a covert application, according to an embodiment of the invention. According to the embodiment, email client module user interface 1600 is an example of a warning message displayed within a user interface by a safety net of the email client module. In the illustrated embodiment of FIG. 16, email client module user interface 1600 displays a warning message associated with an email address rule within warning message window 1650 indicating that the recipient's email address is an unknown address. Email client module user interface 1600 displays several options to the user for resolving the email's noncompliance with the email address rule. As one option, the user can "click" on ignore button 1610 to ignore the noncompliance. This causes email client module to transmit the email despite the noncompliance. As another option, the user can "click" on add to existing contact button 1620. This allows the user to add the recipient's email address to an existing contact in a contacts manager module, which is described below in greater detail. Another option is for the user to "click" on create new contact button 1630. This allows the user to create a new contact in a the contact manager module, which is described below in greater detail, where the new contact is associated with the recipient's email address. An additional option is for the user to "click" back to email button 1640. This allows the user to edit the email so that the email complies with the rule. In this case, the user can edit the recipient's email address so that the email address is a known email address.

Journal

According to an embodiment, the covert application can provide a journal module (such as journal module 470 of FIG. 4), which can allow a user to collect, sort, tag, and store information relating to a specific persona from across the modules of the covert application. More specifically, the journal module can allow a user to store data from within one or more of the modules of the covert application, or from the journal module itself, so that the user can retrieve the data, even after a session associated with the persona has ended. The stored data is identified as a journal entry within the journal module.

As previously described, the covert application can create a virtual machine for a persona, and a user can utilize the virtual machine to conduct cyber activity while being associated with the persona. After the user is finished conducting cyber activity while being associated with the persona, the covert application can delete the virtual machine, so that the user can no longer retrieve any data created (such as a browsed web page, an image, a contact, or an email) during the virtual machine session. According to the embodiment, if the user wishes to store any data created during the session, the user can utilize the journal module to store the data, so that the data can be retrieved at any point, including after the virtual machine session has ended. Furthermore, in an embodiment of the invention, the user can also utilize the journal module to create text notes and activity log entries that can document items encountered while conducting cyber covert operations.

Figure 17:
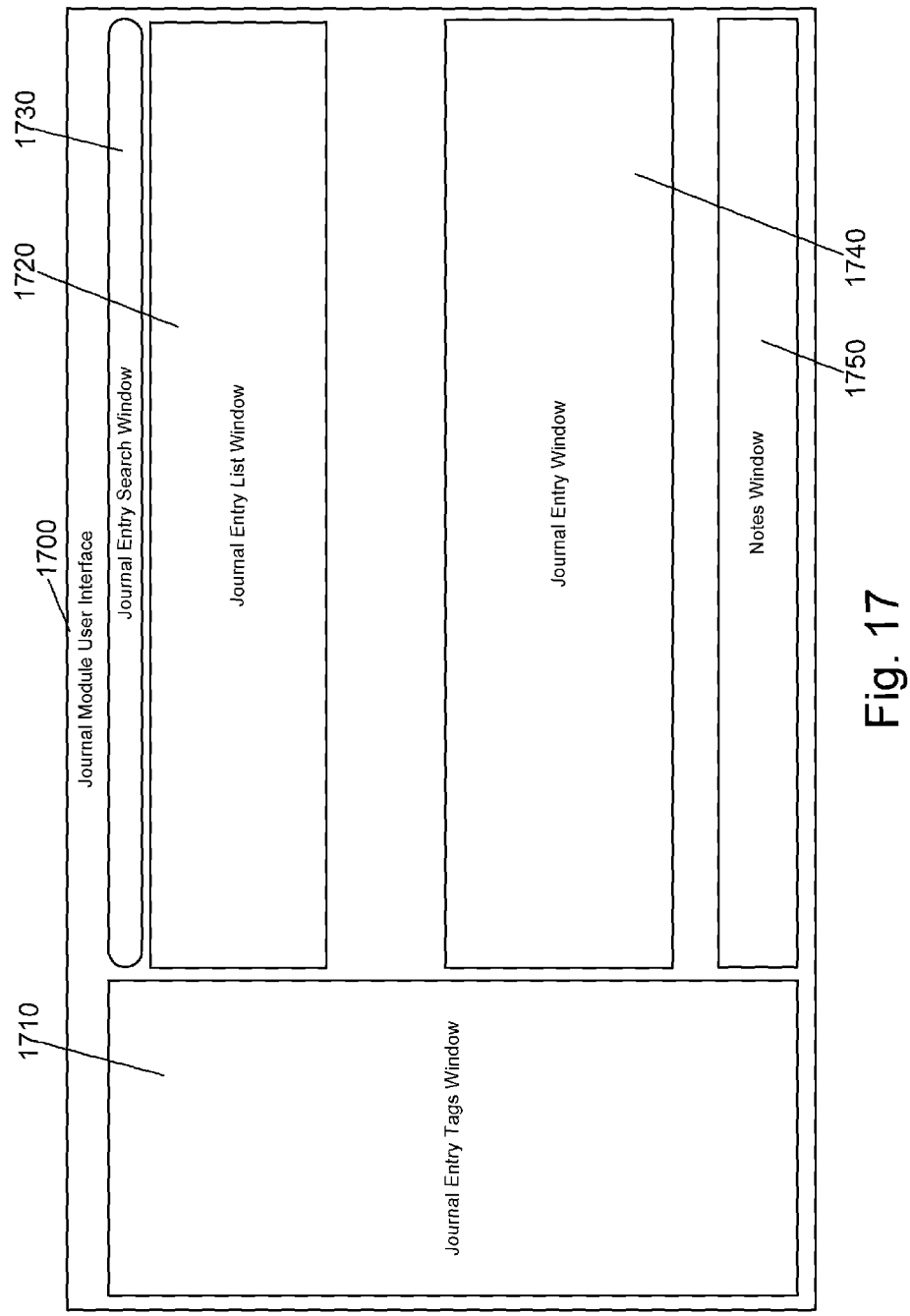
FIG. 17 illustrates an example user interface of a journal module, where the journal module is a component of a covert application, according to an embodiment of the invention.

FIG. 17 illustrates an example user interface 1700 of a journal module, where the journal module is a component of a covert application, according to an embodiment of the invention. According to the embodiment, journal module user interface 1700 can display one or more journal entries. In the illustrated embodiment, journal module user interface 1700 includes journal entry tags window 1710. Journal entry tags window 1710 displays a list of one or more tags, and also displays a number of journal entries that are associated with each tag. Tags are described below in greater detail. Journal module user interface 1700 also includes journal entry list window 1720. Journal entry list window 1720 displays a list of one or more journal entries. In one embodiment, journal entry list window 1720 displays a title, notes, and a date for each journal entry. A title is a title of the journal entry created by the user. Notes are text associated with the journal entry, also created by the user. Date is a date that the journal entry was created by a user.

According to the illustrated embodiment, journal module user interface 1700 also includes journal entry search window 1730. Journal entry search window 1730 allows a user to search the journal module for one or more journal entries. Searching the journal module is described below in greater detail. Journal module user interface also include journal entry window 1740. Journal entry window 1740 can display a journal entry selected in journal entry list window 1720. Journal entry window 1740 can also display information that a user "drags" into journal entry window 1740, and the information can subsequently be saved by journal module as a journal entry. Journal module user interface 1700 also includes notes window 1750. Notes windows 1750 can display notes that are associated with a journal entry selected in journal entry list window 1720. In addition, a user can enter text within notes window 1750, and the text can subsequently be associated with a journal entry.

In one embodiment, when a user indicates that data is to be stored, the journal module can automatically store the data in a database within the covert application. According to the embodiment, the data is automatically forensically hashed. As one of ordinary skill in the art would readily appreciate, and as previously described, forensically hashing refers to hashing data to produce a digital signature and embedding the digital signature within the data to verify that the data has not been altered. According to the embodiment, the data is forensically hashed upon an indication that the data is to be stored. The data is then stored in the database within the covert application. The storing of the data including storing the full content of the data into the database within the covert application. The data is then full-text indexed. As one of ordinary skill in the art would readily appreciate, and as previously described, full-text indexing refers to creating one or more indexes for data that contains text, where each of the one or more indexes corresponds to each word contained within the text, so that the data is searchable.

In certain embodiments, the data stored by the journal module can be a browsed web page. In these embodiments, the HTML data of the browsed web page can be stored within a database of the covert application. In other embodiments, the data stored by the journal module can be an image. In these embodiments, the image data of the image can be stored within a database of the covert application. In other embodiments, the data stored by the journal module can be an email. In these embodiments, the email data of the email can be stored within a database of the covert application. In other embodiments, the data stored by the journal module can be a contact. In these embodiments, the contact data can be converted to data, such as HTML data, that can be formatted and viewed within the covert application, and can be stored within a database of the covert application. In other embodiments, the data stored by the journal module can be text. In these embodiments, the text can be directly stored within a database of the covert application. However, one of ordinary skill in the art would readily appreciate that these are only example types of data, and that the journal module can store any type of data.

In one embodiment, a user can be associated with a persona, and can store data using the journal module by "clipping" the data from another module within the covert application. According to the embodiment, the journal module can be integrated with one or more other modules of the covert application. For example, the journal module can be integrated with the web browser module, the email client module, the contacts manager module, and the application environment. From any module that is integrated with the journal module, the user can "clip" data displayed within the integrated module to the journal module. By "clipping" the data, the journal module stores the data displayed within the integrated module to a database of the covert application. The data can then be retrieved by the user associated with the persona, using the journal module. For example, the data can be retrieved at a subsequent point in time, where the subsequent point in time can either be during the persona's virtual machine session, or during a subsequent virtual machine session of the persona. Thus, the journal module can query and display the data that is stored within a database of the covert application. The journal module can display the database in a list format that is searchable and sortable.

One example of "clipping" is "clipping" a browsed web page from the web browser module to the journal module. According to the embodiment, a user associated with a persona can browse a web page using the web browser module, as previously described. The user can then "clip" the browsed web page from the web browser module to the journal module utilizing a user interface of the web browser module. The journal module automatically stores the browsed web page into a database of the covert application.

Another example of "clipping" is "clipping" an email from the email client module to the journal module. According to the embodiment, a user associated with a persona can view an email using the email client module, as previously described. The user can then "clip" the viewed email from the email client module to the journal module utilizing a user interface of the email client module. The journal module automatically stores the viewed email into a database of the covert application.

Another example of "clipping" is "clipping" a contact from the contacts manager module to the journal module. According to the embodiment, a user associated with a persona can view a contact using the contacts manager module, as is described below in greater detail. The user can then "clip" the viewed contact from the contacts manager module to the journal module utilizing a user interface of the contacts manager module. The journal module automatically stores the viewed contact into a database of the covert application.

Another example of "clipping" is "clipping" a geospatial event from the application environment to the journal module. A geospatial event encompasses a website of interest and location relating to the virtual location and/or physical location of the website. According to the embodiment, a user associated with a persona can use a geocoder of the application environment to obtain geospatial information of a website. The user can then "clip" the geospatial information from the application environment to the journal module utilizing a user interface of the application environment. The journal module automatically stores the geospatial information into a database of the covert application.

In another embodiment, a user can store data using the journal module by directly entering the data from within the journal module. According to the embodiment, a user can "drag and drop" (or "cut and paste") data from another module into a user interface of a journal module. A user can then save the data, and the journal module can store the data as a journal entry. In accordance with the embodiment, a user can enter a title and associate the title with the journal entry, in order to identify the journal entry. Furthermore, in accordance with the embodiment, a user can create one or more tags, and associate the one or more tags with the journal entry to further identify the journal entry. Tags are described below in greater detail. In one embodiment, a user can also enter text, identified as notes, and associate the notes with the journal entry.

In one embodiment, one or more tags can be used to describe data. A tag is a short word or phrase that is assigned to data that identifies a category that the data is associated with. According to the embodiment, tagging can be the primary way to organize data stored using the journal module. In accordance with the embodiment, a journal entry can have one or more tag associated it. Because a journal entry can have more than one tag associated with it, a journal entry, and the data contained within the journal entry, can be organized into multiple categories. One type of tag is a predefined tag. This type of tag can be created by a system administrator of the covert application, and text of pre-defined tag can already be defined. A predefined tag can be defined according to an organization's indexing nomenclature, and a user can use a predefined tag in order to provide a standard way of categorizing journal entries. Examples of predefined categories can include subject, content type, region, and classification level. Another type of tag is a regular tag. This type of tag can be created by a user, and the user can define the text of the regular tag. A user can use a regular tag in order to customize how the user indexes one or more journal entries.

In one embodiment, a user can search for one or more journal entries within the journal module. According to the embodiment, one or more journal entries of the journal module can be searched using a specific searching method provided by the journal module. One example searching method is that the journal module can display all stored journal entries. Another example searching method is that a user can enter a word or a phrase within a user interface of the journal module, and the journal module can display all stored journal entries that include the entered word or phrase. Another example searching method is that a user can select a tag category, and the journal module can display all stored journal entries that are associated with the tag. Another example searching method is that a user can enter a word or a phrase within a user interface of the journal module, and the journal module can displays all stored entries with a tag, title, or text body, or a combination therein, that include the word or phrase.

In one embodiment, when a journal module "clips" one or more specific web pages that are displayed by the web browser module for future reference, the journal module can either capture an appearance of the entire web page, rather than only a portion of the web page that is viewable on a screen that is displayed to the user, or can capture an appearance of the portion of the web page that is viewable on the screen. In situations where the web page contains more data than the journal module can store for a web page, the journal module can implement a "scale-back" algorithm that captures as much data contained within the web page as possible, without exceeding any size limitations. The journal module can further allow the user to "drag and drop" data that is stored within the covert application (and that can be displayed) within a quarantined area that can be provided by a drop box module (such as drop box module 485 of FIG. 4), as is further described in greater detail. The journal module can further export the data that is stored within the covert application into a file, such as a tab-delimited file. The journal module can support very large images as part of a journal entry. The journal module can further copy one or more images from a system clipboard into the journal module.

Contacts Manager

According to an embodiment, the covert application can provide a contacts manager module (such as contacts manager module 475 of FIG. 4), which can store one or more "details" regarding "contacts" of one or more personas with a database of the covert application. A "contact" can be any person of interest for one or more personas, and a "detail" can be any type of information, such as a name, email, and phone number. The contacts manager module can store any number of contacts, and any number of details for each contact within a database of the covert application. The contacts manager module can not only store one or more contacts, where one or more contacts includes one or more details, but the contacts manager module can also identify which persona knows a specific contact, and which personas know specific details of the contact. Thus, the contacts manager module can keep track of what details are known or unknown about the one or more contacts stored within the covert application across one or more personas.

In one embodiment, when a contact is created within the contact manager module, the contact can either be created by a user that is associated with a specific persona, or a user that is not associated with any persona. The contact manager module tracks this information and stores this information along with the contact. According to the embodiment, other personas may become aware of this contact. The contact manager module tracks this information as well. Thus, rather than simply storing a contact, the contacts manager module stores the contact and each association between the contact and the persona.

Figure 18:
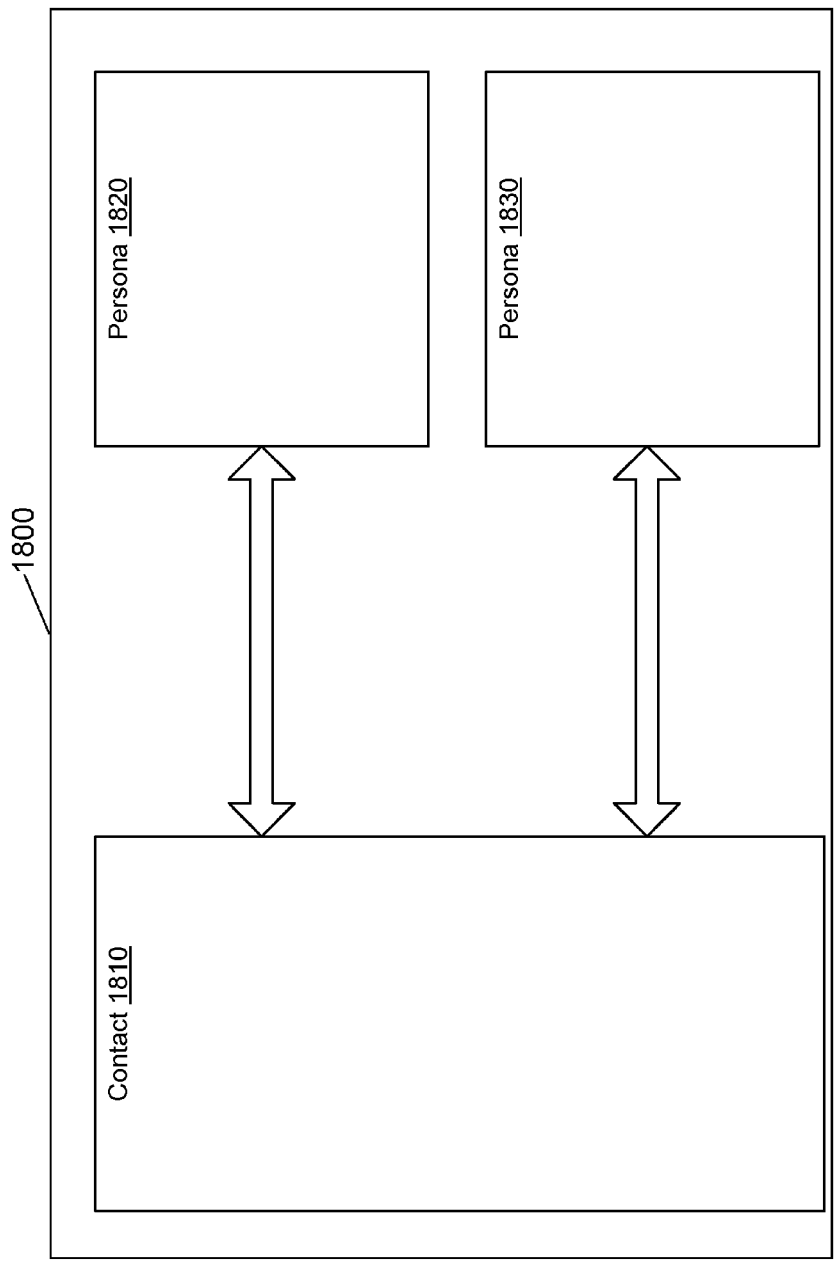
FIG. 18 illustrates an example of an association between a contact and a persona, according to an embodiment of the invention.

FIG. 18 illustrates an example of an association between a contact and a persona, according to an embodiment of the invention. According to the embodiment, a contact 1810 can be stored within covert application 1800 using a contacts manager module. In this example, contact 1810 is associated with two personas, persona 1820 and persona 1830. Thus, in accordance with the embodiment, a single instance of contact 1810 can be stored within covert application 1800 by the contacts manager module. The single instance of contact 1810 can be associated with persona 1820, and can also be associated with persona 1830. Accordingly, the contact manager module is able to store contact 1810, and store each association contact 1810 has with each of personas 1820 and 1830. One of ordinary skill in the art would readily appreciate that the association illustrated in FIG. 18 is only an example of an association, and that any number of contacts can be associated with any number of personas by the contacts manager module.

Furthermore, when a detail is created for the contact within the contacts manager module, the detail can either be created by a user that is associated with a specific persona, or a user that is not associated with any persona. The contact manager module tracks this information as well, and stores this information along with the detail of the contact. According to the embodiment, other personas may become aware of this detail of the contact, or may create other details for the contact within the contacts manager module. The contacts manger module tracks this information as well. Thus, rather than simply storing a detail associated with the contact, the contacts manager module stores the detail, each association between the detail and the contact, and each association between the detail and the persona.

Figure 19:
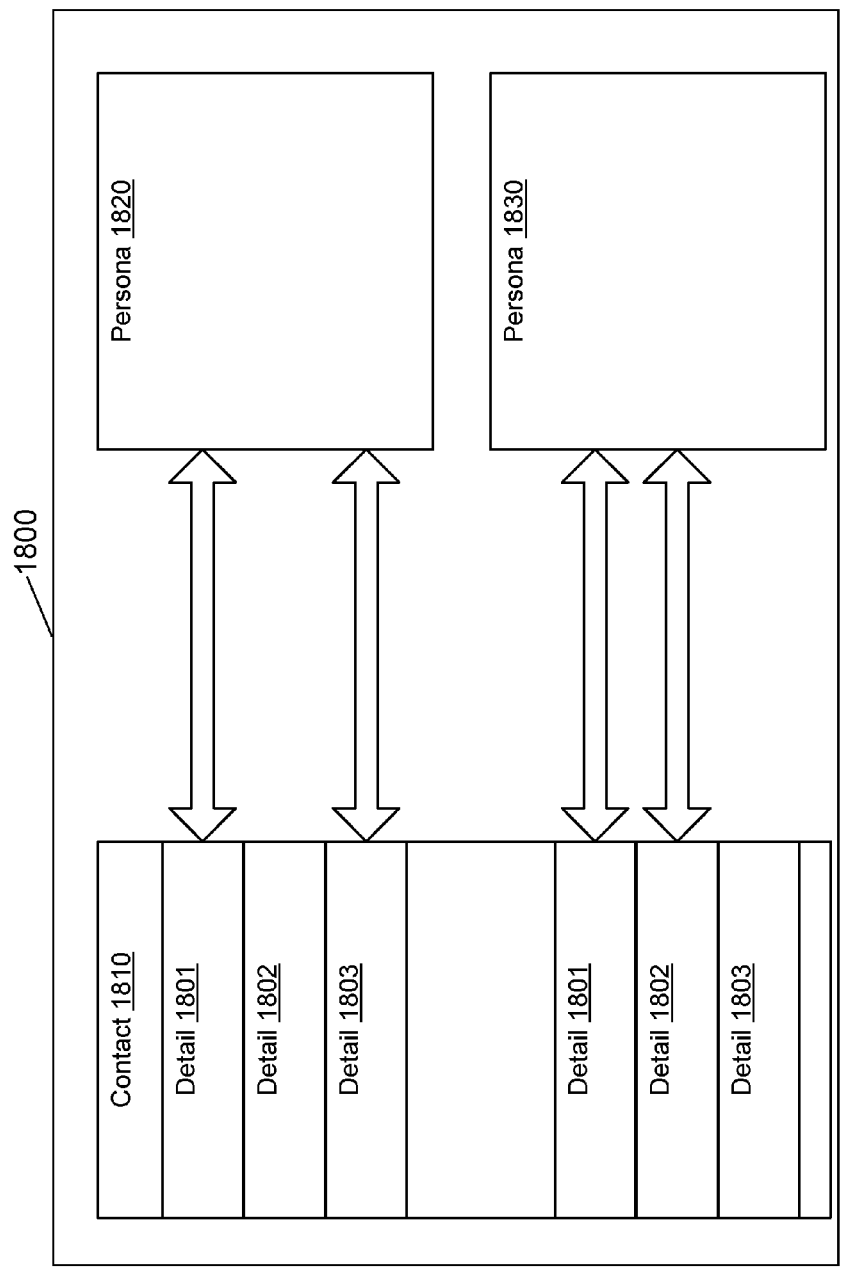
FIG. 19 illustrates an example of an association between a detail, a contact, and a persona, according to an embodiment of the invention.

FIG. 19 illustrates an example of an association between a detail, a contact, and a persona, according to an embodiment of the invention. According to the embodiment, similar to the illustrated embodiment of FIG. 18, a contact 1810 can be stored within covert application 1800 using a contacts manager module. However, in this embodiment, not only is contact 1810 stored, but three details associated with contact 1810 (i.e., details 1801, 1802, and 1803) are stored as well. In this example, detail 1801 is associated with personas 1820 and 1830, detail 1802 is associated with persona 1830, and detail 1830 is associated with persona 1820. Thus, in accordance with the embodiment, an instance of contact 1810 can stored within covert application 1800 by the contacts manager module, where the instance of contact 1810 is associated with two instances of details 1801, 1802, and 1803. Furthermore, the first instance of detail 1801 and the first instance of detail 1803 is associated with persona 1820, and the second instance of detail 1801 and the second instance of detail 1802 is associated with persona 1803. Accordingly, the contact manager module is able to store contact 1810 and details 1801, 1802, and 1803, and store each association each detail of details 1801, 1802, and 1803 has with each of persons 1820 and 1830. One of ordinary skill in the art would readily appreciate that the association illustrated in FIG. 19 is only an example of an association, and that any number of details can be associated with any number of contacts and any number of personas by the contacts manager module.

In one embodiment, a contacts manager module can provide a user a comparison matrix displayed within a user interface. A comparison matrix is a matrix that indicates which details are known about a contact through the perspective of multiple personas. More specifically, a comparison matrix is a matrix that includes one or more details associated with the contact, and one or more persona, where each persona is associated with at least one detail. According to the embodiment, arranging contact details in a comparison matrix and aligning details that are commonly known between personas can simplify a user's understanding of which personas know which persona details.

Figure 20:
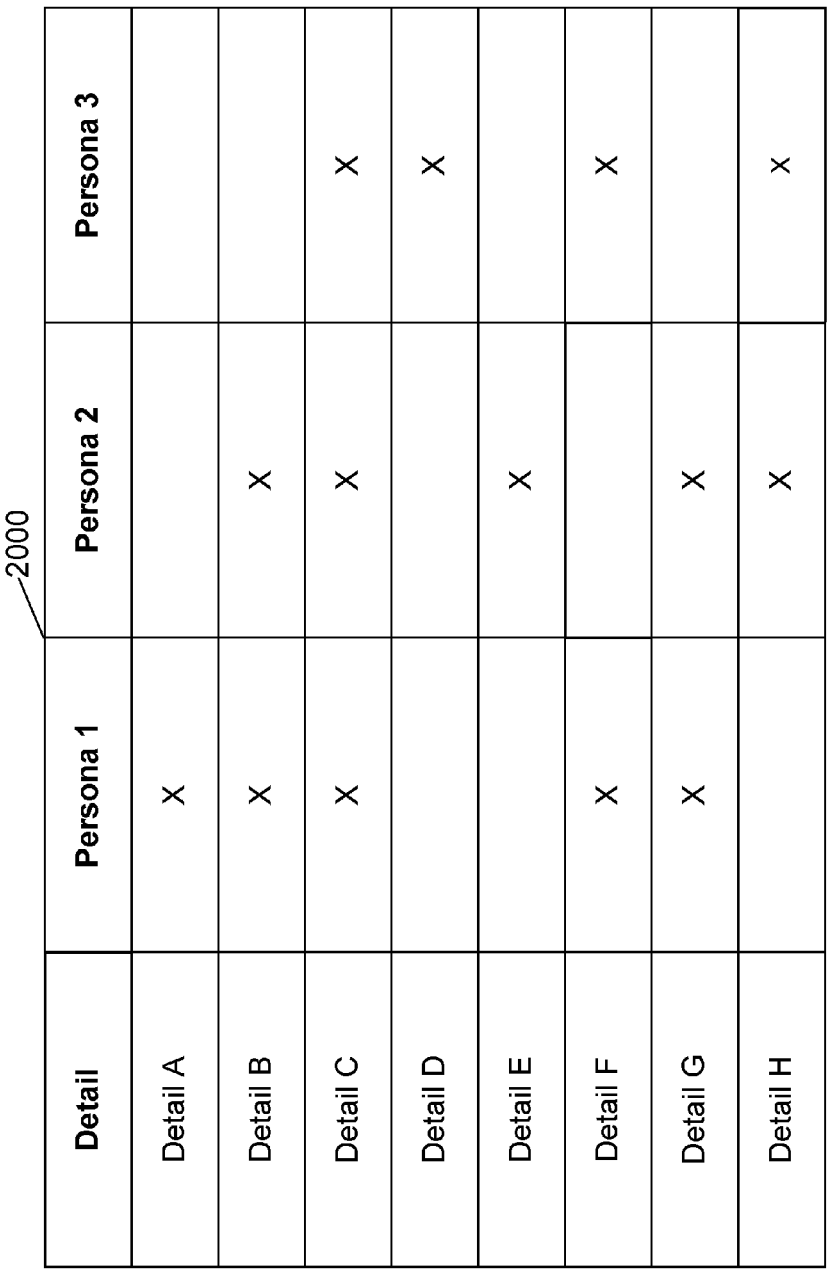
FIG. 20 illustrates an example of a comparison matrix, according to an embodiment of the invention.

FIG. 20 illustrates an example of a comparison matrix 2000, according to an embodiment of the invention. As one of ordinary skill in the art would readily appreciate, the comparison matrix 2000 illustrated in FIG. 20 is only an example of a comparison matrix, and a user interface of a contacts manager module can display a comparison matrix that utilizes a different format than the format illustrated in FIG. 20. According to the embodiment, the comparison matrix 2000 displays a series of details in the first column from the left (i.e., details A, B, C, D, E, F, G, and H). In the second column from the left, the comparison matrix 2000 displays a first persona (i.e., persona 1) and an association between each detail of details A, B, C, D, E, F, G, and H. More specifically, if a detail is associated with persona 1, an "X" is displayed in a cell within a same column of persona 1, and within a same row of the detail. For example, detail A is associated with persona 1, and thus, an "X" is displayed in the cell that is within the same column of persona 1, and within the same row of detail A. If a detail is not associated with persona 1, nothing is displayed in a cell within a same column of persona 1, and within a same row of the detail. For example, detail D is not associated with persona 1, and thus, nothing is displayed in the cell that is within the same column of persona 1, and within the same row of detail A. The comparison matrix 2000 displays similar information in the third column from the left corresponding to a second persona (i.e., persona 2). The comparison matrix 2000 also displays similar information in the fourth column from the left corresponding to a third persona (i.e., persona 3). The associations between details and personas illustrated in FIG. 20 are merely example associations, and a comparison matrix can display any configuration of associations between any number of details and any number of personas, and still be within a scope of the invention.

In one embodiment, a contacts manager module can also display one or more "persona-specific views." As previously described, when a user interfaces with the contacts manager module, a user can either be associated with a persona, or not associated with any persona. In the scenario where a user is associated with the persona, the contacts manager module can display, within a user interface, one or more contacts from a perspective of the persona associated with the user. The view from the perspective of the persona is identified as a "persona-specific view." In the persona-specific view, only the details of a contact that are known to the persona are shown. This prevents the user from mistakenly utilizing details of a contact that may be known to another persona, but are not known to the persona that the user is associated with.

In an alternate embodiment, the contacts manager module can display a generic view where all the details of a contact are shown, regardless of whether the details are known to the persona. In this alternate embodiment, the contacts manager module can still keep track of which details are known to the persona that the user is associated with and which details are not known. In this alternate embodiment, the contact manager module can display, within a user interface, details of a contact that are known to the user in a first format, and can display details of a contact that are unknown to the user in a second format. In certain embodiments, the contacts manager module can display details of a contact that are known to a current persona, details that are unknown to the current persona but known to other personas associated with a current user, and details that are unassociated to any persona. In some of these embodiments, this can be a default way of securing data that should not be visible to the current user. The details of a contact that can be displayed to a user can be configured on a specific customer/user basis.

In one embodiment, as previously described, a user can interface with the contacts manager module when the user is not associated with any persona. Even though a user is not associated with any persona, the user can still create contacts, and create details for contacts. In this scenario, an "unassociated contact" is a contact that does not have any details associated with a persona. Once at least one detail of a contact is associated with at least one persona, that contact is no longer "unassociated." Contact details can be individually unassociated and can be displayed within a comparison matrix and in an "all details view" (i.e., a generic view) within contacts both at a dashboard level and an in-persona level. Any "unassociated detail" displayed to a user can be highlighted to signify that the detail is not associated with any persona. Once the detail is associated with at least one persona, the detail is no longer "unassociated" and can be linked with the at least one persona.

Figure 21:
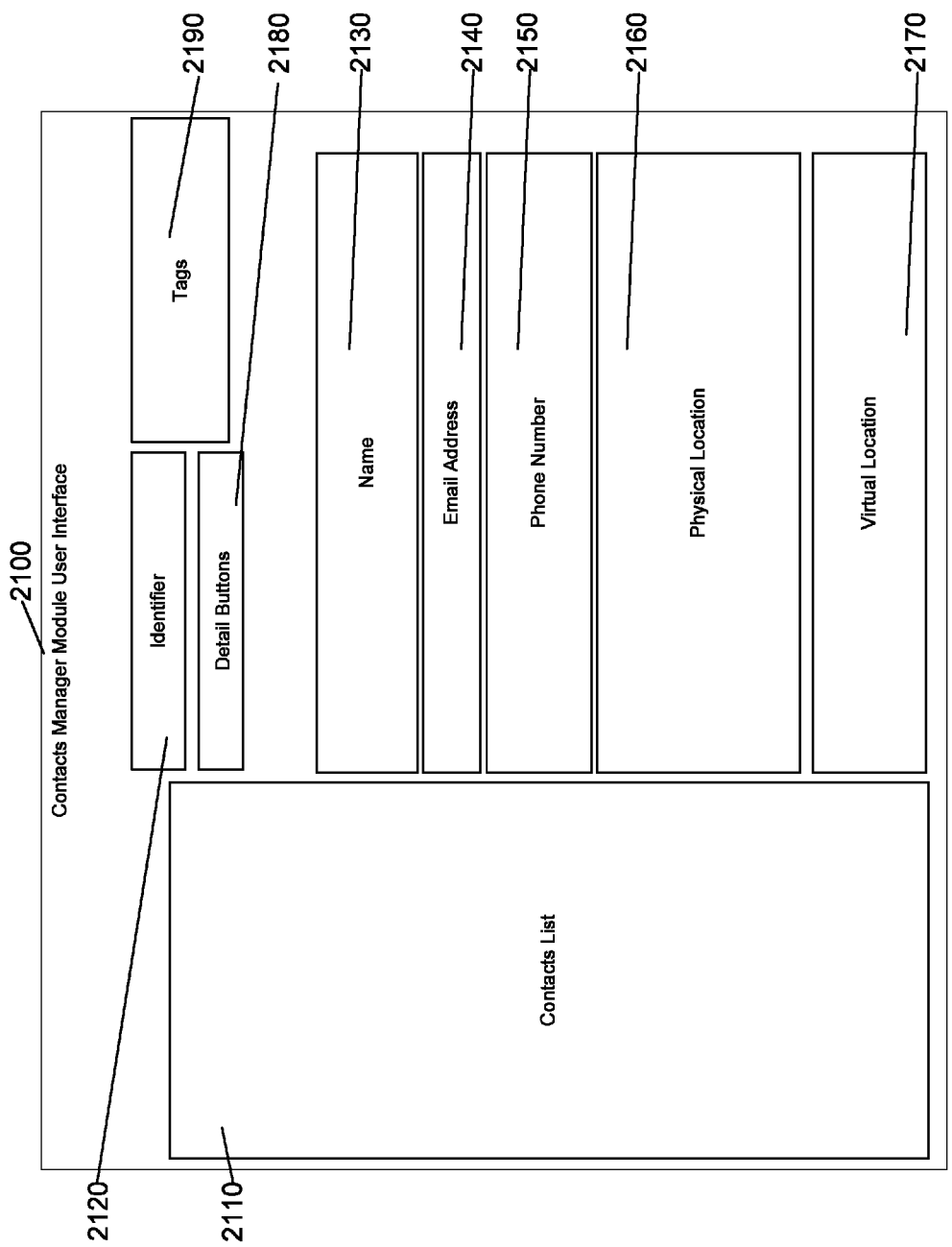
FIG. 21 illustrates an example user interface of a contacts manager module, where the contacts manager module is a component of a covert application, according to an embodiment of the invention.

FIG. 21 illustrates an example user interface 2100 of a contacts manager module, where the contacts manager module is a component of a covert application, according to an embodiment of the invention. According to the embodiment, contacts manager module user interface 2100 includes contacts list 2110, which displays one or more contacts. Contacts list 2110 can categorize the one or more by contacts into contacts that are associated with a specific persona that a user is associated with (i.e., contacts), and contacts that are not associated with the specific persona (i.e., unassociated contacts).

According to the embodiment, contacts manager module user interface 2100 can also display one or more details that are associated with a selected contact to a user. Contacts manager module user interface 2100 can also allow a user to add one or more details and associate the added one or more details with the selected contact. In addition, contacts manager module user interface 2100 can allow a user to edit one or more details that are associated with the selected contact. One example of a detail is identifier 2120, which is a global identifier. A global identifier is a label that can be assigned to a contact that provides more information about the contact. A global identifier can be used to uniquely identify a contact across the covert application, and can be useful when a contact has more than one name associated with it. According to the embodiment, the contacts manager module not only associates the global identifier with the contact, but also associates the global identifier with the persona that creates the identifier.

Other examples of details include name 2130, email address 2140, phone number 2150, physical location 2160, and virtual location 2170, as illustrated in FIG. 21. According to the embodiment, a user can create and edit one or more values for each of the details by entering or modifying a value within each corresponding field. Alternatively, a user can "click" on one of the buttons of detail buttons 2180 and entering a value within the corresponding field. Also according to the embodiment, a user can associate one or more tags with a contact. Tags are previously described above. In the illustrated embodiment of FIG. 21, the contact displayed within contacts manager module user interface 2100 has tags 2190 associated with it. In certain embodiments, details can include notes (not shown in FIG. 21), where a user can add associated information to each detail. For example, if a contact phone number is discovered on a web site, the user can add the phone number to the contact and then add a note to the detail, indicating where the user obtained the contact phone number (e.g., "found on www" or "contact emailed me their phone number").

Figure 22:
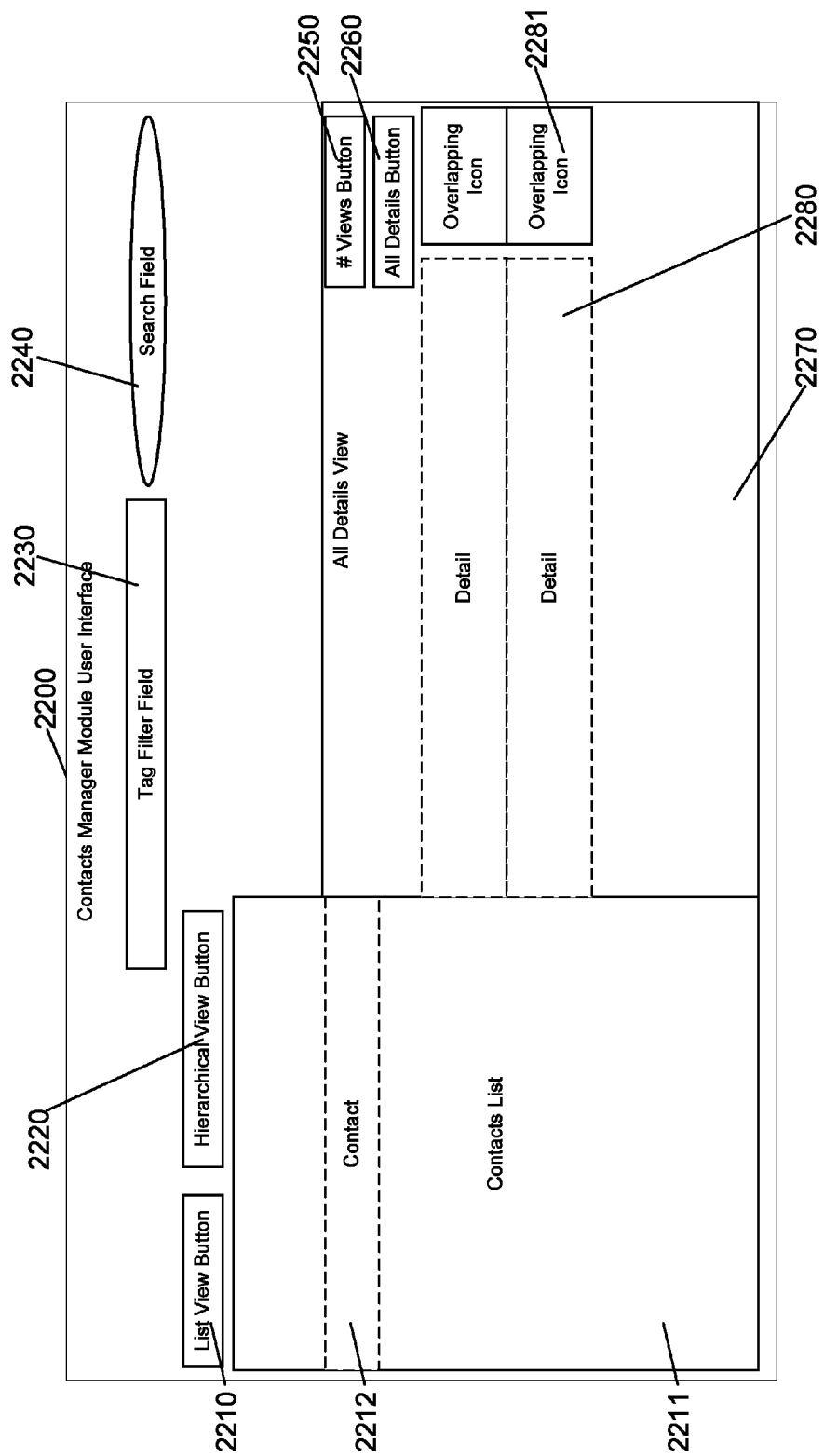
FIG. 22 illustrates another example user interface of a contacts manager module, where the contacts manager module is a component of a covert application, according to an embodiment of the invention.

FIG. 22 illustrates another example user interface 2200 of a contacts manager module, where the contacts manager module is a component of a covert application, according to an embodiment of the invention. Features of contacts manager module user interface 2200 not described in relation to FIG. 21 will now be described. Contacts manager module user interface 2200 includes list view button 2210 and hierarchical view button 2220. When a user "clicks" on list view button 2210, contacts manager module user interface 2200 can display the one or more contacts as a list within a contacts list. For example, as illustrated in FIG. 22, contacts manager module user interface 2200 can display contacts list 2211, that includes one or more contacts, such as contact 2212. When a user "clicks" on hierarchical view button 2220, contacts manager module user interface 2200 can display the one or more contacts grouped by a criteria within the contacts list. Examples of a criteria include a tag, and a persona. A user can toggle between a list view and a hierarchical view of a contact list displayed within contacts manager module user interface 2200 by "clicking" on either list view button 2210 and hierarchical view button 2220.

Contacts manager module user interface 2200 also includes tag filter field 2230. Tag filter field 2230 allows a user use to enter one or more tags. Once a user enters one or more tags, the contacts manager module updates a contacts list displayed within contacts manager module user interface 2200, such as contacts list 2211, to only include contacts that are associated with at least one tag of the one or more tags entered by the user. Contacts manager module user interface 2200 also includes search field 2240. Search field 2240 allows a user to enter a search term. Once a user enters a search term, the contacts manger module updates the contact list displayed within contacts manager module user interface 2200, such as contacts list 2211, to only include contacts that match the search term entered by the user.

Contacts manager module user interface 2200 also includes # Views button 2250. By "clicking" upon # Views button 2250, a user can cause contacts manager module user interface 2200 to display a comparison matrix, as previously described. Contacts manager module user interface 2200 also includes all details button 2260. By "clicking" upon all details button 2260, a user can cause contacts manager module user interface 2200 to displays all the details about a contact across the covert application within a single column view. An example of this view, as illustrated in FIG. 22 is all details view 2270. As illustrated in FIG. 22, all details view 2270 includes one or more details, such as detail 2280.

In one embodiment, contacts manager module user interface 2200 can display an icon next to a detail, such as detail 2280, when a detail is known by more than one of the personas within the covert application. In the illustrated embodiment of FIG. 22, this icon is an icon of two overlapping people, identified as overlapping icon 2281 in FIG. 22. Overlapping icon 2281 indicates that the details is known by multiple personas. Accordingly, contacts manager module user interface 2200 can display a diverse range of information regarding one or more contacts.

Wallet

According to an embodiment, the covert application can provide a wallet module (such as wallet module 480 of FIG. 4), which can store one or more "details" of each persona of the covert application in a centrally organized location, such as a database. As previously described, a detail can be any type of information, such as a name, email, phone number, or locale. A detail can also include a financial account, a phone account, or login information for an Internet service account. Thus, according to the embodiment, the wallet module can provide a robust reference library that contains all the details relating to a user's persona, and the wallet module can be accessed in an easy-to-use manner.

In one embodiment, the wallet module can be integrated with one or more other modules of the covert application. According to the embodiment, the integrated module can access the details stored by the wallet module within the database, and utilize the details within the integrated module. For example, the wallet module can be integrated with an application environment of the covert application. In this example, when a locale detail is created for a persona using the wallet module, the application environment can display the locale as an option when a user is associated with the persona.

As another example, the wallet module can be integrated with a web browser module. According to the embodiment, when a login detail for an Internet service is created for the persona using the wallet module, the web browser module can display the login information when a user, that is associated with the persona, uses the web browser module to browse a web page of the Internet service.

In another example, the wallet module can be integrated with an email client module. According to the embodiment, when an email detail is created for the persona using the wallet module, the email client module can automatically utilize the email detail when a user, that is associated with the persona, transmits an email using the email client module.

In an additional example, the wallet module can provide the covert application a computer profile detail that includes environment settings that can be used to configure environment attributes that are associated with a persona, as previously described. According to the embodiment, the user can create or select a computer profile detail from within the wallet module, for a specific persona, and the computer profile detail can provide the covert application with information necessary to configure environment attributes for that persona as previously described.

Figure 23:
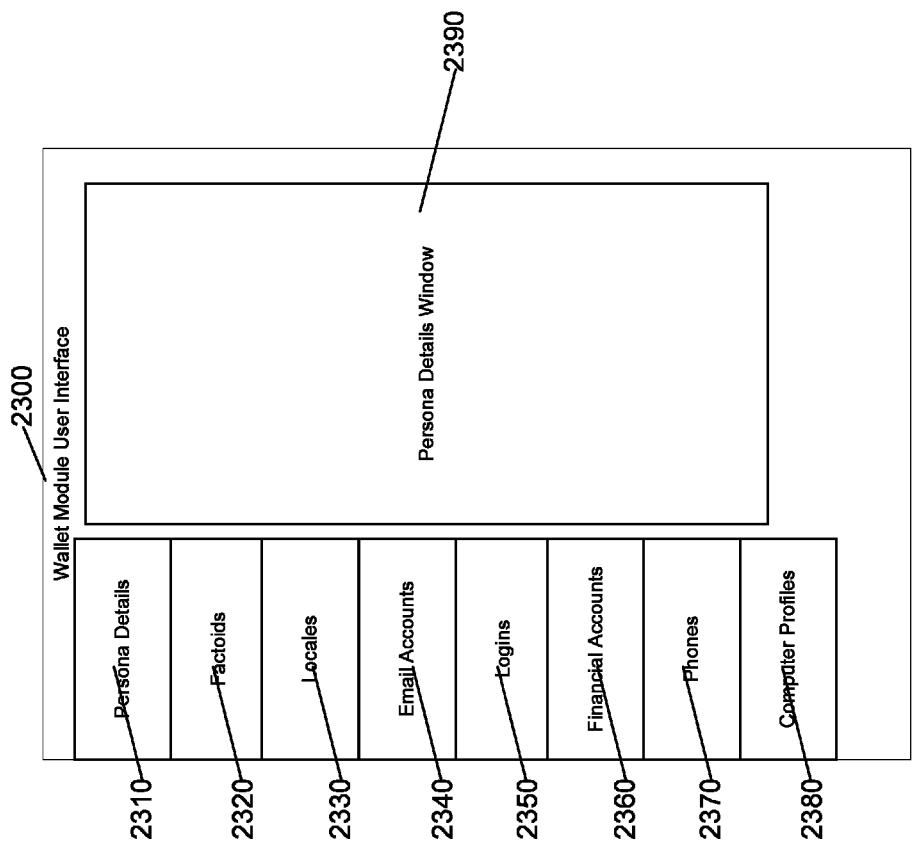
FIG. 23 illustrates an example user interface of a wallet module, where the wallet module is a component of a covert application, according to an embodiment of the invention.

FIG. 23 illustrates an example user interface 2300 of a wallet module, where the wallet module is a component of a covert application, according to an embodiment of the invention. Wallet module user interface 2300 can display one or more details that are associated with a specific persona. In the illustrated embodiment, the one or more details can be categorized by the following categories of the wallet module: persona details 2310, factoids 2320, locales 2330, email accounts 2340, logins 2350, financial accounts 2360, phones 2370, and computer profiles 2380. These categories can also be displayed within wallet module user interface 2300.

Persona details 2310 can include identifying details about a persona, such as a persona identifier, a first name, a list name, a middle name, a nickname, a gender, and a date of birth. These details can be displayed in a window, identified in FIG. 23 as persona details window 2390, and can be created and edited by a user. Factoids 2320 can include any fabricated details that are related to the persona, such as the persona's family members, the persona's employment history, the persona's favorite foods, or the persona's childhood details. Locales 2330 can include locales that are associated with the persona. Locales are described in greater detail in relation to FIG. 24. Email accounts 2340 can include email account details that can be utilized to facilitate email communication between a user associated with the persona and an individual. Email accounts are described in greater detail in relation to FIG. 28. Logins 2350 can include login and account information for Internet services that can be utilized by the persona, such as social media and blog Internet services. Logins are described in greater detail in relation to FIG. 26. Financial accounts 2360 can include financial information that is associated with the persona. Phones 2370 can include phone numbers that are associated with the persona. Computer profiles 2380 can include environment settings that can be used to configure environment attributes that are associated with the persona. Computer profiles are described in greater detail in relation to FIG. 29.

Figure 24:
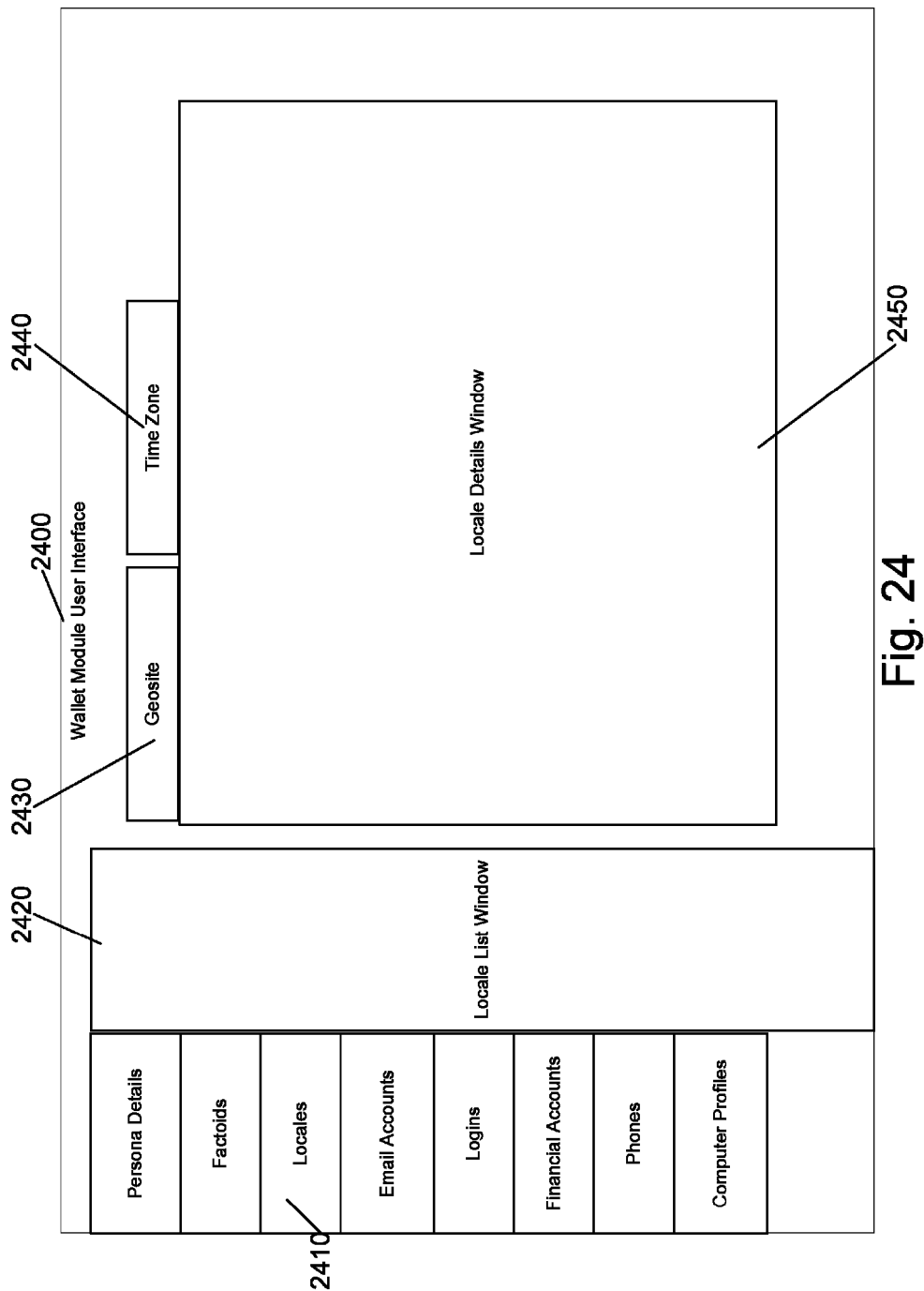
FIG. 24 illustrates another example user interface of a wallet module, where the wallet module is a component of a covert application, according to an embodiment of the invention.

FIG. 24 illustrates another example user interface 2400 of a wallet module, where the wallet module is a component of a covert application, according to an embodiment of the invention. According to the embodiment, wallet module user interface 2400 includes locales 2410. Locales 2410, as previously described, can include locales that are associated with the persona. By "clicking" on locales 2410, wallet module user interface 2400 can display locale details of a persona. Specifically, in an embodiment, by "clicking" on locales 2410, wallet module user interface 2400 can display locale list window 2420, geosite 2430, time zone 2440, and locale details window 2450. Local list window 2420 can display one or more locales that have been created for a persona. Geosite 2430 can display one or more geosites, where a user can select a geosite that is associated with the locale. Time zone 2440 can displays one or more time zones, where a time zone is automatically selected for the locale based on the selected geosite. Locale details window 2450 can display one or more locale details associated with the locale. In accordance with the embodiment, a user can create and edit locale details for a selected locale within local details window 2450.

Figure 25:
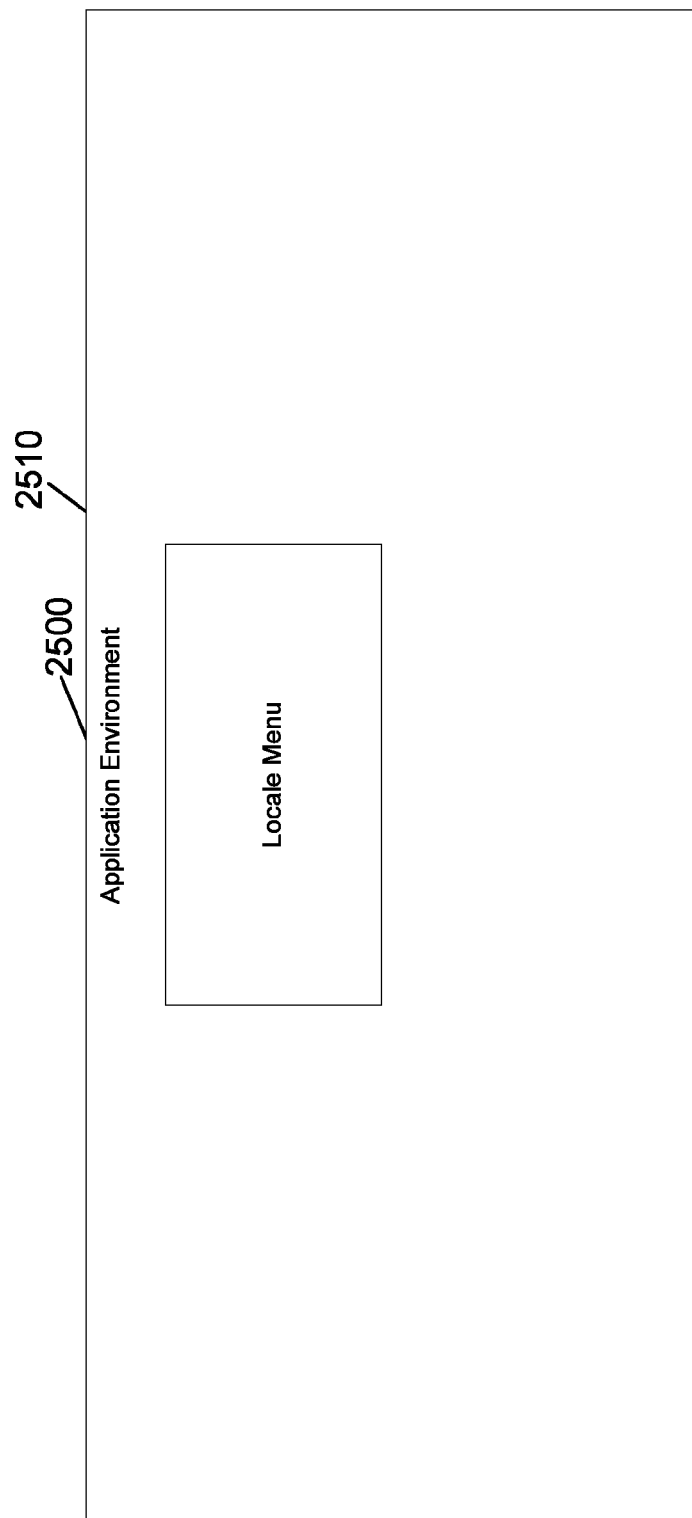
FIG. 25 illustrates an application environment that is integrated with a wallet module, according to an embodiment of the invention.

FIG. 25 illustrates an application environment 2500 that is integrated with a wallet module, according to an embodiment of the invention. According to the embodiment, when a user is associated with a specific persona, application environment 2500 can display locale menu 2510 which includes one or locales associated with the persona. The one or more locales can be based on locale details that have been created for the persona using the wallet module. Thus, according to the embodiment, application environment 2500 can access the one or more locales stored by the wallet module and display them within locale menu 2510. A user can then select a locale from locale menu 2510. By selecting a different locale than the locale currently associated with the persona, the user is able to change the locale associated with the persona.

Figure 26:
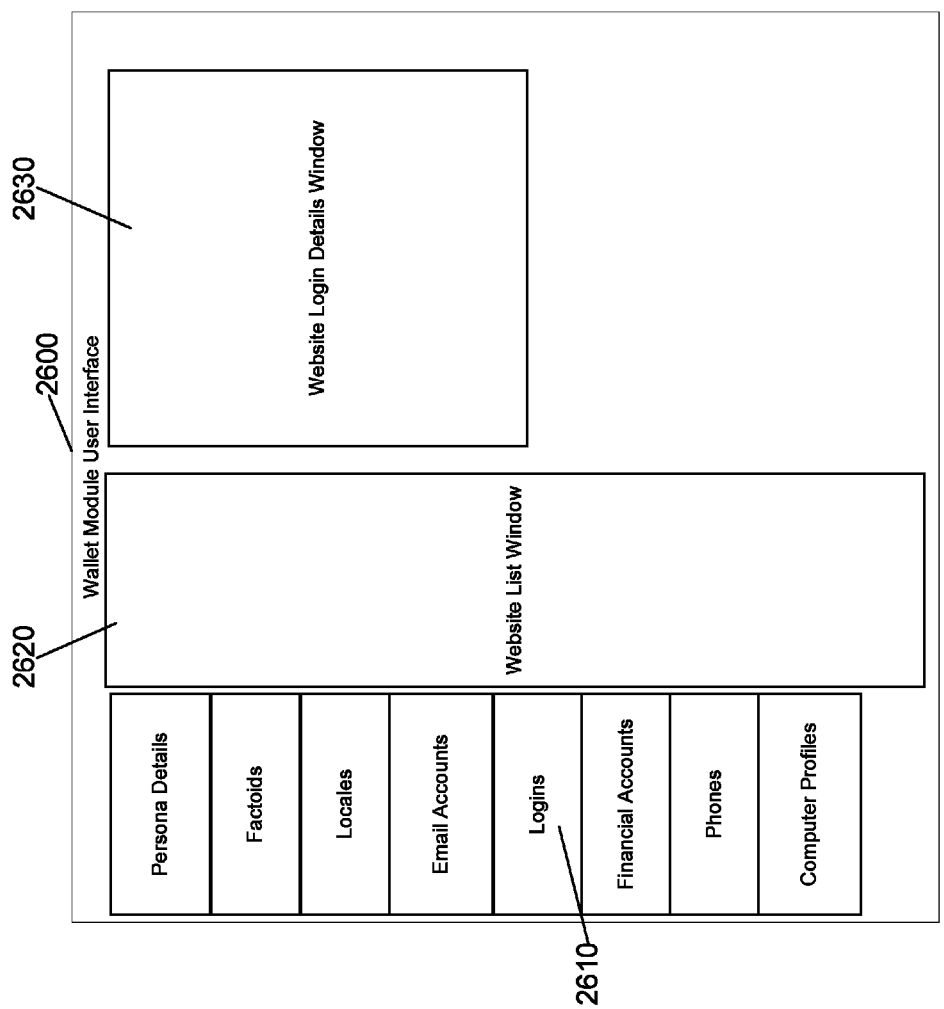
FIG. 26 illustrates another example user interface of a wallet module, where the wallet module is a component of a covert application, according to an embodiment of the invention.

FIG. 26 illustrates another example user interface 2600 of a wallet module, where the wallet module is a component of a covert application, according to an embodiment of the invention. According to the embodiment, wallet module user interface 2600 includes logins 2610. Logins 2610, as previously described, can include login and account information for Internet services that can be utilized by the persona, such as social media and blog Internet services. By "clicking" on logins 2610, wallet module user interface 2600 can display login details of a persona. Specifically, in an embodiment, by "clicking" on logins 2610, wallet module user interface 2600 can display website list window 2620, and website login details window 2630. Website list window 2620 can display one or more websites whose login information has been stored within the wallet module for a persona. Website login details window 2630 can display one or more login details associated with the website, such as a username, password, and other notes. In accordance with the embodiment, a user can create and edit login details for a selected website within website login details window 2630.

Figure 27:
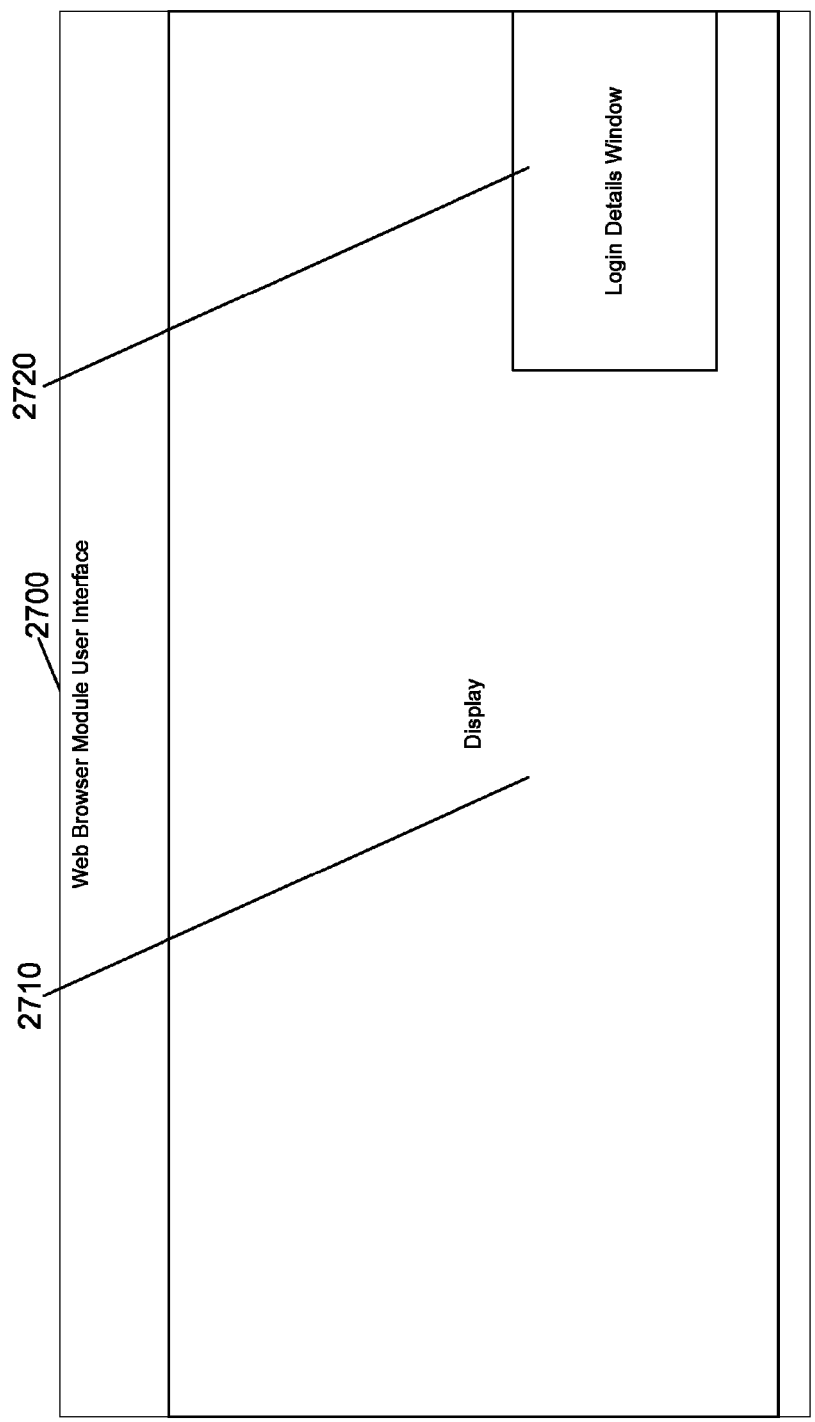
FIG. 27 illustrates a browser module that is integrated with a wallet module, according to an embodiment of the invention.

FIG. 27 illustrates a user interface 2700 of a web browser module that is integrated with a wallet module, according to an embodiment of the invention. According to the embodiment, when a user, that is associated with a persona, uses the web browser module to browse an Internet service website that corresponds to login details stored by the wallet module, web browser module user interface 2700 displays the website within display 2710, and also displays login details window 2720 which includes the login details associated with the Internet service website. Thus, according to the embodiment, web browser module user interface 2700 can access the one or more login details stored by the wallet module and display them within login details window 2720. This feature allows a user to store login information for an Internet service website within the covert application, and then automatically accesses that information whenever the user visits the Internet service website.

Figure 28:
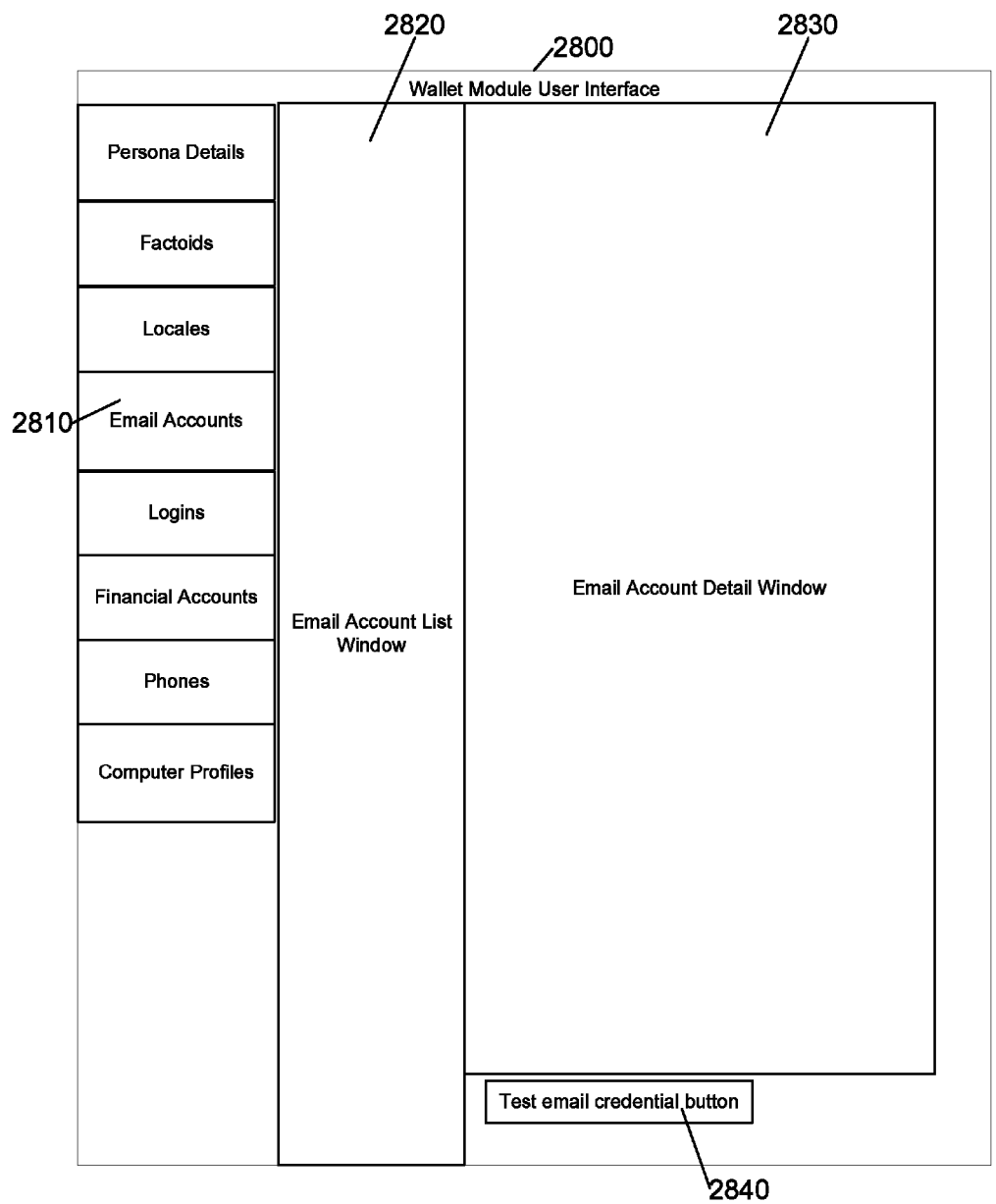
FIG. 28 illustrates another example user interface of a wallet module, where the wallet module is a component of a covert application, according to an embodiment of the invention.

FIG. 28 illustrates another example user interface 2800 of a wallet module, where the wallet module is a component of a covert application, according to an embodiment of the invention. According to the embodiment, wallet module user interface 2800 includes email accounts 2810. Email accounts 2810, as previously described, can include email account details that can be utilized to facilitate email communication between a user associated with the persona and an individual. By "clicking" on email accounts 2810, wallet module user interface 2800 can display email account details of a persona. Specifically, in an embodiment, by "clicking" on email accounts 2810, wallet module user interface 2800 can display email account list window 2820, email account details window 2830 and test email credentials button 2840. Email accounts list window 2820 can display one or more email accounts whose details has been stored within the wallet module for a persona. Email accounts details window 2830 can display one or more details associated with the email account, such as email address, username, and password. Test email credential button 2840 can allow the wallet module to verify the details of the email account. In accordance with the embodiment, once an email account has been verified, the email account will automatically appear as a valid sender email address in a user interface of the email client module.

Figure 29:
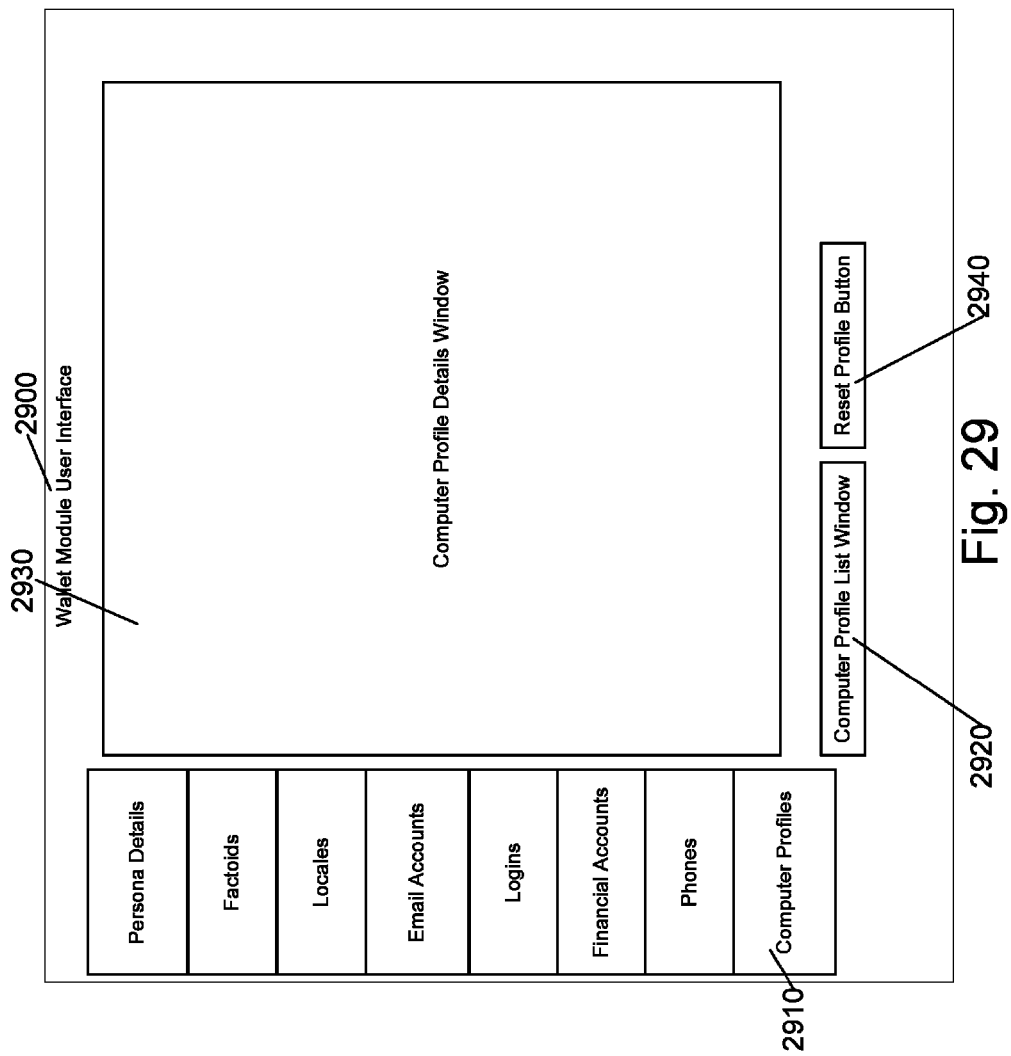
FIG. 29 illustrates another example user interface of a wallet module, where the wallet module is a component of a covert application, according to an embodiment of the invention.

FIG. 29 illustrates another example user interface of a wallet module, where the wallet module is a component of a covert application, according to an embodiment of the invention. According to the embodiment, wallet module user interface 2900 includes computer profiles 2910. Computer profiles 2910, as previously described, can include environment settings that can be used to configure environment attributes that are associated with the persona. By "clicking" on computer profiles 2910, wallet module user interface 2900 can display computer profile details of a persona. Specifically, in an embodiment, by "clicking" on computer profiles 2910, wallet module user interface 2900 can display computer profile list window 2920, computer profile details window 2930, and reset profile button 2940. Computer profile list window 2920 can display one or more computer profiles whose environment attributes have been configured within the wallet module for a persona. Computer profile details 2930 can display one or more environment settings of the computer profile, such as label, device make, device model, operating system description and web browser description. In one embodiment, a user can edit the one or more environment settings of the computer profile. In another embodiment, the one or more environment settings are pre-configured by a system administrator of the covert application, and a user is unable to edit the one or more environment settings of the computer profile. By "clicking" on reset profile button 2940, a user can switch from one computer profile displayed within computer profile list window 2920 to another computer profile displayed within computer profile list window 2920. In accordance with the embodiment, by switching from one computer profile to another computer profile displayed within computer profile list window 2920, the wallet module can cause the covert application to configure an environment for the persona, as previously described. The configuring of the environment for the persona can be performed by an integrated module of the covert application.

Drop Box

According to an embodiment, the covert application can provide a drop box module (such as drop box module 485 of FIG. 4), which can provide a quarantined area that includes various security processes which determine if a file is safe to move through the covert application. Thus, the drop box module can provide a mechanism for getting digital information, files, or documents in or out of the covert application. In one embodiment, the drop box module can be used to export certain types of documents, such as Microsoft Word® files, Microsoft Excel® files, text documents, compressed files, and third-party applications. A user can upload to, or download from, the drop box module, one or more files. The user can also transfer the files to or from a portable memory cord or other storage device into or from a portal computer terminal designated specifically for this purpose. Furthermore, downloading a file from the covert application is performed in a similar way, using the drop box module as an entry point for a quarantined area. A journal module can further allow the user to "drag and drop" data that is stored within the covert application (and that can be displayed) within a quarantined area that can be provided by the drop box module. The drop box module can further export the data that is stored within the covert application into a file, such as a tab-delimited file.

Covert Application Methods

Figure 30:
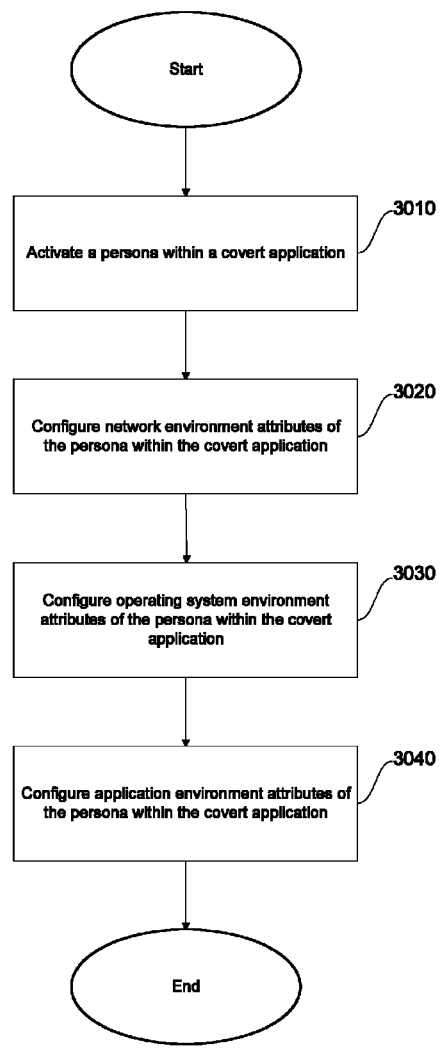
FIG. 30 illustrates a method, according to an embodiment of the invention.

FIG. 30 illustrates a method, according to an embodiment of the invention. The steps of each method and algorithm described in connection with the embodiments disclosed herein may be embodied directly in hardware, in a computer program executed by a processor, or in a combination of the two. A computer program may be embodied on a computer-readable medium, such as a storage medium. For example, a computer program may reside in RAM, flash memory, ROM, EPROM, EEPROM, registers, hard disk, a removable disk, a CD-ROM, or any other form of storage medium known in the art. An exemplary storage medium may be coupled to the processor such that the processor can read information from, and write information to, the storage medium. In the alternative, the storage medium may be integral to the processor. The processor and the storage medium may reside in an application specific integrated circuit (ASIC). In the alternative, the processor and the storage medium may reside as discrete components.

At step 3010, a persona is activated within a covert application. The activating the persona can further include configuring an operating system for the persona, configuring an application for the persona, and configuring a locale for the persona.

At step 3020, one or more network environment attributes of the persona are configured within the covert application. The configuring the one or more network environment attributes of the persona can be based on the locale that is configured for the persona. The configuring the one or more network environment attributes can include altering identifiers that include location information within one or more network packets transmitted by the covert application at the direction of the persona.

At step 3030, one or more operating system environment attributes of the persona are configured within the covert application. The configuring the one or more operating system environment attributes can be based on the operating system that is configured for the persona. The configuring the one or more operating system environment attributes can include altering identifiers of one or more operating system attributes associated with the persona.

At step 3040, one or more application environment attributes of the persona are configured within the covert application. The configuring the one or more application environment attributes can be based on the application. The configuring the one or more application system environment attributes can include altering identifiers of one or more attributes for the application associated with the persona. The application can include a web browser.

Figure 31:
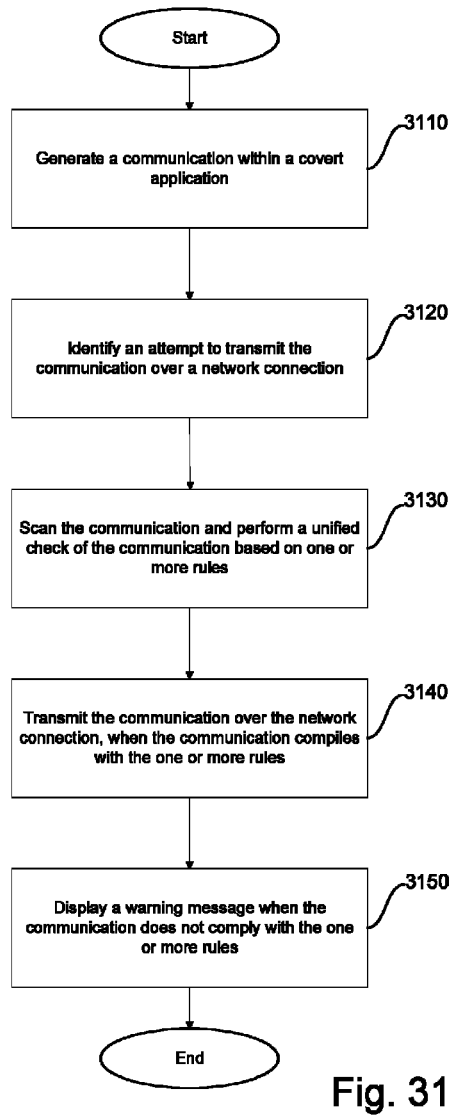
FIG. 31 illustrates another method, according to an embodiment of the invention.

FIG. 31 illustrates another method, according to an embodiment of the invention. At step 3110, a communication is generated within a covert application. At step 3120, an attempt to transmit the communication over a network connection is identified. At step 3130, the communication is scanned and a unified check of the communication is performed based on one or more rules. At step 3140, the communication is transmitted over the network connection, when the communication complies with the one or more rules. At step 3150, a warning message is displayed, when the communication does not comply with the one or more rules.

In one embodiment, the one or more rules include a time rule. In this embodiment, the performing the unified check includes analyzing a current time of the communication to determine whether the communication is being transmitted during a normal time period, and the warning message indicates that the communication is being transmitted outside the normal time period. According to the embodiment, the communication is transmitted over the network connection, when a user of the covert application confirms that the communication is to be transmitted outside the normal time period. In accordance with the embodiment, the communication is deleted, when the user cancels the transmission of the communication. Furthermore, according to the embodiment, the communication is transmitted over the network connection at a scheduled time, when a user schedules the communication to be transmitted at the scheduled time. The communication is transmitted at the scheduled time, even when a persona associated with the user is not activated at the scheduled time.

In another embodiment, the one or more rules include an email rule. In this embodiment, the performing the unified check includes analyzing a recipient email address to determine whether a persona associated with a user of the covert application has ever transmitted a communication to the recipient email address, and the warning message includes a first warning message that indicates that the recipient is not known to the persona associated with the user. In this embodiment, the performing the unified check further includes analyzing the recipient email address to determine whether any persona within the covert application has ever transmitted a communication to the recipient email address, and the warning message includes a second warning message that indicates the recipient is known to one or more other persons within the covert application. According to the embodiment, a contact associated with the recipient is created and the communication is transmitted over the network connection when the user indicates that the contact is to be created. In accordance with the embodiment, the communication is transmitted over the network connection when the user confirms that the communication is to be transmitted. Furthermore, according to the embodiment, the communication is deleted, when the user cancels the transmission of the communication.

In another embodiment, the one or more rules include a cultural rule. In this embodiment, the performing the unified check includes analyzing text of the communication to determine the text is consistent with one or more cultural norms associated with a persona associated with a user of the covert application, and the warning message indicates that the communication includes one or more words that is inconsistent with the one or more cultural norms associated with the persona and indicates the one or more inconsistent words. According to the embodiment, the warning message displays the text of the communication, highlighting the one or more inconsistent words in a color that is different from a color of the text of the communication. In accordance with the embodiment, the communication is transmitted over the network connection when the user confirms that the communication is to be transmitted with the one or more inconsistent words. The communication is deleted when the user cancels the transmission of the communication. Furthermore, the communication is transmitted over the network connection when the user corrects at least one of the inconsistent words.

In another embodiment, the one or more rules include a persona rule. In this embodiment, the performing the unified check includes analyzing text of the communication to determine if the text is consistent with information associated with a persona associated with a user of the covert application, and the warning message indicates that the communication includes text that is inconsistent with the information associated with the persona and indicates the text. According to the embodiment, the warning message displays the text of the communication, highlighting the inconsistent text in a color that is different from a color of the text of the communication. In accordance with the embodiment, the communication is transmitted over the network connection when the user confirms that the communication is to be transmitted with the inconsistent text. The communication is deleted when the user cancels the transmission of the communication. The communication is transmitted over the network connection when the user corrects the inconsistent text.

In one embodiment, the communication can include at least one of an email message, an instant message, a social networking service message, an Internet chat message, and a blog message.

Figure 32:
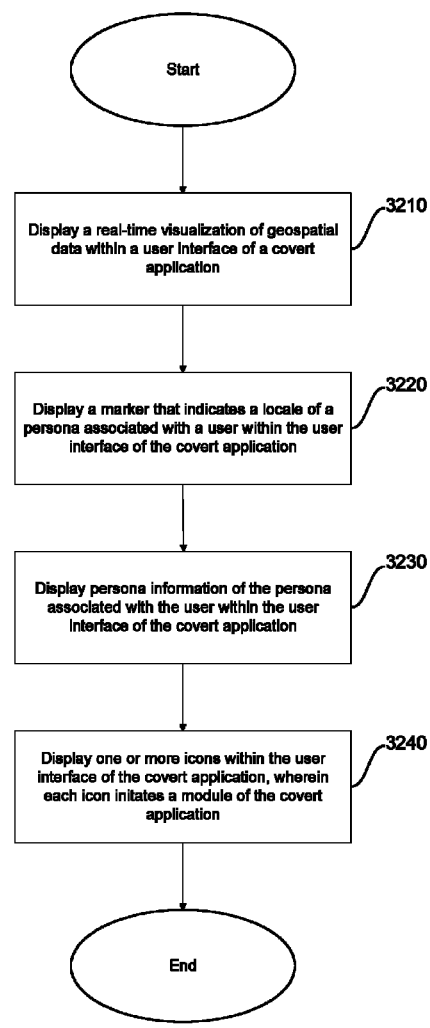
FIG. 32 illustrates another method, according to an embodiment of the invention.

FIG. 32 illustrates another method, according to an embodiment of the invention. At step 3210, a real-time visualization of geospatial data is displayed within a user interface of a covert application. In one embodiment, the real-time visualization of the geospatial data is automatically panned and zoomed to focus on a location of a geospatial event, when the geospatial event is generated.

At step 3220, a marker that indicates a locale of a persona associated with a user is displayed within the user interface of the covert application. In one embodiment, the marker is automatically moved to a new locale displayed within the user interface of the covert application, when the locale of the persona is changed. In another embodiment, the marker is automatically moved to a new locale displayed within the user interface of the covert application, when a different persona is associated with the user.

At step 3230, persona information of the persona associated with the user is displayed within the user interface of the covert application. In one embodiment, the persona information is automatically updated when the locale of the persona is changed. In another embodiment, a global identity management reference is displayed within the user interface of the covert application, where the global identity management reference includes a collection of Internet information stored within the covert application.

At step 3240, one or more icons are displayed within the user interface of the covert application, where each icon initiates a module of the covert application.

Figure 33:
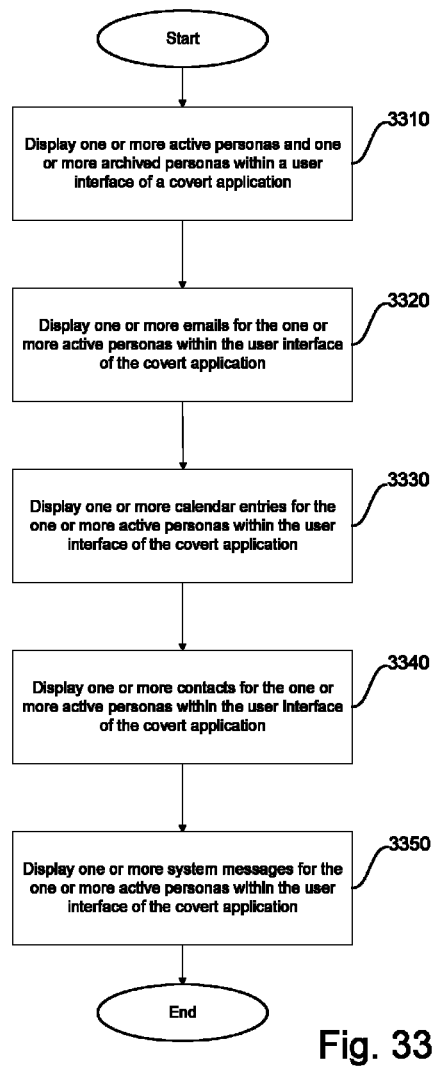
FIG. 33 illustrates another method, according to an embodiment of the invention.

FIG. 33 illustrates another method, according to an embodiment of the invention. At step 3310, one or more active personas and one or more archived personas are displayed with a user interface of a covert application. In one embodiment, information about each active persona is also displayed. The information includes a persona identifier, a geosite, a date, and a time. In another embodiment, at least one active persona can be archived by transferring the at least one active persona to the one or more archived personas. In the embodiment, at least one archived persona can be reactivated by transferring the at least one archived persona to the one or more active personas.

At step 3320, one or more emails for the one or more active personas are displayed within the user interface of the covert application. In one embodiment, the one or more emails are categorized by active persona. In the embodiment, the one or more emails include one or more unread emails associated with an active persona of the one or more active personas.

At step 3330, one or more calendar entries for the one or more active personas are displayed within the user interface of the covert application. In one embodiment, each calendar entry includes an event, an active persona associated with the event, and a location associated with the event.

At step 3340, one or more contacts for the one or more active personas are displayed within the user interface of the covert application. In one embodiment, the one or more contacts are categorized by active persona. In the embodiment, the one or more contacts include one or more contacts associated with an active persona of the one or more active personas.

At step 3350, one or more system messages for the one or more active persons are displayed within the user interface of the covert application. In one embodiment, the one or more system messages each include a notification message about a persona communication within the covert application.

Figure 34:
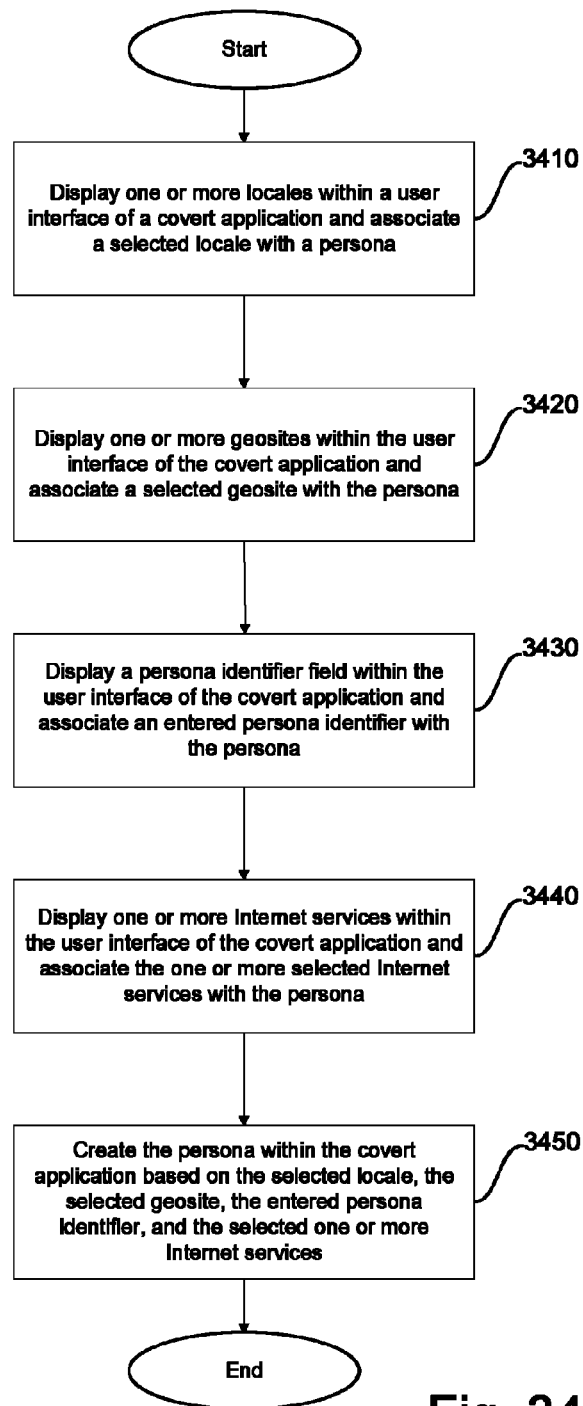
FIG. 34 illustrates another method, according to an embodiment of the invention.

FIG. 34 illustrates another method, according to an embodiment of the invention. At step 3410, one or more locales are displayed within a user interface of a covert application, and a selected locale is associated is associated with a persona. In one embodiment, the one or more locales can be displayed within the user interface in a drop-down list, and a user can select one of the locales from the drop-down list. Upon the selection of the locale by the user, the selected locale is associated with a persona that the user is creating. In one embodiment, the selected locale can be set as a default locale for the persona. According to this embodiment, when the persona is activated, the default locale can be used to configure network environment attributes associated with the persona so that network traffic associated with the persona can appear to originate from the default locale, rather than an actual physical location of the covert application. In one embodiment, the locale is a country.

At step 3420, one or more geosites are displayed within the user interface of the covert application, and a selected geosite is associated with the persona. In one embodiment, the one or more geosites that are displayed within the user interface can be based on the selected locale.

At step 3430, a persona identifier field is displayed within the user interface of the covert application, and an entered persona identifier is associated with the persona. In one embodiment, one or more persona information fields can also be displayed within the user interface, and entered persona information is associated with the persona.

At step 3440, one or more Internet services are displayed within the user interface of the covert application, and the one or more selected Internet services are associated with the persona. In one embodiment, a list of one or more Internet services can be displayed within the user interface. In one embodiment, the list is a drop-down list. According to the embodiment, upon the selection of a Internet service from the list of one or more Internet services, a web page of the Internet service can be displayed within the user interface, where the web page allows a user to signup for the Internet service. Upon the entering of signup information both within the web page and the user interface, the signup information is associated with the persona. According to the embodiment, the covert application can automatically interface with the Internet service without input from the user using the signup information associated with the persona. In one embodiment, the one or more Internet serviced displayed within the user interface can be default Internet services that are selected using a global identity management reference based on a region that includes the selected locale of the persona.

At step 3450, the persona is created within the covert application based on the selected locale, the selected geosite, the entered persona identifier, and the selected one or more Internet services. According to the embodiment, the created persona can be displayed in an active persona window that is displayed by a dashboard module of the covert application.

Figure 35:
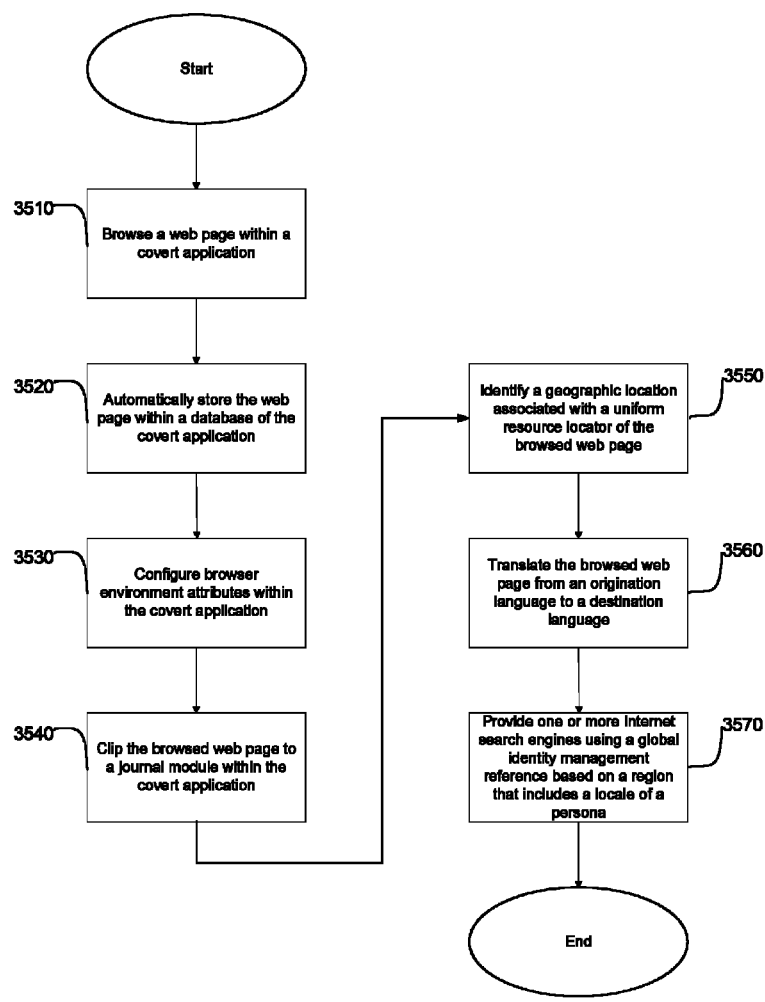
FIG. 35 illustrates another method, according to an embodiment of the invention.

FIG. 35 illustrates another method, according to an embodiment of the invention. At step 3510, a web page is browsed within a covert application. In one embodiment, the browsed web page is displayed within a user interface of the covert application.

At step 3520, the browsed web page is automatically stored within a database of the covert application. In one embodiment, the browsed web page is automatically forensically hashed. According to the embodiment, the browsed web page is hashed to produce a digital signature and the digital signature is embedded within the browsed web page to verify that the browsed web page has not been altered. In an embodiment, the automatic storing of the browsed web page can include full-text indexing the browsed web page. The full-text indexing can include create one or more indexes based on the text of the browsed web page, where each index of the one or more indexes corresponds to a word contained within the text of the browsed web page. In one embodiment, each browsed page of a plurality of browsed web pages can be automatically stored within the database of the covert application.

At step 3530, browser environment attributes are configured within the covert application. In one embodiment, the configuration of the browser environment attributes can include altering identifiers within the covert application so that the identifiers are consistent with a profile associated with a persona.

At step 3540, the browsed web page is clipped to a journal module within the covert application. The clipping of the browsed web page to the journal module can include storing the browsed web page, by the journal module, to a database of the covert application, where the browsed web page can be retrieved by a user associated with a persona, using the journal module.

At step 3550, a geographic location associated with a uniform resource locator of the browsed web page is identified. At step 3560, the browsed web page is translated from an origination language to a destination language. At step 3570, one or more Internet search engines is provided using a global identity management reference based on a region that includes a locale of a persona.

Figure 36:
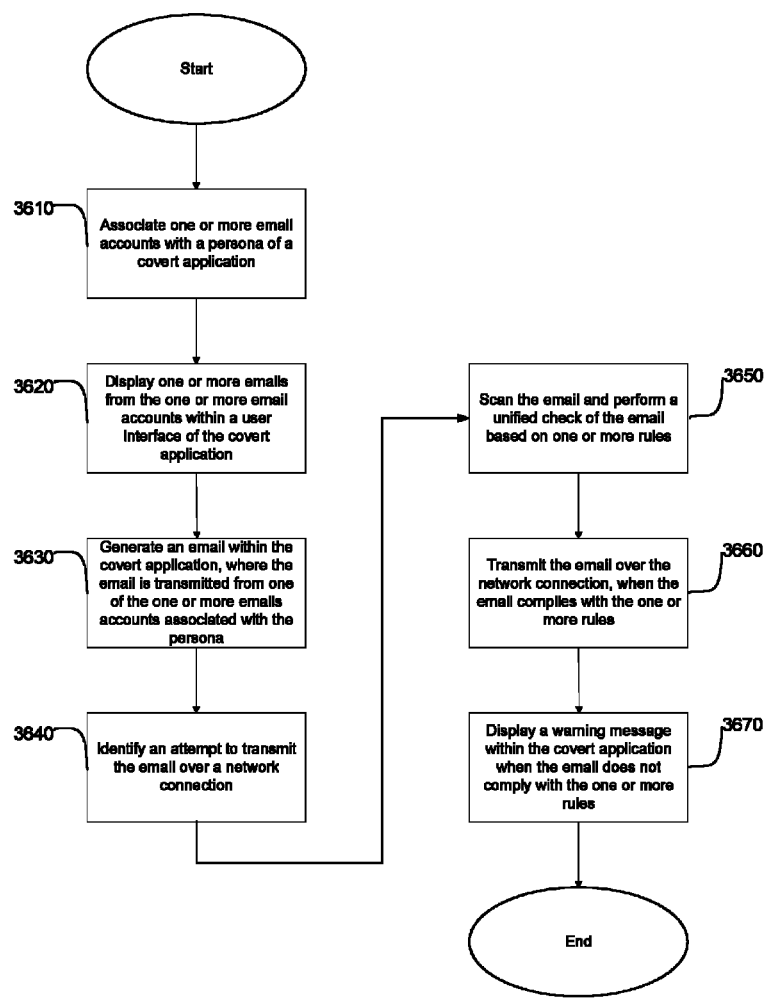
FIG. 36 illustrates another method, according to an embodiment of the invention.

FIG. 36 illustrates another method, according to an embodiment of the invention. At step 3610, one or more email accounts are associated with a persona of a covert application. In one embodiment, at least one email account of the one or more email accounts can be an email account that is created before the persona is created. In another embodiment, at least one email account of the one or more email accounts can be an email account that is created simultaneously when the persona is created.

At step 3620, one or more emails from the one or more email accounts are displayed within a user interface of the covert application. In one embodiment, the one or more emails can be categorized by email account within the user interface. In another embodiment, at least one email of the one or more emails can be clipped to a journal module within the covert application. According to the embodiment, the email can be clipped by storing the email, using the journal module, to a database of the covert application, where the email can be retrieved by a user associated with a persona, using the journal module. In one embodiment, the email can be associated with one or more tags.

At step 3630, an email is generated within the covert application, where the email is transmitted from one of the one or more email accounts associated with the persona. In one embodiment, the email account that the email is transmitted from can be selected by a user.

At step 3640, an attempt to transmit the email over a network connection is identified. At step 3650, the email is scanned and a unified check of the email is performed based on one or more rules. At step 3660, the email is transmitted over the network connection, when the email complies with the one or more rules. At step 3670, a warning message is displayed, when the email does not comply with the one or more rules.

In one embodiment, the one or more rules include a time rule. In this embodiment, the performing the unified check includes analyzing a current time of the email to determine whether the email is being transmitted during a normal time period, and the warning message indicates that the email is being transmitted outside the normal time period. According to the embodiment, the email is transmitted over the network connection, when a user of the covert application confirms that the email is to be transmitted outside the normal time period. In accordance with the embodiment, the email is deleted, when the user cancels the transmission of the email. Furthermore, according to the embodiment, the email is transmitted over the network connection at a scheduled time, when a user schedules the email to be transmitted at the scheduled time. The email is transmitted at the scheduled time, even when a persona associated with the user is not activated at the scheduled time.

In another embodiment, the one or more rules include an email rule. In this embodiment, the performing the unified check includes analyzing a recipient email address to determine whether a persona associated with a user of the covert application has ever transmitted an email to the recipient email address, and the warning message includes a first warning message that indicates that the recipient is not known to the persona associated with the user. In this embodiment, the performing the unified check further includes analyzing the recipient email address to determine whether any persona within the covert application has ever transmitted an email to the recipient email address, and the warning message includes a second warning message that indicates the recipient is known to one or more other persons within the covert application. According to the embodiment, a contact associated with the recipient is created and the email is transmitted over the network connection when the user indicates that the contact is to be created. In accordance with the embodiment, the email is transmitted over the network connection when the user confirms that the email is to be transmitted. Furthermore, according to the embodiment, the email is deleted, when the user cancels the transmission of the email.

In another embodiment, the one or more rules include a cultural rule. In this embodiment, the performing the unified check includes analyzing text of the email to determine the text is consistent with one or more cultural norms associated with a persona associated with a user of the covert application, and the warning message indicates that the email includes one or more words that is inconsistent with the one or more cultural norms associated with the persona and indicates the one or more inconsistent words. According to the embodiment, the warning message displays the text of the email, highlighting the one or more inconsistent words in a color that is different from a color of the text of the email. In accordance with the embodiment, the email is transmitted over the network connection when the user confirms that the email is to be transmitted with the one or more inconsistent words. The email is deleted when the user cancels the transmission of the email. Furthermore, the email is transmitted over the network connection when the user corrects at least one of the inconsistent words.

In another embodiment, the one or more rules include a persona rule. In this embodiment, the performing the unified check includes analyzing text of the email to determine if the text is consistent with information associated with a persona associated with a user of the covert application, and the warning message indicates that the email includes text that is inconsistent with the information associated with the persona and indicates the text. According to the embodiment, the warning message displays the text of the email, highlighting the inconsistent text in a color that is different from a color of the text of the email. In accordance with the embodiment, the email is transmitted over the network connection when the user confirms that the email is to be transmitted with the inconsistent text. The email is deleted when the user cancels the transmission of the email. The email is transmitted over the network connection when the user corrects the inconsistent text.

Figure 37:
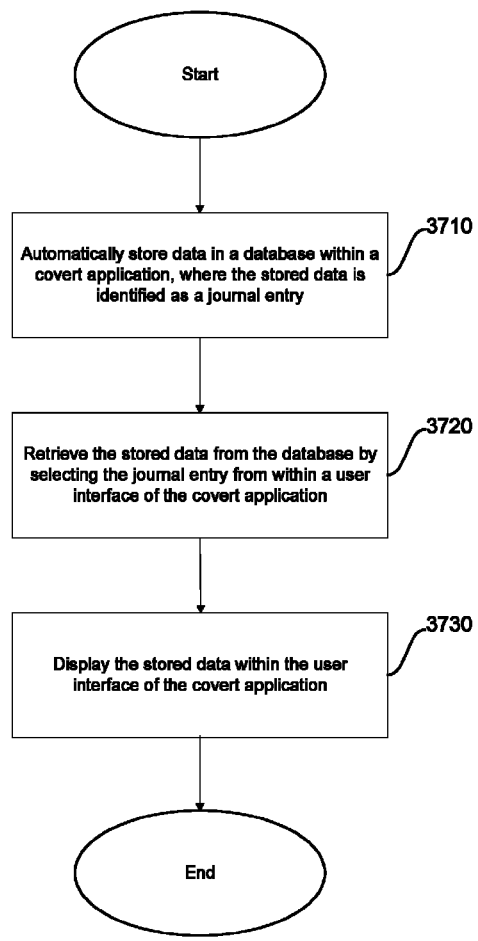
FIG. 37 illustrates another method, according to an embodiment of the invention.

FIG. 37 illustrates another method, according to an embodiment of the invention. At step 3710, data is automatically stored in a database within a covert application, where the stored data is identified as a journal entry. The data can include one of, a browsed web page, an image, an email, a contact, a geospatial event, and text.

In one embodiment, the data is automatically forensically hashed. According to the embodiment, the data is hashed to produce a digital signature and the digital signature is embedded within the data to verify that the data has not been altered. In an embodiment, the automatic storing of the data can include full-text indexing the data. The full-text indexing can include create one or more indexes based on the text of the data, where each index of the one or more indexes corresponds to a word contained within the text of the data.

In one embodiment, the data is clipped from a module within the covert application. In an alternate embodiment, the data is directly entered within the user interface of the covert application. In one embodiment the data is stored using one or more tags to describe the data.

At step 3720, the stored data is retrieved from the database by selecting the journal entry from within a user interface of the covert application. At step 3730, the stored data is displayed within the user interface of the covert application. In one embodiment, a journal entry that contains stored data can be searched within the covert application.

Figure 38:
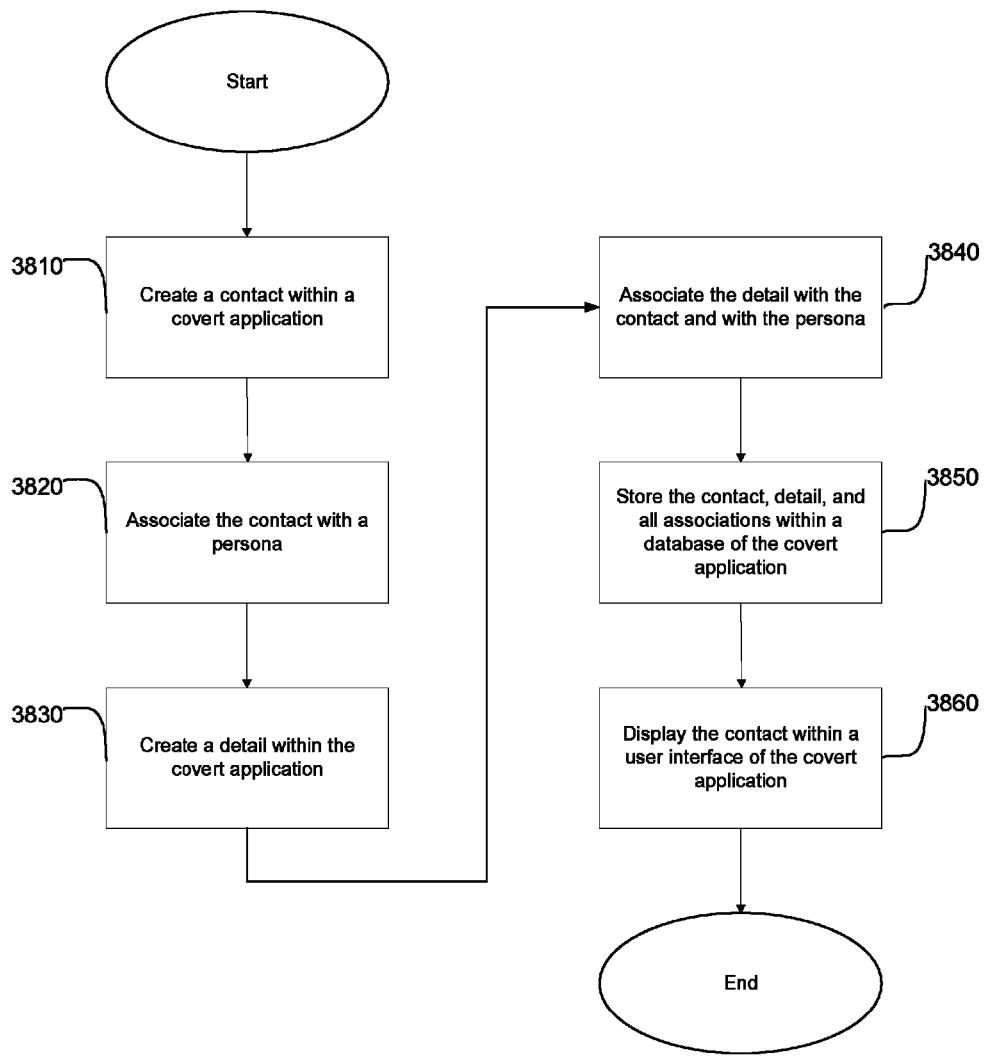
FIG. 38 illustrates another method, according to an embodiment of the invention.

FIG. 38 illustrates another method, according to an embodiment of the invention. At step 3810, a contact is created within a covert application. In one embodiment, a contact represents a person of interest for one or more personas within the covert application, and can contain one or more details. According to the embodiment, the contact can be created using a user interface of the covert application.

At step 3820, the contact is associated with a persona. In one embodiment, the persona is a persona that is associated with a user of the covert application that creates the contact. In an alternate embodiment, the contact is identified as an unassociated contact. In accordance with the embodiment, the contact can be identified as an unassociated contact when it is created by a user of the covert application that is not associated with a specific persona.

At step 3830, a detail is created within the covert application. In one embodiment, a detail can represent any type of information, such as a name, email, and phone number. According to the embodiment, the detail can be created using a user interface of the covert application.

At step 3840, the detail is associated with the contact and with the persona. In one embodiment, the persona is a persona that is associated with a user of the covert application that creates the detail. In an alternate embodiment, the detail is identified as an unassociated detail. In accordance with the embodiment, the detail can be identified as an unassociated detail when it is created by a user of the covert application that is not associated with a specific persona.

At step 3850, the contact, detail, and all associations are stored within a database of the covert application. According to the embodiment, the associations can include the association between the contact and the persona, the association between the detail and the contact, and the association between the detail and the persona.

At step 3860, the contact is displayed within a user interface of the covert application. In an embodiment, one or more details associated with the contact are also displayed within the user interface of the covert application. In one embodiment, all details associated with the contact can be displayed within the user interface of the covert application. In another embodiment, only details associated with the contact, that are also associated with a persona that is associated with a user of the covert application, are displayed. This is identified as a "persona-specific" view. In an embodiment, a comparison matrix can also be displayed, where a comparison matrix includes a matrix that includes one or more details associated with the contact, and one or more persona, where each persona is associated with at least one detail.

Figure 39:
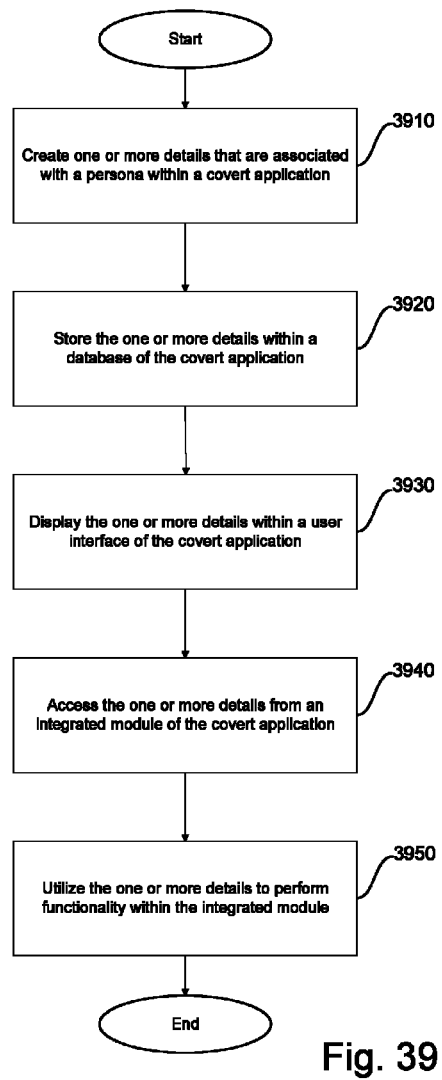
FIG. 39 illustrates another method, according to an embodiment of the invention.

FIG. 39 illustrates another method, according to an embodiment of the invention. At step 3910, one or more details can be created that are associated with a persona within a covert application. In one embodiment, the one or more details can include at least one persona detail. A persona detail is an identifying detail about the persona. In another embodiment, the one or more details can include at least one factoid. A factoid is a fabricated detail about the persona. In another embodiment, the one or more details can include at least one locale. A locale is a locale associated with the persona. In another embodiment, the one or more details can include at least one email account. An email account is an email account detail that is utilized to facilitate email communication between a user associated with the persona and an individual. In another embodiment, the one or more details can further include a login. The login is login and account information for an Internet service that is utilized by the persona. In another embodiment, the one or more details can further include at least one financial account. A financial account is financial information that is associated with the persona. In another embodiment, the one or more details can further include at least one phone. The phone is a phone number that is associated with the persona. In another embodiment, the one or more details can further include at least one computer profile. A computer profile is a profile that includes one or more environment settings that are used to configure environment attributes that are associated with the persona.

At step 3920, the one or more details are stored within a database of the covert application. According to the embodiment, the one or details that are stored within the database can be associated with the persona.

At step 3930, the one or more details are displayed within a user interface of the covert application. According to the embodiment, the one or more details can be viewed or edited by a user of the covert application.

At step 3940, the one or more details are accessed from an integrated module of the covert application. In one embodiment, the one or more details can be accessed from an integrated application environment of the covert application. In this embodiment, the one or more details can include one or more locales. In another embodiment, the one or more details can be accessed from an integrated web browser module of the covert application. In this embodiment, the one or more details can include one or more logins. In another embodiment, the one or more details can be accessed from an integrated email client module of the covert application. In this embodiment, the one or more details can include one or more email accounts. In another embodiment, the one or more details can be accessed from another module of the covert application. In this embodiment, the one or more details can include one or more computer profiles.

At step 3950, the one or more details are utilized to perform functionality within the integrated module. In one embodiment, where the integrated module is an integrated application environment, the functionality can include displaying the one or more locales within a user interface of the integrated application environment. In another embodiment, where the integrated module is an integrated web browser module, the functionality can include displaying the one or more logins within a user interface of the integrated web browser module. In another embodiment, where the integrated module is an integrated email client module, the functionality can include displaying the one or more email accounts as valid sender email addresses within a user interface of the integrated email client module. In another embodiment, where the integrated module is another module of the covert application, the functionality can include configuring environment attributes for the persona based on the one or more computer profiles within the integrated module of the covert application.

According to an embodiment, by providing a comprehensive suite of modules, the covert application can dramatically reduce the time required to perform cyber operations while greatly improving the security of those operations, and reducing inadvertent human errors. In addition, by automating many of the tasks required to successfully perform cyber operations, the covert application can also reduce the skills required to perform covert cyber operations successfully, thus increasing the number of individuals who can project their industry experience in conducting covert operations into the Internet environment.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    activating a persona within a covert application, wherein the persona comprises a persistent digital identity that represents a user's presence on the Internet, wherein the covert application comprises a persona builder module user interface that displays a plurality of selectable buttons, and wherein the activating the persona further comprises clicking on one of a displayed build persona button or a developed persona button of the plurality of selectable buttons;
    configuring one or more network environment attributes of the persona within the covert application;
    configuring one or more operating system environment attributes of the persona within the covert application; and
    configuring one or more application environment attributes of the persona within the covert application,
    wherein the activating the persona further comprises configuring a locale for the persona, wherein the locale is a geographic location where the persona purports to be located, which is different from an actual geographic location of the persona where network traffic originates,
    wherein the configuring the one or more network environment attributes of the persona is based on the locale that is configured for the persona, and
    wherein the configuring the one or more network environment attributes comprises altering identifiers that comprise location information within one or more network packets transmitted by the covert application at a direction of the persona;
    generating a communication within the covert application;
    rerouting the network traffic of the communication to the purported geographic location that is different from the actual geographic location of the persona where the network traffic originates;
    identifying an attempt to transmit the communication over a network connection;
    scanning the communication and performing a unified check of the communication based on one or more rules;
    transmitting the communication over the network connection, when the communication complies with the one or more rules; and
    displaying a warning message, when the communication does not comply with the one or more rules,
    wherein the one or more rules include a time rule, an email address rule, a cultural rule, or a persona rule.

2. The method of claim 1, wherein the activating the persona further comprises:
    configuring an operating system for the persona; and
    configuring an application for the persona.

3. The method of claim 2, wherein the configuring the one or more operating system environment attributes is based on the operating system that is configured for the persona.

4. The method of claim 2, wherein the configuring the one or more application environment attributes is based on the application that is configured for the persona.

5. The method of claim 2, wherein the application comprises a web browser.

6. The method of claim 1, wherein the configuring the one or more operating system environment attributes comprises altering identifiers of one or more operating system attributes associated with the persona.

7. The method of claim 1, wherein the configuring the one or more application system environment attributes comprises altering identifiers of one or more attributes for an application associated with the persona.

8. The method of claim 1, further comprising:
    displaying a real-time visualization of geospatial data within a user interface of the covert application;
    displaying a marker that indicates a locale of a persona associated with a user within the user interface of the covert application;
    displaying persona information of the persona associated with the user within the user interface of the covert application; and
    displaying one or more icons within the user interface of the covert application, wherein each icon initiates a module of the covert application.

9. The method of claim 1, further comprising:
    displaying one or more active personas and one or more archived personas within a user interface of the covert application;
    displaying one or more emails for the one or more active personas within the user interface of the covert application;
    displaying one or more calendar entries for the one or more active personas within the user interface of the covert application;
    displaying one or more contacts for the one or more active personas within the user interface of the covert application;
    displaying one or more system messages for the one or more active personas within the user interface of the covert application.

10. The method of claim 1, further comprising:
    displaying one or more locales within a user interface of the covert application and associating a selected locale with the persona;
    displaying one or more geosites within the user interface of the covert application and associating a selected geosite with the persona;
    displaying a persona identifier field within the user interface of the covert application and associating an entered persona identifier with the persona;
    displaying one or more Internet services within the user interface of the covert application and associating the one or more selected Internet services with the persona; and
    creating the persona within the covert application based on the selected locale, the selected geosite, the entered persona identifier, and the selected one or more Internet services.

11. The method of claim 1, further comprising:
    browsing a web page within the covert application; and
    automatically storing the browsed web page within a database of the covert application.

12. The method of claim 1, further comprising:
    associating one or more email accounts with a persona of the covert application; and displaying one or more emails from the one or more email accounts within a user interface of the covert application.

13. The method of claim 1, further comprising:
automatically storing data in a database within the covert application, wherein the stored data is identified as a journal entry;
retrieving the stored data from the database by selecting the journal entry from within a user interface of the covert application; and
displaying the stored data within the user interface of the covert application.

14. The method of claim 1, further comprising:
creating a contact within the covert application;
associating the contact with the persona;
creating a detail within the covert application;
associating the detail with the contact and with the persona;
storing the contact within a database of the covert application; and
displaying the contact within a user interface of the covert application.

15. The method of claim 1, further comprising:
creating one or more details that are associated with a persona within the covert application;
storing the one or more details within a database of the covert application;
displaying the one or more details within a user interface of the covert application;
accessing the one or more details from an integrated module of the covert application; and
utilizing the one or more details to perform functionality within the integrated module.

16. The method according to claim 1, wherein the generating the communication within the covert application further comprises: providing at least one Internet application that is appropriate for a region containing the locale of the persona.

17. An apparatus, comprising:
a memory configured to store one or more modules, wherein the persona comprises a persistent digital identity that represents a user's presence on the Internet;
a processor configured to execute the one or more modules stored on the memory,
wherein the processor is further configured, when executing the one or more modules stored on the memory, to,
activate a persona within a covert application, wherein the persona comprises a persistent digital identity that represents a user's presence on the Internet, wherein the covert application comprises a persona builder module user interface that displays a plurality of selectable buttons, and wherein the activating the persona further comprises clicking on one of a displayed build persona button or a developed persona button of the plurality of selectable buttons;
configure one or more network environment attributes of the persona within the covert application;
configure one or more operating system environment attributes of the persona within the covert application;
configure one or more application environment attributes of the persona within the covert application;
generate a communication within the covert application, wherein the activating the persona further comprises configuring a locale for the persona, wherein the locale is a geographic location where the persona purports to be located, which is different from an actual geographic location of the persona where network traffic originates,
wherein the configuring the one or more network environment attributes of the persona is based on the locale that is configured for the persona, and
wherein the configuring the one or more network environment attributes comprises altering identifiers that comprise location information within one or more network packets transmitted by the covert application at a direction of the persona;
reroute the network traffic of the communication to the purported geographic location that is different from the actual geographic location of the persona where the network traffic originates;
identify an attempt to transmit the communication over a network connection;
scan the communication and performing a unified check of the communication based on one or more rules;
transmit the communication over the network connection, when the communication complies with the one or more rules; and
display a warning message, when the communication does not comply with the one or more rules,
wherein the one or more rules include a time rule, an email address rule, a cultural rule, or a persona rule.

18. The apparatus of claim 17, wherein the processor is further configured, when executing the one or more modules stored on the memory, to,
display a real-time visualization of geospatial data within a user interface of the covert application;
display a marker that indicates a locale of a persona associated with a user within the user interface of the covert application;
display persona information of the persona associated with the user within the user interface of the covert application; and
display one or more icons within the user interface of the covert application, wherein each icon initiates a module of the covert application.

19. The apparatus of claim 17, wherein the processor is further configured, when executing the one or more modules stored on the memory, to,
display one or more active personas and one or more archived personas within a user interface of the covert application;
display one or more emails for the one or more active personas within the user interface of the covert application;
display one or more calendar entries for the one or more active personas within the user interface of the covert application;
display one or more contacts for the one or more active personas within the user interface of the covert application;
display one or more system messages for the one or more active personas within the user interface of the covert application.

20. The apparatus of claim 17, wherein the processor is further configured, when executing the one or more modules stored on the memory, to,
display one or more locales within a user interface of the covert application and associating a selected locale with the persona;
display one or more geosites within the user interface of the covert application and associating a selected geosite with the persona;

display a persona identifier field within the user interface of the covert application and associating an entered persona identifier with the persona;

display one or more Internet services within the user interface of the covert application and associating the one or more displayed Internet services with the persona; and create the persona within the covert application based on the selected locale, the selected geosite, the entered persona identifier, and the selected one or more Internet services.

21. The apparatus of claim 17, wherein the processor is further configured, when executing the one or more modules stored on the memory, to, browse a web page within the covert application; and
automatically store the browsed web page within a database of the covert application.

22. The apparatus of claim 17, wherein the processor is further configured, when executing the one or more modules stored on the memory, to, associate one or more email accounts with a persona of the covert application; and
display one or more emails from the one or more email accounts within a user interface of the covert application.

23. The apparatus of claim 17, wherein the processor is further configured, when executing the one or more modules stored on the memory, to, automatically store data in a database within the covert application, wherein the stored data is identified as a journal entry;
retrieve the stored data from the database by selecting the journal entry from within a user interface of the covert application; and
display the stored data within the user interface of the covert application.

24. The apparatus of claim 17, wherein the processor is further configured, when executing the one or more modules stored on the memory, to, create a contact within the covert application;
associate the contact with the persona;
create a detail within the covert application;
associate the detail with the contact and with the persona;
store the contact within a database of the covert application; and
display the contact within a user interface of the covert application.

25. The apparatus of claim 17, wherein the processor is further configured, when executing the one or more modules stored on the memory, to, create one or more details that are associated with a persona within the covert application;
store the one or more details within a database of the covert application;
display the one or more details within a user interface of the covert application;

access the one or more details from an integrated module of the covert application; and
utilize the one or more details to perform functionality within the integrated module.

26. A computer program, embodied on a non-transitory computer-readable medium, configured to control a processor to implement a method, the method comprising:

activating a persona within a covert application, wherein the persona comprises a persistent digital identity that represents a user's presence on the Internet, wherein the covert application comprises a persona builder module user interface that displays a plurality of selectable buttons, and wherein the activating the persona further comprises clicking on one of a displayed build persona button or a developed persona button of the plurality of selectable buttons;

configuring one or more network environment attributes of the persona within the covert application;

configuring one or more operating system environment attributes of the persona within the covert application; and configuring one or more application environment attributes of the persona within the covert application, wherein the activating the persona further comprises configuring a locale for the persona, wherein the locale is a geographic location where the persona purports to be located, which is different from an actual geographic location of the persona where network traffic originates, wherein the configuring the one or more network environment attributes of the persona is based on the locale that is configured for the persona, and wherein the configuring the one or more network environment attributes comprises altering identifiers that comprise location information within one or more network packets transmitted by the covert application at a direction of the persona;

generating a communication within the covert application;

rerouting the network traffic of the communication to the purported geographic location that is different from the actual geographic location of the persona where the network traffic originates;

identifying an attempt to transmit the communication over a network connection;

scanning the communication and performing a unified check of the communication based on one or more rules;

transmitting the communication over the network connection, when the communication complies with the one or more rules; and displaying a warning message, when the communication does not comply with the one or more rules, wherein the one or more rules include a time rule, an email address rule, a cultural rule, or a persona rule.

* * * * *